US010687354B2

(12) United States Patent
Li et al.

(10) Patent No.: US 10,687,354 B2
(45) Date of Patent: *Jun. 16, 2020

(54) GRANT-LESS OPERATIONS

(71) Applicant: Convida Wireless, LLC, Wilmington, DE (US)

(72) Inventors: Qing Li, Princeton Junction, NJ (US); Guodong Zhang, Woodbury, NY (US); Pascal M. Adjakple, Great Neck, NY (US); Allan Y. Tsai, Boonton, NJ (US); Qian Zhang, Basking Ridge, NJ (US); Lakshmi R. Iyer, King of Prussia, PA (US); Wei Chen, San Diego, CA (US); Joseph M. Murray, Schwenksville, PA (US); Tianyi Xu, San Jose, CA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,337

(22) Filed: Apr. 15, 2019

(65) Prior Publication Data

US 2019/0313443 A1    Oct. 10, 2019

Related U.S. Application Data

(63) Continuation of application No. 15/624,506, filed on Jun. 15, 2017, now Pat. No. 10,306,671.

(Continued)

(51) Int. Cl.
*H04W 52/02* (2009.01)
*H04W 74/08* (2009.01)
(Continued)

(52) U.S. Cl.
CPC ....... *H04W 72/14* (2013.01); *H04W 52/0216* (2013.01); *H04W 52/325* (2013.01);
(Continued)

(58) Field of Classification Search
CPC ... H04W 72/14; H04W 52/325; H04W 74/08; H04W 74/004; H04W 52/0216;
(Continued)

(56) References Cited

U.S. PATENT DOCUMENTS 8,902,773 B2   12/2014   Anderson et al.
9,002,979 B2    4/2015   Hansen
(Continued)

FOREIGN PATENT DOCUMENTS

EP   2464076 A2   6/2012
EP   2882110 A1   6/2015
(Continued)

OTHER PUBLICATIONS

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.
(Continued)

*Primary Examiner* — Mohamed A Kamara
(74) *Attorney, Agent, or Firm* — BakerHostetler

(57) ABSTRACT

Current approaches to transmitting uplink data in a network often require resources to be granted. In an example, a node or apparatus may configure a plurality of devices to operate in a grant-less mode in accordance with a respective grant-less access allocation. Grant-less operations may be managed, for example, to meet the reliability and latency requirements and battery life requirements for different types of devices. For example, the state transition between grant-less and grant based may be managed.

17 Claims, 42 Drawing Sheets

Related U.S. Application Data

(60) Provisional application No. 62/401,062, filed on Sep. 28, 2016, provisional application No. 62/373,691, filed on Aug. 11, 2016, provisional application No. 62/350,550, filed on Jun. 15, 2016.

(51) Int. Cl.
*H04W 72/14* (2009.01)
*H04W 56/00* (2009.01)
*H04W 52/32* (2009.01)
*H04W 72/04* (2009.01)
*H04W 74/00* (2009.01)

(52) U.S. Cl.
CPC ..... *H04W 56/0045* (2013.01); *H04W 72/048* (2013.01); *H04W 74/004* (2013.01); *H04W 74/08* (2013.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/20* (2018.01); *Y02D 70/21* (2018.01); *Y02D 70/23* (2018.01); *Y02D 70/24* (2018.01); *Y02D 70/26* (2018.01)

(58) Field of Classification Search
CPC ............ H04W 56/0045; H04W 72/048; Y02D 70/1246; Y02D 70/1242; Y02D 70/20; Y02D 70/23; Y02D 70/26
See application file for complete search history.

(56) References Cited

U.S. PATENT DOCUMENTS

| | | |
|---|---|---|
| 9,198,181 B2 | 11/2015 | Blankenship et al. |
| 9,338,700 B2 | 5/2016 | Schulist et al. |
| 9,413,451 B2 | 8/2016 | Park et al. |
| 10,306,671 B2 * | 5/2019 | Li ................ H04W 74/08 |
| 2008/0205351 A1 | 8/2008 | Lindoff et al. |
| 2009/0298497 A1 | 12/2009 | Lee |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0227611 A1 | 9/2010 | Schmidt et al. |
| 2011/0077013 A1 | 3/2011 | Cho et al. |
| 2011/0222428 A1 | 9/2011 | Charbit et al. |
| 2011/0242997 A1 | 10/2011 | Yin |
| 2012/0009963 A1 | 1/2012 | Kim et al. |
| 2013/0017833 A1 | 1/2013 | Sakamoto et al. |
| 2013/0034071 A1 | 2/2013 | Lee et al. |
| 2013/0155847 A1 | 6/2013 | Li et al. |
| 2013/0225184 A1 | 8/2013 | Liu et al. |
| 2013/0265932 A1 | 10/2013 | Huang et al. |
| 2014/0036806 A1 | 2/2014 | Chen et al. |
| 2014/0086217 A1 | 3/2014 | Park et al. |
| 2014/0204854 A1 | 7/2014 | Freda et al. |
| 2014/0206854 A1 | 7/2014 | Bennett et al. |
| 2014/0223095 A1 | 8/2014 | Storm et al. |
| 2014/0254544 A1 | 9/2014 | Kar et al. |
| 2014/0293901 A1 | 10/2014 | Hegde |
| 2014/0315593 A1 | 10/2014 | Vrzic et al. |
| 2014/0321375 A1 | 10/2014 | Agiwal et al. |
| 2014/0369201 A1 | 12/2014 | Gupta et al. |
| 2015/0103725 A1 | 4/2015 | Sun et al. |
| 2015/0223279 A1 | 8/2015 | Jiao et al. |
| 2015/0234708 A1 | 8/2015 | Storm et al. |
| 2015/0282130 A1 | 10/2015 | Webb et al. |
| 2015/0326484 A1 * | 11/2015 | Cao ................ H04W 4/70 370/329 |
| 2015/0327245 A1 | 11/2015 | Zhu et al. |
| 2016/0020877 A1 | 1/2016 | Koutsimanis et al. |
| 2016/0036578 A1 | 2/2016 | Malladi et al. |
| 2016/0073302 A1 | 3/2016 | Yang et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0234736 A1 | 8/2016 | Kubota et al. |
| 2016/0234759 A1 | 8/2016 | Kubota et al. |
| 2016/0270102 A1 | 9/2016 | Zeng et al. |
| 2016/0352545 A1 | 12/2016 | Johnson |
| 2016/0353343 A1 | 12/2016 | Rahman et al. |
| 2017/0013598 A1 | 1/2017 | Jung et al. |
| 2017/0034845 A1 * | 2/2017 | Liu ................ H04L 1/0003 |
| 2017/0118054 A1 | 4/2017 | Ma et al. |
| 2017/0134913 A1 | 5/2017 | Cui et al. |
| 2017/0201980 A1 | 7/2017 | Hakola et al. |
| 2017/0230985 A1 | 8/2017 | Yamada et al. |
| 2017/0273063 A1 | 9/2017 | Kim et al. |
| 2017/0289791 A1 | 10/2017 | Yoo et al. |
| 2017/0290052 A1 | 10/2017 | Zhang et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2018/0076994 A1 | 3/2018 | Lee et al. |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0198504 A1 | 7/2018 | Li et al. |
| 2018/0199361 A1 | 7/2018 | Zhang et al. |
| 2018/0220407 A1 | 8/2018 | Xiong et al. |
| 2018/0242304 A1 | 8/2018 | Rong et al. |
| 2018/0287722 A1 | 10/2018 | Takano |
| 2018/0294860 A1 | 10/2018 | Hakola et al. |
| 2018/0338277 A1 | 11/2018 | Byun et al. |
| 2018/0368018 A1 | 12/2018 | Kim et al. |
| 2019/0045340 A1 | 2/2019 | Zhu et al. |
| 2019/0045577 A1 | 2/2019 | Kim et al. |
| 2019/0159107 A1 | 5/2019 | Kim et al. |

FOREIGN PATENT DOCUMENTS

| | | |
|---|---|---|
| EP | 3051906 A1 | 8/2016 |
| EP | 3082362 A1 | 10/2016 |
| EP | 3101971 A1 | 12/2016 |
| JP | 2010-508789 A | 3/2010 |
| JP | 2010-519838 A | 6/2010 |
| JP | 2016-504798 A | 2/2016 |
| JP | 2016-504851 A | 2/2016 |
| JP | 2016-514416 A | 5/2016 |
| KR | 10-2008-0109535 A | 12/2008 |
| KR | 10-2009-0085640 A | 8/2009 |
| KR | 10-2010-0097625 A | 9/2010 |
| KR | 10-2011-0063565 A | 6/2011 |
| WO | 2007/052753 A1 | 5/2007 |
| WO | 2007/125910 A1 | 11/2007 |
| WO | 2010/001474 A1 | 1/2010 |
| WO | 2014/090200 A1 | 6/2014 |
| WO | 2014/090208 | 6/2014 |
| WO | 2014/135126 A1 | 9/2014 |
| WO | 2015/045658 A1 | 4/2015 |
| WO | 2015/067196 A1 | 5/2015 |
| WO | 2015/080646 A1 | 6/2015 |
| WO | 2015/100533 A1 | 7/2015 |
| WO | 2015/113205 A1 | 8/2015 |
| WO | 2015/141982 A1 | 9/2015 |

OTHER PUBLICATIONS

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) RP-160425 TSG RAN Meeting #71, Further enhancements on signaling reduction to

(56) References Cited

OTHER PUBLICATIONS enable light connection for LTE, Intel Corporation, Gothenburg, Sweden, Mar. 7-10, 2016, 7 pages.
3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) RP-161214 TSG RAN Meeting #72, Revision of SI: Study on New Radio Access Technology, NH DOCOMO, Busan, Korea, Jun. 13-16, 2016, 8 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S2-161198 SA WG2 Meeting #113AFI, Solution for optimized UE sleep state and state transitions, Sophia Antipolis, France, Feb. 23-26, 2016, 3 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-162982 was S2-162717-MDD and Slice Selection in core and RAN V1, 3rd vol. SA WG2 Nokia et al., no. Nanjing, PR. China; May 27, 2016, 13 pages.
3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 24.302 V135.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.321 V13.0.0, Technical Specification Group Radio Access Network, Evolved Universal Ten-estrial Radio Access (E-UTRA), Medium Access Control (MAC) protocol specification (Release 13), Dec. 2015, 82 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #85, R1-164014, Discussion on RS for Beamformed Access, Samsung, Nanjing, China, May 23-27, 2016, 3 pages.
3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.

(56) References Cited

OTHER PUBLICATIONS

3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #85 R1-165174 "Uplink multiple access schemes for NR", May 23-27, 2016, 4 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG2 Meeting #94, R2-163718 "Control Plane functions in NR", Nanjing, China; May 23-27, 2016, 4 pages.
3RD Generation Partnership Project (3GPP), RI-165027, vol. RAN WG1, Nokia et al: "Basic frame structure 1 principles for 5G", 3GPP DRAFT; no. Nanjing, P.R. China; 20160523-20160527 May 13, 2016.
Sesia et al., "LTE—The UMTS Long Term Evolution", Chapter 9.33., LTE—The UMTS Long Term Evolution : from theory to Practice; Jul. 20, 2011, pp. 198-200.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), TSG RAN WG1 Meeting #86, 'RAN1 Chairman's Notes, Gothenburg, Sweden, Aug. 22-26, 2016, 105 pages.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project; (3GPP) TR 23.799, "Technical Specification Group Services and System Aspects; Study on Architecture for Next Generation System (Release 14)", vol. SA WG2, No. V0.5.0, 8 Jun. 2016, pp. 1-179.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies; (Release 14), Feb. 2016, 19 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.

3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
Chu, David, "Polyphase Codes With Good Periodic Correlation Properties", IEEE Transactions on Information Theory, Jul. 1972, 531-532.
IEEE P802.11, Wireless LANs, Proposed TGax draft specification, Comment Resolutions on UL MU Operation, Jul. 25, 2016, 27 pages.
International Telecommunication Union (ITU-R), "IMT Vision—Framework and overall objectives of the future development of IMT for 2020 and beyond", Recommendation ITU-R M.2083-0, Sep. 2015, 21 pages.
NGMN 5G Initiative White Paper v1.0, Feb. 17, 2015, 125 pages.
Qualcomm Incorporated: "Frame structure requirements", 3GPP DRAFT; vol. RAN WG1, no. Nanjing, China; May 14, 2016.
Qualcomm, 3GPP R1-1612062, TSG-RAN WG1 #87, Control Channel for slot format indicator, Nov. 14-18, 2016 (Year 2016).
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis Ceo Ex ; France, RAN WG1, no. Lisbon, Portugal; 2016101 O-20161014 Sep. 30, 2016.
ETRI, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/S1-161171.zip, 6 pages.
ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.
Huawei, "HiSilicon, UE Slice Association/Overload control Procedure", 3GPP TSG-SA WG2 #115 SZ-162605, May 17, 2016, URL:http://www.3gpp.org/ftp/tsg_sa/WG2_ArchrTSGS2_115_Nanjing_China/Docs/S2-162605.zip, 11 pages.
Itri, "Updates to Solution 6. 1.3: Introducing Network Instance ID", 3GPP TSG-SA WG2 #115 SZ-162666, May 17, 2016, URL:http://www.3gpp.org/ftp/tsg_sa/WG2_Arch/TSGS2_115_Nanjing_China/Docs/S2-162666.zip>.
MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.
Nokia, "Alcatel-Lucent Shanghai Bell", Slice Selection solution update, 3GPP TSG-SA WG2 #115 SZ-162982, May 27, 2016, URL: http://www.3gpp.org/ftp/tsg_sa/WG2_ArchrTSGS2_115_Nanjing_China/Docs/S2-162982.zip, 15 pages.
Nokia, "Solutions for Network Slice Selection", Alcatel-Lucent Shanghai Bell, 3GPP TSGG-RAN WG3 Meeting #92, R3-161356, China, May 23-27, 2016, 9 pages.
ZTE, "Consideration on RAN architecture impacts of network slicing", 3GPP TSG-RAN WG2 Meeting #93bis, R2-162627, Croatia, Apr. 11-15, 2016, 10 pages.
3GPP TSG-RAN WG2 Meeting #95 R2-164693, Samsung, "System Information Signalling Design in NR" Aug. 2016, 6 pages.
3GPP TSG-RAN2 meeting #95bis R2-166202, Huawei et al., "Further Discussions of Minimum SI" Oct. 2016, 3 pages.
3GPP TSG-RAN2 Meeting #95bis R2-166203, Huawei et al., "Delivery of "Other SI" in NR", Oct. 2016, 5 pages.
3GPP TSG=RAN WG2 Meeting #95bis, ETSI MCC, "Skeleton report", Oct. 2016, 5 pages.
3GPP TSG RAN WG1 Meeting #84bis R1-163049, Design Options for Longer Cyclic Prefix for MBSFN Subframes, Apr. 2016, 3 pages.

* cited by examiner

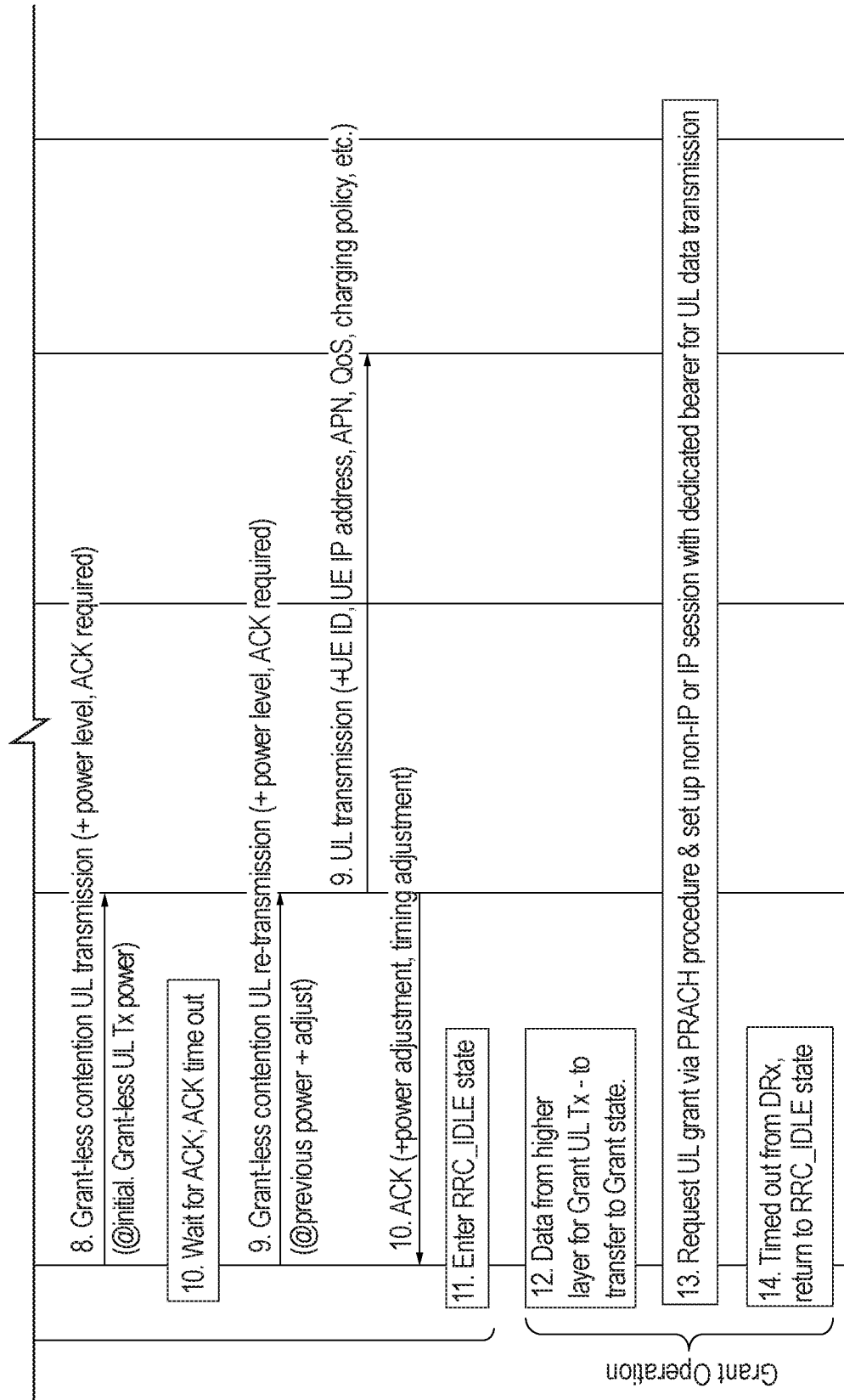

GRANT-LESS OPERATIONS

CROSS REFERENCE TO RELATED APPLICATIONS

This application is a continuation of U.S. patent application Ser. No. 15/624,506 filed Jun. 15, 2017 which claims the benefit of priority to U.S. Provisional Patent Application No. 62/350,550, filed Jun. 15, 2016, U.S. Provisional Patent Application No. 62/373,691 filed Aug. 11, 2016, and U.S. Provisional Patent Application No. 62/401,062, filed Sep. 28, 2016, the disclosures of which are incorporated by reference in their entireties.

BACKGROUND

International Mobile Telecommunications (IMT) for 2020 and beyond (e.g., IMT 2020) is envisaged to expand and support diverse families of usage scenarios and applications that will continue beyond the current IMT. Furthermore, a broad variety of capabilities may be tightly coupled with these different usage scenarios. Example families of usage scenarios include enhanced Mobile Broadband (eMBB), Ultra-Reliable and Low Latency Communications (URLLC), massive Machine Type Communications (mMTC), and Network Operations. Example operating characteristics of eMBB may include macro and small cells, 1 ms Latency (air interface), support for high mobility, etc. Example operating characteristics of URLLC may include low to medium data rates (e.g., 50 kbps-10 Mbps), less than 1 ms air interface latency, 99.999% reliability and availability, low connection establishment latency, 0-500 km/h mobility, etc. Example mMTC operating characteristics may include low data date (e.g., 1-100 kbps), high density of devices (e.g., 200,000/km2), varying latency, low power required (e.g., up to 15 years battery autonomy), asynchronous access, etc. Network operations address various subjects such as Network Slicing, Routing, Migration and Interworking, Energy Saving, etc.

With respect to New Radio (NR) requirements, 3GPP TR 38.913 defines scenarios and requirements for New Radio (NR) technologies. Key Performance Indicators (KPIs) for URLLC and mMTC devices are summarized in Table 1 below:

TABLE 1

KPIs for URLLC and mMTC Devices

| Device | KPI | Description | Requirement |
|---|---|---|---|
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes [NOTE1] within 1 ms, which is the time it takes to deliver a small data packet from the radio protocol layer 2/3 SDU ingress point to the radio protocol layer 2/3 SDU egress point of the radio interface, at a certain channel quality (e.g., coverage-edge). NOTE1: Specific value for X is FFS. | $1-10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
| | UE Battery Life | User Equipment (UE) battery life can be evaluated by the battery life of the UE without recharge. For mMTC, UE battery life in extreme coverage shall be based on the activity of mobile originated data transfer consisting of [200 bytes] Uplink (UL) per day followed by [20 bytes] Downlink (DL) from Maximum Coupling Loss (MCL) of [tbd] dB, assuming a stored energy capacity of [5 Wh]. | 15 years |
| | Connection Density | Connection density refers to total number of devices fulfilling specific Quality of Service (QoS) per unit area (per km$^2$). QoS definition should take into account the amount of data or access request generated within a time t_gen that can be sent or received within a given time, t_sendrx, with x % probability. | $10^6$ devices/km$^2$ |

System Information (SI) is the information broadcast by the Evolved Universal Terrestrial Radio Access Network (E-UTRAN) that needs to be acquired by a UE so that the UE can access and operate within the network. SI is divided into the MasterInformationBlock (MIB) and a number of SystemInformationBlocks (SIBs). A high level description of the MIB and SIBs is provided in 3GPP TS 36.300. Detailed descriptions are available in 3GPP TS 36.331. Examples of SI is shown in Table 2 below.

TABLE 2

System Information

| Information Block | Description |
| --- | --- |
| MIB | Defines the most essential physical layer information of the cell required to receive further system information |
| SIB1 | Contains information relevant when evaluating if a UE is allowed to access a cell and defines the scheduling of other system information |
| SIB2 | Radio resource configuration information that is common for all UEs |
| SIB3 | Cell re-selection information common for intra-frequency, inter-frequency and/or inter-RAT cell re-selection (i.e. applicable for more than one type of cell re-selection but not necessarily all) as well as intra-frequency cell re-selection information other than neighboring cell related |
| SIB4 | Neighboring cell related information relevant only for intra-frequency cell re-selection |
| SIB5 | Information relevant only for inter-frequency cell re-selection i.e. information about other E UTRA frequencies and inter-frequency neighboring cells relevant for cell re-selection |
| SIB6 | Information relevant only for inter-RAT cell re-selection i.e. information about UTRA frequencies and UTRA neighboring cells relevant for cell re-selection |
| SIB7 | Information relevant only for inter-RAT cell re-selection i.e. information about GERAN frequencies relevant for cell re-selection |
| SIB8 | Information relevant only for inter-RAT cell re-selection i.e. information about CDMA2000 frequencies and CDMA2000 neighboring cells relevant for cell re-selection |
| SIB9 | Home eNB name (HNB Name) |
| SIB10 | ETWS primary notification |
| SIB11 | ETWS secondary notification |
| SIB12 | CMAS notification |
| SIB13 | Information required to acquire the MBMS control information associated with one or more MBSFN areas |
| SIB14 | EAB parameters |
| SIB15 | MBMS Service Area Identities (SAI) of the current and/or neighboring carrier frequencies |
| SIB16 | Information related to GPS time and Coordinated Universal Time (UTC) |
| SIB17 | Information relevant for traffic steering between E-UTRAN and WLAN |
| SIB18 | Indicates E-UTRAN supports the Sidelink UE information procedure and may contain sidelink communication related resource configuration information |
| SIB19 | Indicates E-UTRAN supports the Sidelink UE information procedure and may contain sidelink discovery related resource configuration information |
| SIB20 | Contains the information required to acquire the control information associated transmission of MBMS using SC-PTM |

Turning now to UE information states, a UE can be in different states after powering up—"Idle" or "Packet Communication" as shown in FIG. 1, which are fully managed by EPS Mobility Management (EMM), EPS Connection Management (ECM), and the Radio Resource Control (RRC) functions. The details are summarized in Table 3, FIG. 2, and Table 4.

TABLE 3

UE in EMM, ECM and RRC states

| Case | State | UE | eNB | S-GW | P-GW | MNE | HSS | PCRF | SPR |
| --- | --- | --- | --- | --- | --- | --- | --- | --- | --- |
| A | EMM-Deregistered + ECM-Idle + RRC-Idle | — | — | — | — | — | — | — | — |
| B | EMM-Deregistered + EMC-Idle + RRC-Idle | — | — | — | — | TAI of last TAU | MME | — | — |
| C | EMM-Registered + ECM-Connected | — | Cell/eNB | Cell/eNB | Cell/eNB | Cell/eNB | MME | Cell/eNB | — |
| D | EMM-Registered + ECM-Idle + RRC-Idle | — | — | TAI of last TAU | TAI of last TAU | TAI of last TAU | MME | TAI of last TAU | — |

TABLE 4

UE Location Information Set in Each EPS Entity

| Case | State | UE | eNB | S-GW | P-GW | MNE | HSS | PCRF | SPR |
|------|-------|----|----|------|------|-----|-----|------|-----|
| A | EMM-Deregistered + ECM-Idle + RRC-Idle | — | — | — | — | — | — | — | — |
| B | EMM-Deregistered + EMC-Idle + RRC-Idle | — | — | — | — | TAI of last TAU | MME | — | — |
| C | EMM-Registered + ECM-Connected | — | Cell/eNB | Cell/eNB | Cell/eNB | Cell/eNB | MME | Cell/eNB | — |
| D | EMM-Registered + ECM-Idle + RRC-Idle | — | — | TAI of last TAU | TAI of last TAU | TAI of last TAU | MME | TAI of last TAU | — |

More example details are shown in FIG. 3, which shows an example RRC_IDLE and RRC_CONNECTED state. With respect to the RRC_IDLE state, there is no RRC context in the Radio Access Network (RAN), and the UE does not belong to a specific cell. No data transfer may take place in RRC_IDLE. A UE is in a low-power state and listens to control traffic (control channel broadcasts), such as paging notifications of inbound traffic and changes to the system information. In RRC_IDLE, a given UE may first synchronize itself to the network by listening to the network broadcasts, and then may issue a request to the RRC to be moved to the "connected" state to establish the RRC context between the RAN and the UE. In LTE-Advanced, the target time was further reduced to 50 ms.

With respect to the RRC_CONNECTED state, there is an RRC context and resource assignment for a UE. The cell to which the UE belongs is known and an identity of the UE (the Cell Radio-Network Temporary Identifier (C-RNTI)), which is used for signaling purposes between the UE and the network, has been configured. In RRC_CONNECTED, the UE is in a high-power state and is ready to transmit to, or receive data from, the Evolved Node B (eNB). Discontinuous Reception (DRX) is used to conserve UE power in RRC-CONNECTED. In some cases, each radio transmission, no matter how small, forces a transition to a high-power state. Then, once the transmission is done, the radio will remain in this high-power state until the inactivity timer has expired. The size of the actual data transfer does not influence the timer. Further, the device may then also have to cycle through several more intermediate states before it can return back to idle. It is recognized herein that the "energy tails" generated by the timer-driven state transitions, as shown in FIG. 4, make periodic transfers a very inefficient network access pattern on mobile networks.

SUMMARY

It is recognized herein that grant-less operations may be better managed, for example, to meet the URLLC's reliability and latency requirements and mMTC devices' battery life requirements. For example, the state transition between grant-less and grant based may be better managed.

In various examples, fast synchronization for contention based grant-less uplink transmission may include a synchronization pilot used for UL frequency and time synchronization, a timing advance adjustment estimated by UE, transmit power control for contention based grant-less uplink transmission, UL path loss estimation based on the measurement on the DL reference signal and the DL transmit power in the DCI, and/or quasi-closed loop power control by using the power information collected by UE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIGS. 22A and 22B depict an example call flow for grant-less and grant UL transmissions for mMTC devices, in accordance with an example embodiment;

DETAILED DESCRIPTION OF ILLUSTRATIVE EMBODIMENTS

As an initial matter, for different radio access network (RAN) architectures, the mechanisms described herein may be conducted at an NR-node, Transmission and Reception Point (TRP), or Remote Radio Head (RRH), as well as the central controller in RAN or control function in a RAN slice. Unless otherwise specified, the mechanisms described herein may applicable to TRP, RRH, central controller, and control functions in different RAN architectures.

Figure 5:
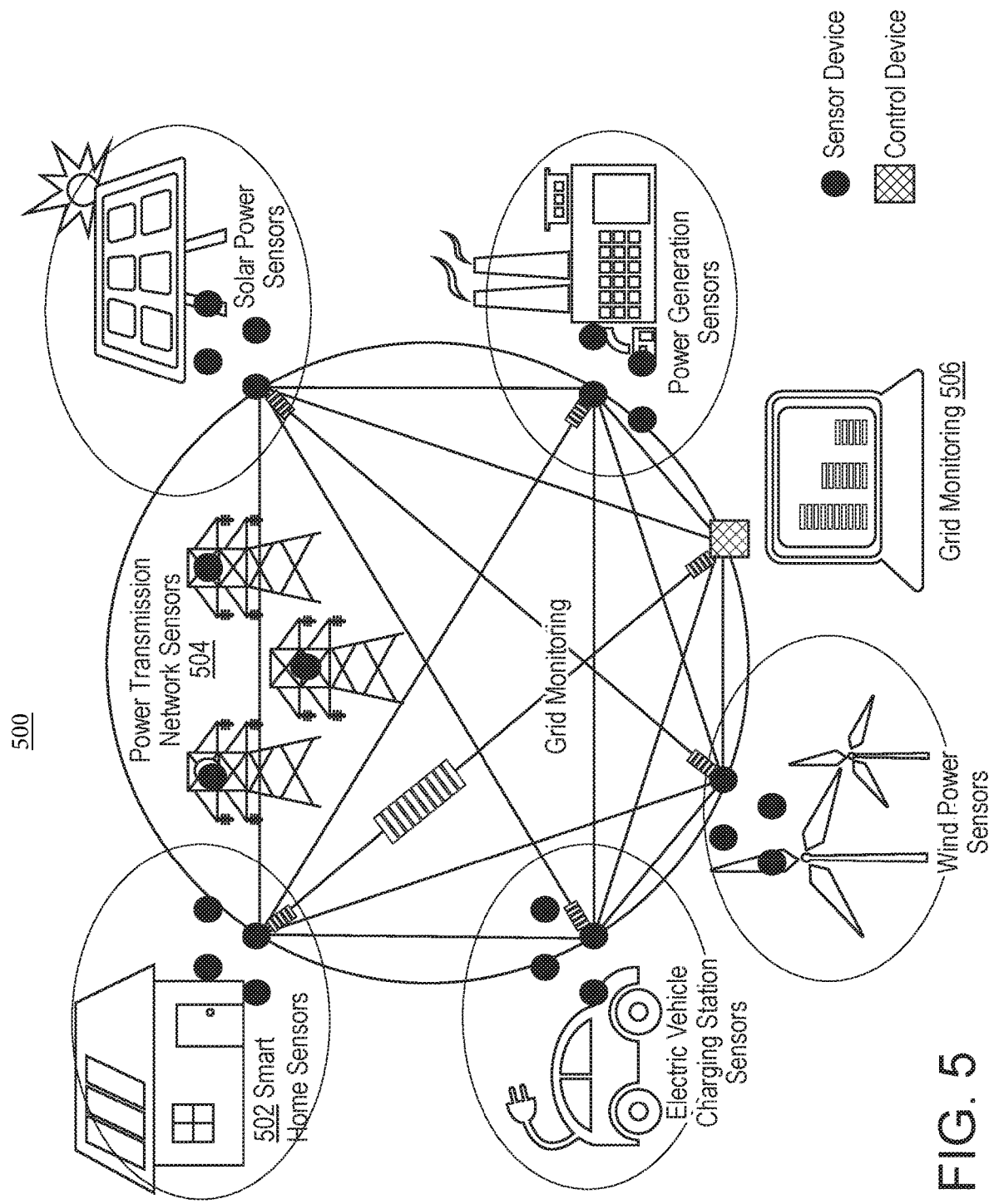
FIG. 5 shows an example use case that includes a power grid of a smart city.

Referring now to FIG. 5, an example use case is shown in which different sensors or monitoring devices of an example Smart City's power grid system 500 are illustrated. Sensors of a Smart Home 502 (e.g., massive Machine Type Communications (mMTC devices) may send electrical usage data once a week or a month with a very relaxed latency requirement. Sensors on a Smart City's Power Transmission Network 504 (e.g., Ultra-Reliable and Low Latency Communications (URLLC) devices) may monitor the power level continually and report to a Grid Monitoring System 506 periodically, but when an abnormal power level is detected, for example, it is recognized herein that the sensors 504 need to send the warning to the Grid Monitoring System 506 immediately so that the Grid Monitoring System 506 may shut down the malfunctioned power supply system, and so that a backup power supply system can be implemented instantly to avoid possible damage to the Smart City's power grid system 500 and to avoid negative impacts to the Smart City's operations.

By way of another example use case, forest fire monitoring sensors (e.g., mission critical MTC devices), can send small data periodically with a very low duty cycle, but they might need to send a fire warning message or messages immediately and reliably. These devices may be located sparsely and may cover a large area of the forest. The devices may also have constrained battery life (e.g., 15 or 20 years).

By way of yet another example use case, medical devices on an ambulance may be active while carrying the patient to the emergency room. For example, Ultra-Reliable and Low Latency Communications (URLLC) devices can send the patient's temperature and blood pressure data and heart monitoring images to the hospital and the doctor's office. It will be understood that embodiments described herein can be applied to a variety of use cases as desired.

The use cases may utilize URLLC and mMTC devices. For example, URLLC devices without battery constraint may support both small and medium UL data rate transmission with ultra-low latency and very high reliability. URLLC or mission critical MTC devices with battery constraint might support small UL data rate transmission with ultra-low latency and very high reliability. mMTC devices with battery constraint and dense connections might support small UL data rate transmission either prescheduled or tolerant to long latency.

As exemplified by the above uses cases, URLLC devices may fail the latency requirement for UL data transmission if the current grant-based UL data transmission in LTE systems is used. With respect to mMTC devices, the signaling overhead for UL grant messages may be very significant as compared to infrequent small UL data transmissions. It is recognized herein that this challenges the battery life requirement for mMTC devices. To reduce UL transmission signaling overhead for mMTC devices and to reduce UL transmission latency for URLLC devices, multiple access mechanisms including, for example, UL-grant less transmission, contention-based transmissions, non-orthogonal multiple access, may be used. As described below, embodiments perform grant-less UL transmission that can meet the ultra-reliability and low latency requirements for non-power-constrained URLLC devices. Further, embodiments described herein perform grant-less UL transmission that meet the battery life requirement for mMTC devices.

Figure 1:
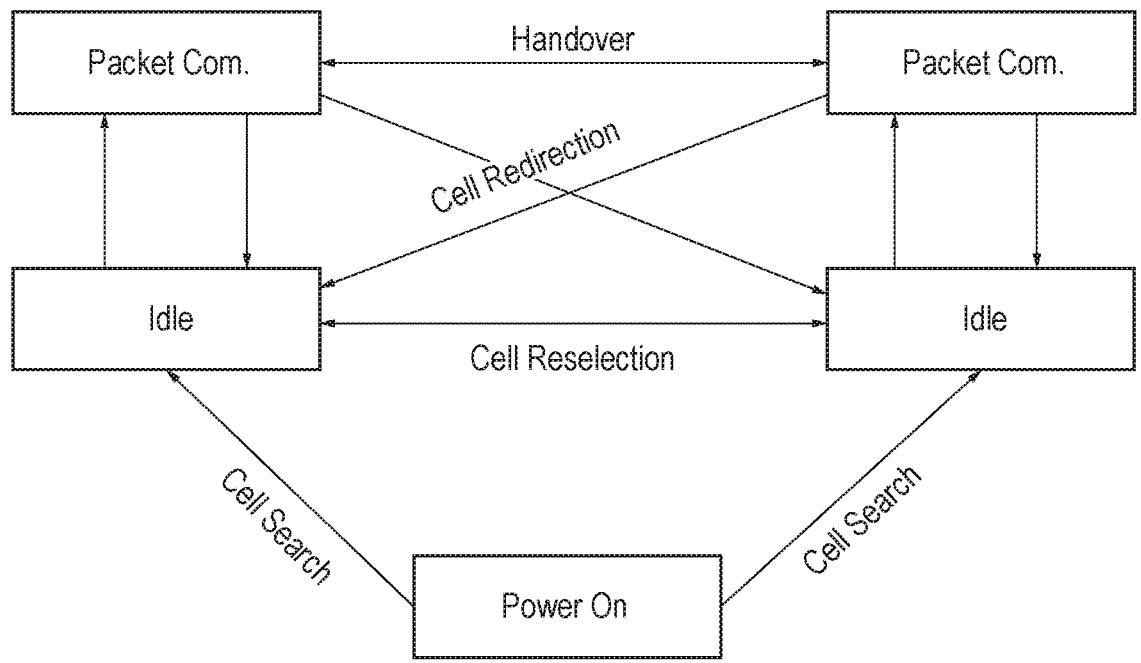
FIG. 1 shows states of operations associated with an example user equipment (UE)
Figure 2:
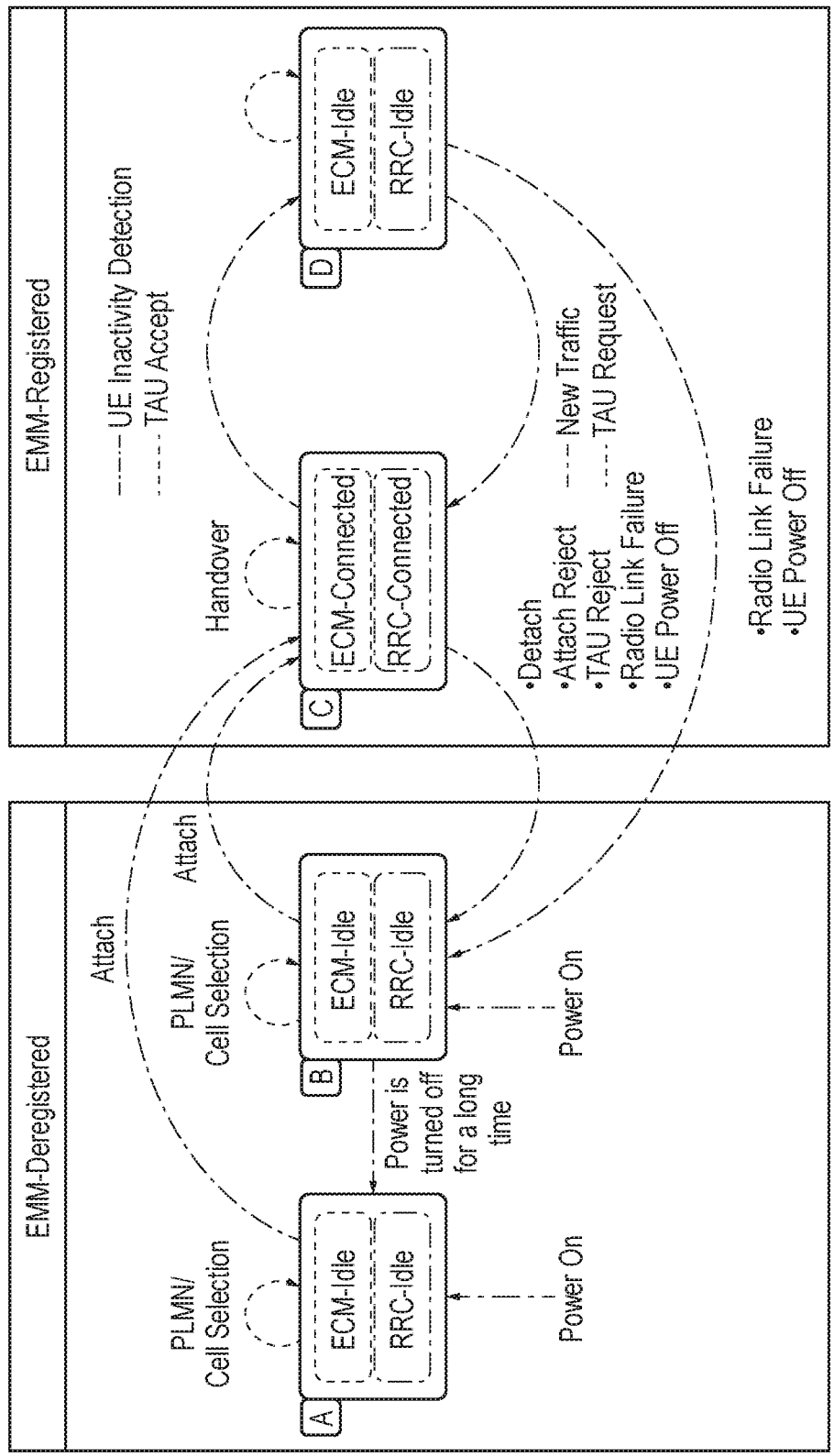
FIG. 2 shows examples of EMM, ECM, and Radio Resource Control (RRC) state transitions.
Figure 3:
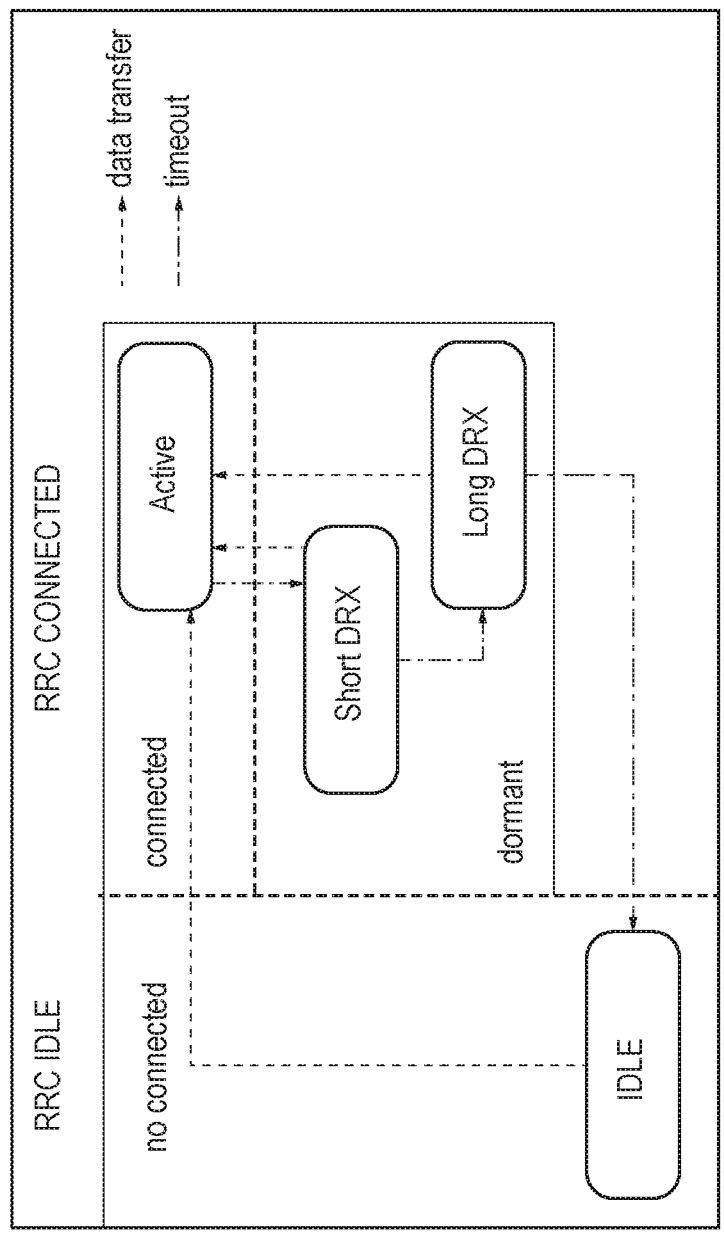
FIG. 3 shows an example RRC protocol state machine.
Figure 4:
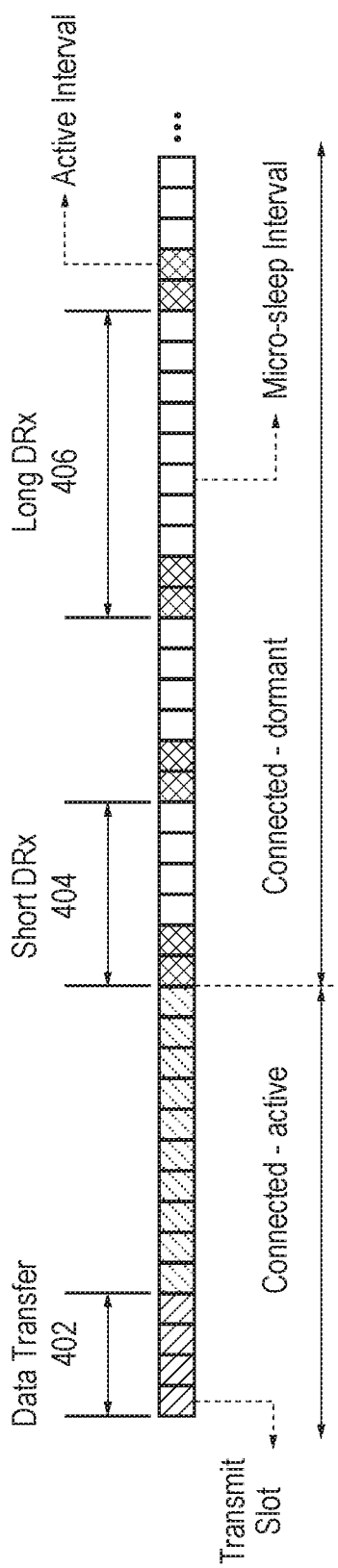
FIG. 4 shows an example of an RRC-CONNECTED Discontinued Reception (DRX)

Referring now to FIG. 4, after transmitting a small packet data 402, a device may have to stay at the high-power transmitting state until an inactivity timer has expired, and then it has to cycle through a number of short DRX cycles 404 with a reduced sleep time before longer DRX cycles 406, during which the device can sleep for a longer sleep time. It is recognized herein that these timer-driven state transitions can make low duty cycle small data transfers inefficient. In accordance with various examples, dual operation states are now described in which a device may be directed by the higher layer or an NR-node to operate at a Grant-less operation state for low duty cycle small data communication, for example, to reduce latency and save battery power with reduced signaling and extended timers; or at a Grant operation state, for example, for more frequent medium or high volume data communications.

An example implementation of this dual-state operation may be performed by traffic monitoring devices. In some cases, a traffic monitoring device may operate in a Grant-less operation state to periodically send small traffic report data, and the traffic monitoring device may switch to a Grant operation state for uploading larger image data, for instance image data related to traffic event (e.g., traffic accident). The higher layer may configure or direct a device's operation in the Grant operation mode or Grant-less operation mode after power up. In an example, a mission critical MTC device may operate in Grant-less operation mode with reduced signaling to save batter power, and a digital patient monitor without battery constraint may operate in the Grant operation mode to transmit large image files continuously.

In an alternative embodiment, the NR-node may configure a given UE that is already operating in a Grant state, such that the UE switches to a grant-less state operation. Similarly, the NR-Node may configure a given UE that is operating in grant-less state, to switch to a grant state operation. The NR-node may configure the UE to operate in a Grant-less state based on various information (inputs), such as, for example and without limitation: a service type, bearer type, traffic flow type, a network slice type and/or requirements related to a network slice, a physical layer numerology or frame structure in use, a measurement report from the UE (e.g., RSRP, RSRQ, battery level, Buffer Status Report, etc.), QoS attributes (e.g., latency, reliability, guarantee UL bit rate, minimum UL bite rate, maximum UL bit rate etc.), and/or a request from UE to operate in such a state.

In some examples, a UE may request the network to be configured for Grant-less operation. Such a request may be allowed or granted. Similarly, based on various inputs such as the example inputs described above, a network may configure a UE that is operating in a Grant-less state to switch so as to operate in a grant state. In some examples, a UE may send a capability bit indication to the network to indicate that it is able to operate in various states (e.g., grant-less or grant). Similarly, the network may send an indication to the UE that it can operate in dual states (e.g., grant-less and grant). The indication may be signaled to the UE through common RRC signaling, for example, by the presence of certain system information blocks (SIB) or Information Elements (IE) in a SIB. Alternatively, the indication may be signaled to the UE via dedicated signaling (e.g., an RRC unicast message to the UE).

In another embodiment, a given may autonomously transition between the grant-less state and the grant state. In some cases, the UE may make a determination to transition based on assistance information signaled to the UE through common RRC signaling or dedicated signaling (e.g., RRC unicast message or MAC CE signaling). Such a transition determination at the UE may be based on various information, such as for example and without limitation: service type, bearer type, traffic flow type, network slice type, physical layer numerology or frame structure in use, measurement report from UE (e.g., RSRP, RSRQ, battery level, Buffer Status Report, etc.), QoS attributes (e.g. latency, reliability, guarantee UL bit rate, minimum UL bite rate, maximum UL bit rate, etc.

In some cases, the grant-less state may viewed as a connected state from the core network perspective, such that a signaling connection is maintained between the core network (e.g., NextGen Core) and an NR-Node (e.g., NextGen RAN Node).

In an example grant-less state, a given UE may perform RAN level registration toward the RAN. The UE identity for such registration may be a RAN level identity or core network level identity. In some cases, such a registration follows procedures that are specific to the RAN specific, and therefore transparent to the core network. A reachability status associated with the UE while the UE is in the grant-less state may be maintained in the RAN. Similarly, a mobility status associated with the UE while the UE is in the grant-less state may be maintained in the RAN. In the grant-less state, mobility may be controlled by the UE with assistance (information) from the NR-node. In a grant-less state, the UE may also perform registration toward the core network, such as by performing an attach procedure.

Figure 6:
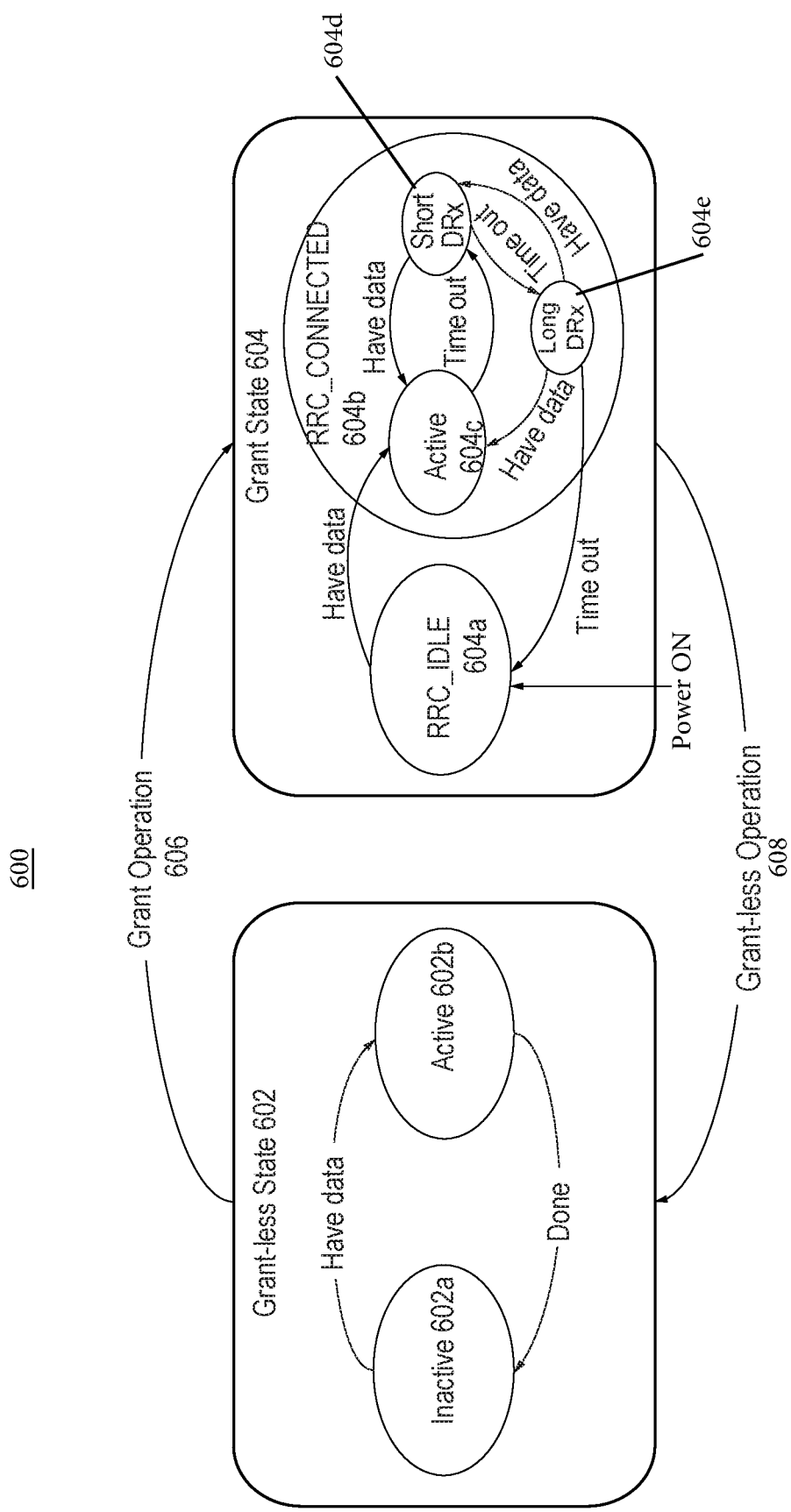
FIG. 6 shows example RRC operation states in accordance with an example embodiment.

Referring now to FIG. 6, an example dual-state operation 600 is shown. The dual state operation may be implemented by a UE that can operate in a grant-less state (or mode) 602 and a grant state (or mode) 604. The dual-state operation 600 may allow a UE to transfer from the grant-less state 602 to the grant state 604 if the UE receives a Grant Operation command 606 from its higher layer (e.g., NAS or application layer). By way of example, the application layer of the UE may identify an accident from a traffic monitor, and then direct a UE Radio Resource Control (RRC) state to switch to the Grant state 604 for uploading images or video of the accident. The UE RRC may alternatively transfer from the Grant state 604 to the Grant-less state 602 upon receiving a Grant-less Operation command 608 from its higher layer. In some cases, the transition between the Grant state 602 and Grant-less state 604 may be directed by the NR-node or determined by UE. Thus, the grant operation command 606 and the grant-less operation command 608 may be received from a RAN node (e.g., NR-node) or generated within the UE. The grant-less state 602 may include an Inactive state 602*a* and an Active state 602*b*, thus UE may transfer from the Inactive state 602*a* to the Active state 602*b* within the grant-less state, for example, when the UE has data to receive or transmit. In some cases, the UE transfers back to the Inactive state 602*a* immediately after receiving or transferring small data. In an example, the UE does not have to go through Short DRx and Long DRx cycles for returning back to the Inactive state 602*a* after receiving or transmitting a small packet data within the grant-less state 602. Thus, signaling and cycles may be reduced in the grant-less state 602 as compared the grant state 604, so as to improve latency and battery life. While in the Inactive state 602*a*, the UE may operate in a power saving mode, which may use less power than the Sleeping mode for DRx cycles, thereby conserving battery power.

Various context information associated with a UE (referred to as UE context) may be contained at an NR-node to avoid message exchanges with the Core network (CN) over an S1-like interface for re-establishing the radio connection or bearers when transferring from the Inactive state 602*a* to the Active state 602*b*. Thus, in some examples, less messages are exchanged when the UE transfers from the Inactive state 602*a* to the Active state 602*b* as compared to when the UE transfers from an RRC_IDLE state 604*a* to a RRC_CONNECTED state 604*b* within the grant state 604. Example context information includes, presented without limitation: IMSI, LTE K, default APN, EPS QoS Subscribed Profile, Access Profile, NAS Security Context, last Globally Unique Temporary UE Identity (GUTI), last Tracking Area Indicator (TAD, last S1 TEID, C-RNTI, AS Security Context, last bearer IDs, etc. The context information may reduce message exchanges, thereby conserving battery power of the UE, such as for a UE that includes a battery constrained sensor that has static mobility.

To conserve battery power, in accordance with an example embodiment, a UE is described herein that does not have to listen to control channel broadcasts frequently for paging notifications of inbound traffic, or for changes to the system information, because its traffic consists of uplink small data and downlink triggers or maintenance messages from an IoT service system. Such downlink triggers and messages may be infrequent, and may be prescheduled in many scenarios. Therefore, in some cases, it is recognized herein that the timer for wake up to listen to the control channel may be extended significantly by the device type, service, mobility, etc. By way of example, sparsely distributed forest fire monitoring sensors may wake up once a day, which is significant longer than the wake-up timer in the Grant operation state 604, if there is no UL transmission. Further, a UE, such as a sparsely distributed forest fire monitoring sensor, may wake up to check the control channel broadcasting first before it transmits a report or "keep alive" message to an NR-node.

In another example, to conserve battery power, a UE, such as an MTC device that monitors forest fires, may wake up to perform measurements only when it wakes up to transmit a report or keep alive message to an NR-node. Further, in an example, the UE may perform cell reselect only if the link measurement is below a predetermined threshold. Thus, the timer for wake up for measurements and/or cell reselection may be extended significantly as compared to other devices, based on various parameters of the UE such as device type, service, mobility, etc.

In yet another example, to conserve battery power, is recognized herein that a UE with low or static mobility can be configured to transfer to the Active state infrequently (e.g., once a day) to send a Reachability and Mobility Status Update (RMSU) to an NR-node. In an example, the RMSU information may be sent with an UL report or "keep alive" message associated with the UE, in an Information Element (IE) field to an NR-node.

In an example embodiment, one of co-located (i.e. virtually grouped) RF ID tags or wearable devices with medium or high mobility may schedule or randomly send RMSU message for the virtual group.

Referring again to FIG. 6, while in the Active state 602b, the UE may operate at a high power for transmitting or receiving, and then return to the Inactive state 602b, and thus operate at less power, directly without going through the DRx cycles 604d and 604e as in the RRC_CONNECTED state 604b of the Grant state 604, so as to avoid unnecessary DRx cycles for a sporadic small data transmission, which may also decrease signaling for improved latency and battery life performance. In an alternative embodiment, the Grant-less state 602 may include only the Inactive mode 602 of operation with no data transmission. The Grant-less channel resources in this case might only be used to request resource allocation for predefined specific services such as URLLC services. Continuing with the example, when the UE is granted resources, the UE may then transfer to the Grant state 604 (e.g., RRC-CONNECTED state 604b of NR RRC equivalent state before transmitting UL data.

Thus, in accordance with various embodiments described herein, mechanisms for grant-less and grant based transmissions are disclosed. Grant-less and grant states are further described below. Examples of Grant-less and Grant operations with various state transitions between Grant-less and Grant are now described in further detail.

Turning first to Grant-less Operations, as shown in FIG. 4, in the Grant State, a device may cycle through a number of DRx cycles 404 and 406 after transmitting a small packet data 402, and then the device may transfer to the RRC_IDLE state 604a (FIG. 6). It is recognized herein that these timer-driven state transitions can make low duty cycle small data transfers inefficient.

Figure 7:
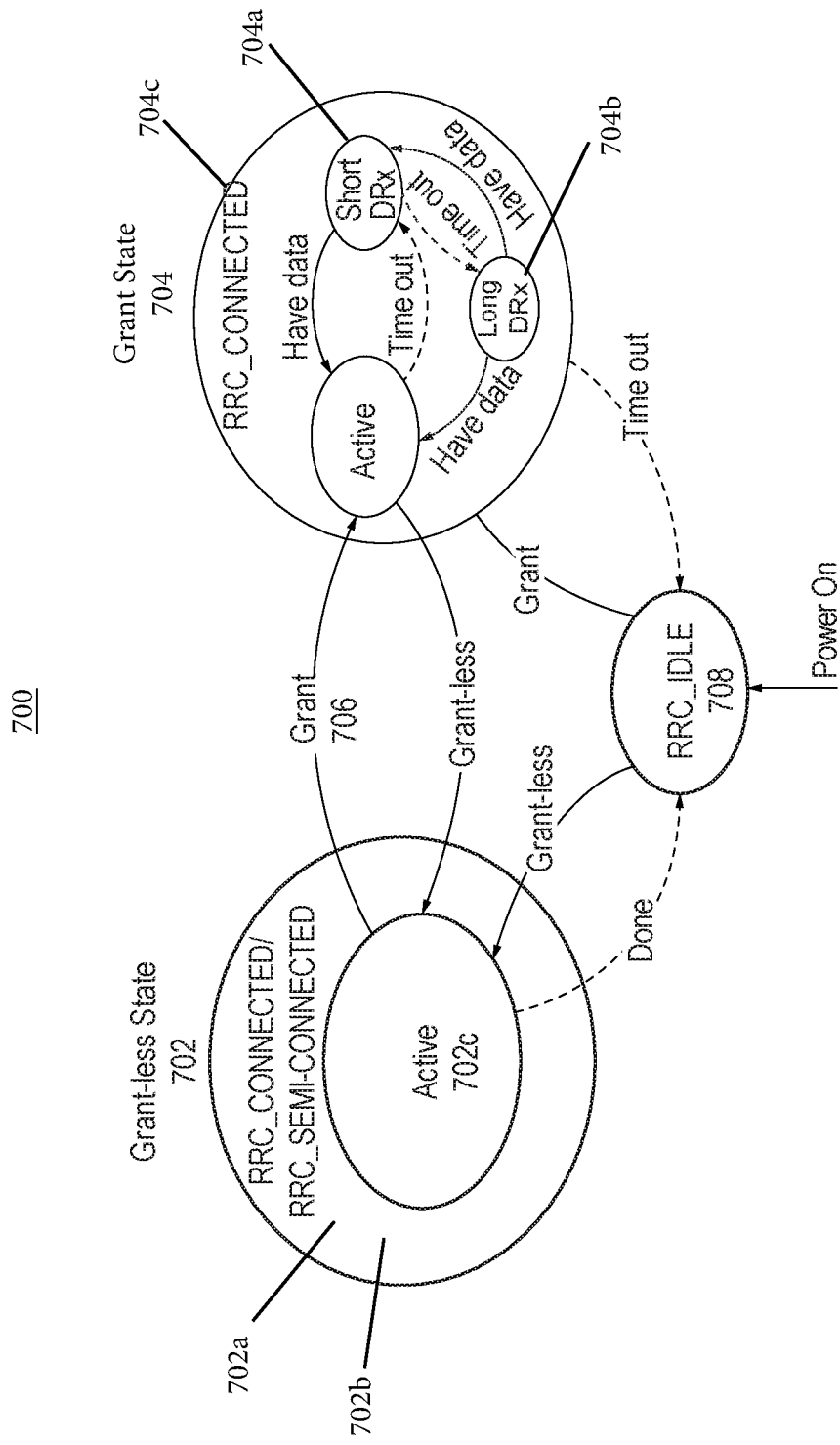
FIG. 7 shows example RRC operation states in accordance with another example embodiment.

Referring now to FIG. 7, another example dual-state operation 700 is shown. The dual state operation 700 may be implemented by a UE that can operate in a grant-less state (or mode) 702 and a grant state (or mode) 704. The dual-state operation 700 may allow the UE to transfer from the grant-less state 702 to the grant state 704 if the UE receives a Grant command 706 from its higher layer (e.g., NAS or application layer) or from an NR-node. As described above, the UE may be configured or directed to operate at the grant state 704, for example, for more frequent medium or high volume data communication. The higher layer or NR-node may configure the UE to operate in the Grant-less state 702, based on various information, such as, for example without limitation: service type, bearer type, traffic flow type, network slice type and/or requirements, physical layer numerology or frame structure in use, measurement report from UE (e.g., RSSI, RSRP, RSRQ, QCI, battery level, Buffer Status Report, etc.), QoS attributes, e.g. latency, reliability (e.g., bit error rate or packet error rate, guarantee UL bit rate, minimum UL bite rate, maximum UL bit rate etc.), and/or a request from UE to operate in such state.

In another example embodiment, the UE may autonomously transition between the grant-less state 702 and the grant state 704. The UE may make such a decision based on assistance information signaled to the UE through, for example, common RRC signaling or dedicated signaling (e.g., RRC unicast message or MAC CE signaling). Such a transition decision at the UE may be based on service type, bearer type, traffic flow type, network slice type, physical layer numerology or frame structure in use, measurement report from UE (e.g., RSRP, RSRQ, battery level, Buffer Status Report, etc.), QoS attributes (e.g., latency, reliability, guarantee UL bit rate, minimum UL bite rate, maximum UL bit rate), etc.

In some examples, the Grant-less state 702 may be a Registered state from the core network perspective, such that the core network is aware of information concerning the UE (e.g., UE context, current location of the UE in a cell, tracking area of the UE, etc.) The UE may be registered with the core network via an attach procedure to the core network. Alternatively, the UE may be configured and/or pre-registered by the system administration in a controlled and secured network. Therefore, the UE may be in a Core Registered state.

In some examples, the grant-less state 702 include a semi-connected state 702a or a connected state 702b from a core network perspective, where a signaling connection (e.g., NR S1-like) is maintained between the core network and the an NR-Node (RAN Node or apparatus). In some cases, the semi-connected state 702a may also be referred to as an inactive state. In some examples, radio resources and network resources have been allocated when the UE is in the semi-connected state 702a or the connected state 702b. In an example, a given UE is in the Connected state 702b if dedicated resources are allocated specifically to the UE. In an example, a given UE is in the semi-connected state 702a if dedicated resources are allocated to a group of UEs and the UE is authorized to share the resources of the group. Thus, in an example of the Semi-connected state 702b, a UE may share dedicated resources with other UEs.

The Grant-less state 702 include the Semi-connected state 702a and the Connected state 702b, such that a UE may in the semi-connected state 702a or the connected state 702b, from the perspective of the RAN, when the UE is in the grant-less state 702. When the UE is in the Connected state 702b, dedicated radio resources may be allocated specifically to the UE. For example, the resources may be pre-configured for the UE, such that the UE may conduct autonomous UL transmission without an explicit UL grant, using the resources. When the UE is in Semi-connected state 702, dedicated radio resources may be allocated to a group of UEs, and the UE may be authorized to share the radio resources. For example, in the Semi-connected state 702a, a UE may share the dedicated resources with other UEs via contention based radio network accessing.

To simplify the examples now described, the Semi-connected state 702a is often used for exemplary purposes, but the mechanisms proposed herein, unless otherwise specified, are applicable to both the Semi-connected state 702a and the Connected state 702b of the Grant-less state 702.

In the Grant-less state 702, the UE may perform RAN level registration toward the RAN. The UE identity for such registration may be a RAN level identity or a core network level identity. In some cases, the procedure for such registration may be RAN specific and therefore transparent to the core network. The UE reachability status and/or mobility status in Grant-less state 702 may be maintained in the RAN. In the Grant-less state 702, in some cases, mobility may be UE controlled mobility with assistance (information) from the NR-node.

In some cases, the transition between the Grant state 704 and the Grant-less state 702 state may be determined by the UE, for example, by sending a request to the NR-node after meeting certain criteria for the state transition. The state transition criteria may be based on the following information, presented by way of example and without limitation: service type, bearer type, traffic flow type, network slice type and/or requirements associated with the UE, physical layer numerology or frame structure that a UE is capable of or configured with, measurement or status collected by a UE (e.g., RSSI, RSRP, RSRQ, QCI, battery level, Buffer Status Report, etc.), and/or data transceiving QoS requirements of the UE (e.g., latency, reliability such as bit error rate or packet error rate, guarantee bit rate, minimum and/or maximum bite rate, etc.).

As described above, and as illustrated in FIG. 7, in some cases, the UE transfers from an RRC_IDLE state 708 to the semi-connected state 702*a* (RRC_SEMI-CONNECTED) when there is data to receive or transmit, and then the UE may transfers back to the RRC_IDLE state 708 state immediately after receiving or transferring, for example, small data. Thus, the UE does not have to go through Short DRx 704*a* and Long DRx 704*b* cycles for returning back to the RRC_IDLE state 708, as it might in the Grant state 704. This reduced signaling and cycles as compared the Grant state 704, for example, may improve latency and battery life.

In some cases, while operating at the RRC_IDLE state 708, the UE operates in power saving mode that uses less power than the Sleeping mode for DRx cycles 704*a* and 704*b*. In an example, the various UE context, as described above, may be contained at NR-node to avoid message exchanges with the Core network (CN) for re-establishing the radio connection or bearer when transferring from the RRC_IDLE state 708 to an active state 702*c* (e.g., semi-connected state 702*a*). In some cases, while operating at the Active state 702*c*, for instance while operating at the semi-connected state 702*a* of the grant-less mode 702, the UE stays at high power for transmitting or receiving until an ACK or NACK is received, or until a timer expires. When the ACK or NACK is received, or the timer expires, the UE may return directly to the RRC_IDLE state 708 directly without going through the DRx cycles as in the RRC_CO-NNECTED state 704*c* of the Grant state 704, thereby avoiding unnecessary DRx cycles for a sporadic small data transmission, and reducing signaling for improved latency and battery life performance.

In an alternative embodiment, the Grant-less state 702 might not include data transmission. The Grant-less channel resources in this case may be used to request resource allocation for predefined specific services, such as URLLC services for example. When the UE is granted resources via the response front a NR-node, the UE may then transfer to the grant-state 704 (e.g., RRC-CONNECTED 704*c* of Grant state 704) before transmitting (UL) data for ultra-reliability.

Turning now to fast synchronization for Grant-less UL Transmissions, for mMTC devices' small packet transmissions, overhead and delay due to current Random Access Channel (RACH) procedures might be excessive. To avoid such cost, RACH-less grant-less UL transmission may further reduce the required signaling load in both DL and UL for simultaneously active UEs accessing the radio network. For URLLC devices, it recognized herein that it is desirable to be able to initiate UL transmission whenever an urgent UL packet occurs at a UE, and therefore RACH-less and grant-less UL transmissions may reduce the signaling overhead to further accelerate UL data transmission. The RACH-less and grant-less UL accessing schemes described herein, in some cases, reduce the number of required signaling messages exchanged between the radio access network and a UE, thus providing the potential to accelerate the data transmission with reduced latency for URLLC devices, and also to reduce the required energy consumption for the mMTC devices (e.g., due to shorter radio on time). This may also lead to an increase in the number of UEs that can simultaneously access the radio network, thereby increasing the system capacity.

In some cases, contention-based grant-less access may provide the option to transmit a UL data packet immediately after DRx, for example, by omitting the Random Access procedures. In LTE, however, UL synchronization is achieved by Random Access procedures, where an eNodeB estimates the initial Timing Advance from the PRACH sent by the UE. The PRACH is used as a timing reference for uplink during UE's initial access. The eNodeB sends a Timing advance command in a Random Access Response (RAR). Once the UE is in connected mode, the eNodeB keep estimating Timing Advance and sends a Timing Advance Command MAC Control Element to the UE, if correction is required. In examples, as long as a UE sends some uplink data (PUSCH/PUCCH/SRS), the eNodeB can estimate the uplink signal arrival time, which can then be used to calculate the required Timing Advance value. Using the Broadcast messages sent by a NR-node, in some cases such as grant-less access, a given UE is DL synchronized but not UL synchronized. It is recognized herein that UL synchronization is critical in some cases, for example, when a cell covers a certain distance.

In some examples, to achieve UL Synchronization with respect to a particular eNB, a UE may be required to send UL frames with a Timing Advance (TA) to align with the eNB's time frame in an LTE system. But, in some cases, the Timing Advance (TA) is unknown, and tight UL synchronization among the UEs achieved via the RACH procedure might not be possible. In some cases, however, a certain level of synchronization may still be needed for OFDM based NOMA access schemes. In accordance with various embodiments, fast synchronization for RACH-less and grant-less UL transmissions reduce latency for URLLC devices, and reduce signaling for mMTC devices.

Figure 8:
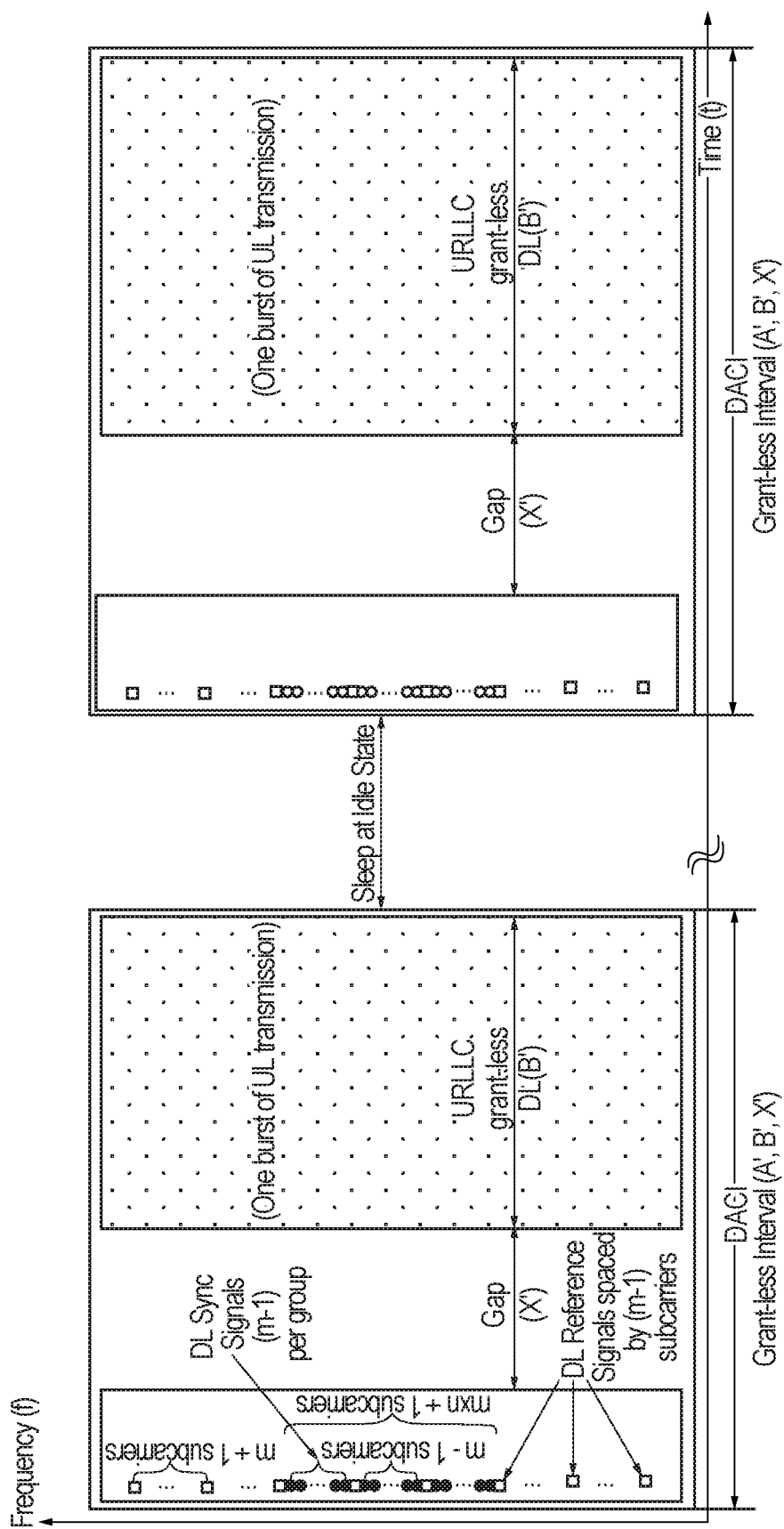
FIG. 8 depicts downlink synchronization and reference pilots.
Figure 9A:
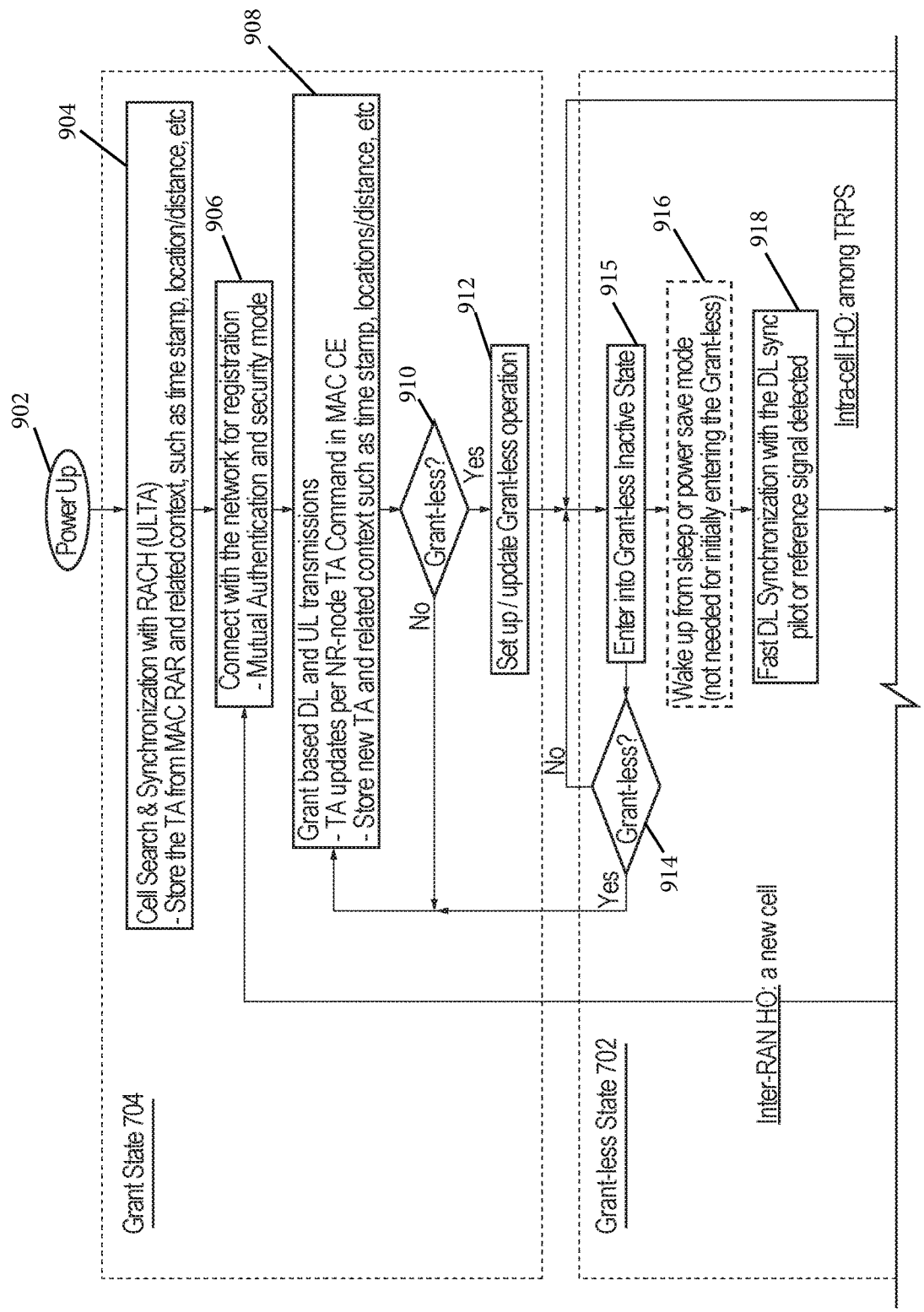
FIGS. 9A and 9B depict a flow chart for grant-less operation with fast synchronization in accordance with an example embodiment.
Figure 9B:
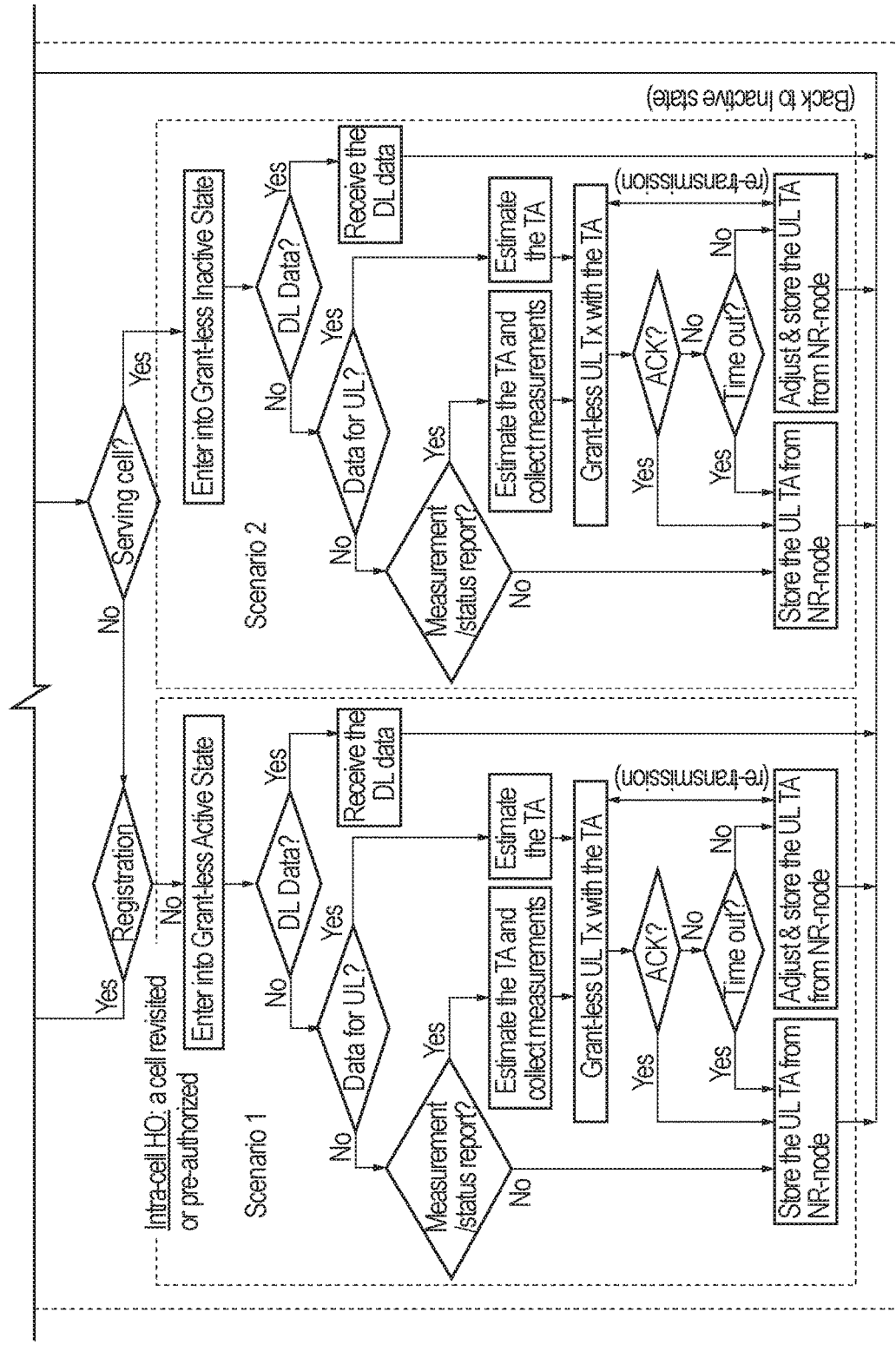

Referring generally to FIG. 8, where the DL synchronization signal and DL Reference Signal are illustrated within a grant-less Interval, and in particular to FIGS. 9A and 9B, where the UL TA is estimated with the DL synchronization signal and/or the DL Reference Signal, in one example, at 902, a UE powers up. At 904, the UE conducts cell search and synchronization after powering up. At 906, the UE may connect with a RAN to register to the RAN. At 908, the UE is in the grant state (e.g., grant state 704), and the UE may send and receive grant-based UL and DL messages, respectively, over the network. On 910, the UE determines, or is instructed by the radio network, whether it has UL data that should be sent using the grant-less mode, for instance the grant-less mode 702. If it does, at 912, the UE sets up or updates its grant-less operations. At 915, the UE enters into the grant-less inactive state, which may also be referred to as the semi-connected state 702*a*. The UE may remain at the Grant-less Inactive State while sleeping, for example, until it receives a notice that new UL data is ready for transmission. Then the UE may switch from the Grant-less Inactive state to the Grant-less Active State, at 918, using fast synchronization with a grant-less DL Synchronization Signal, as also shown in FIG. 8, for DL synchronization to decode the DL control message, and for UL synchronization for frequency subcarrier and the time self-contained Interval (A', B', X') boundaries.

With respect to fast synchronization in the uplink, various scenarios are considered for purposes of example. In one example scenario (Scenario 1 in FIG. 9B) the UE has only achieved DL synchronization via the DL reference signal or control pilot, but has never acquired UL synchronization via a UL random access operation. For example, the UE may select/reselect a new cell or Transmission and Reception Point (TRP) under the current serving cell, and may already have a valid stored grant-less UL transmission configuration through previously visited cells or through pre-authorization for accessing, which may refer to a pre-configuration by factory or operator provisioning, DM-OTA configuration by service administrator, etc. In this scenario, the new cell or TRP may already have the UE context (e.g. the previous serving cell or TRP forwarded the UE context to the new target cell in the forward handover procedure), and the UE may be in the Grant-less Inactive state and initiate grant-less UL transmission without RACH procedures.

In another example scenario (Scenario 2 in FIG. 9B), in addition to DL synchronization, the UE also has acquired UL synchronization initially. For example, the UE may have executed a UL random access operation as part of an initial RRC connection procedure in the new cell, and also acquired UL synchronization in the cell before transitioning into the grant-less Inactive state.

Referring also to FIG. 11, the UL TA estimation may be conducted with the different schemes for scenario 1 and 2 illustrated in FIG. 10B. In one example, with respect to scenario 1, the UE never obtained UL synchronization in the new cell/TRP prior to the grant-less UL transmission. The UE may use various mechanisms, in accordance with various embodiments, to achieve fast UL synchronization with the estimated TA. In an example, the UL TA may be estimated from cell(s)/TRP(s) in which the UE has previously visited. For example, the UE may evaluate the most recent UL TA(s) and the related distance from the cell/TRP obtained previously by the UE from visited neighbor cell(s)/TRP(s), or from visited cell/TRP as a subset of cells/TRPs configured for the purpose of a timing advance reference. These timing advance references may be referred to as a Grant-less TA Cell Group. A time difference between the current serving cell and the neighboring cells' UL TA may be stored on the UE. For example:

$$UL\_TA\_estimated = UL\_TA\_visited + delay\_visited\_to\_serving + adjustment \text{ (distance difference)}$$

Figure 10:
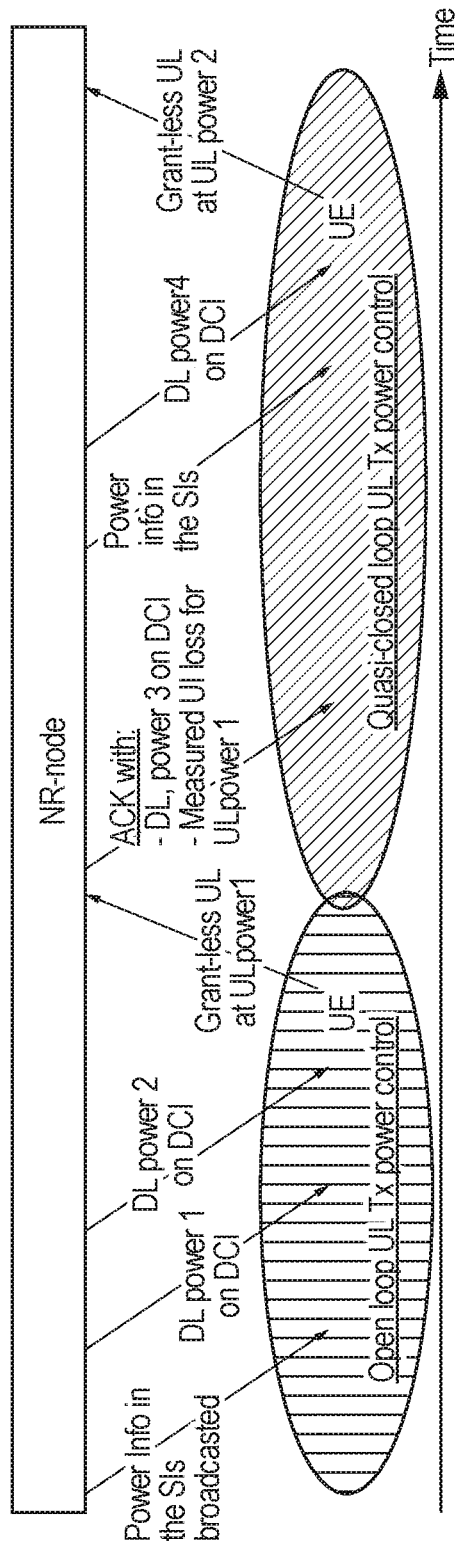
FIG. 10 depicts an example of open loop transmit power control for grant-less UL.

In an example, the UE may estimate DL propagation delay using a DL synchronization pilot or reference signal, as shown in FIG. 10, and the DL Time Stamp from the NR-node carried on DCI or a DL message header from the MAC layer or higher layer. For example:

$$DL\_delay = DL \text{ sync pilot or reference signal arrival time at } UE\text{-}DL \text{ time stamp from } NR\text{-}node,$$

$$UL\_TA\_estimated = 2 \times DL\_delay$$

Thus, the UE may estimate DL propagation delay using DL path loss. In some cases, assuming free space path loss, the UE may estimate the DL propagation delay by estimating the path loss if the UE knows the DL grant-less synchronization transmit (Tx) power at the NR Cell/TRP (network node). The UE may be configured with the Tx Power of the DL grant-less synchronization at the network node. In an example, the UE knows the received power of the DL synchronization reference signal through its own measurement of the DL synchronization reference signal. Furthermore, the UE may refine further the estimate of the DL propagation delay with deployment specific configuration parameters to take into account a deployment specific path loss model. For example, the NR Node (e.g., eNB) may configure the UE with a path loss offset. The UE may apply this offset to the free space path loss to take into account deviation between free space path loss and the actual deployment specific path loss model.

In example Scenario 2 depicted in FIG. 9B, in addition to DL synchronization, a UE also acquires UL synchronization with the serving cell/TRP before transitioning to the Grant-less Inactive state. The UE may have received an initial TA or multiple updated TA values from the serving cell/TRP before it transitions into the Grant-less Inactive state. In one embodiment, the UE estimates the DL propagation delay, DL_delay, using the method described above with respect to scenario 1. For example, the UE may estimate the DL propagation delay during the RACH procedure, or by using the time stamp or location context stored from a previous TA update operation. The UE may then computes the UL TA correction, UL_TA_correct, with the UL TA from previous RACH or the TA update operation, UL_TA_ref as follows, for example:

$$UL\_TA\_correct = UL\_TA\_ref - 2 \times DL\_delay$$

The UE may estimate new UL TA (UL_TA_new) with the DL delay (DL_delay_current) estimated at the current location, and the UL TA correction (UL_TA_correct) estimated as described above, for example:

$$UL\_TA\_new = 2 \times DL\_delay\_current + UL\_TA\_correct$$

In some cases, the estimation of the DL propagation delay and the computation of the UL TA correction may be repeated each time the UE performs a random access procedure or receives a UL TA update. The UL TA update may be received from MAC CE or from DL DCI after UL transmissions in the Grant state.

In some cases, the UE may be triggered to determine the TA or update the TA stored on the UE. For example, and without limitation, a need to transmit grant-less data may trigger the TA to be determined or updated, a reception of a grant-less DL synchronization signal may trigger the TA to be determined or updated, or the execution of a random access procedure in the Grant state may trigger the TA to be determined or updated. In another example, the UE may receive an updated TA from the NR-node after the transmits UL data in the Grant State. In another example, an update to the propagation delay correction factor delta is made as result of the execution of a random access procedure (e.g., Scenario 2 in FIG. 9B), which may trigger the TA to be determined or updated. In yet another example, the UE is configured with a TA timer, and when the TA timer expires, the TA is triggered to be updated, such that the TA is updated periodically.

Turning now to Transmit Power (TP) Management for Grant-less UL Transmission, the contention based grant-less UL transmissions with infrequent small data are infrequent UL bursts, which may prohibit the conventional closed loop Transmit Power Control (TPC) for continuous communications. It is recognized herein, however that transmit power control for grant-less UL transmissions may still critical for, among other functionality, ensuring proper signal strength at the NR-node receiver to meet the reliability performance requirement for URLLC devices, and for limiting interference to other UEs in a multi-user accessing scenario to enable the required system capacity for mMTC devices.

Figure 11A:
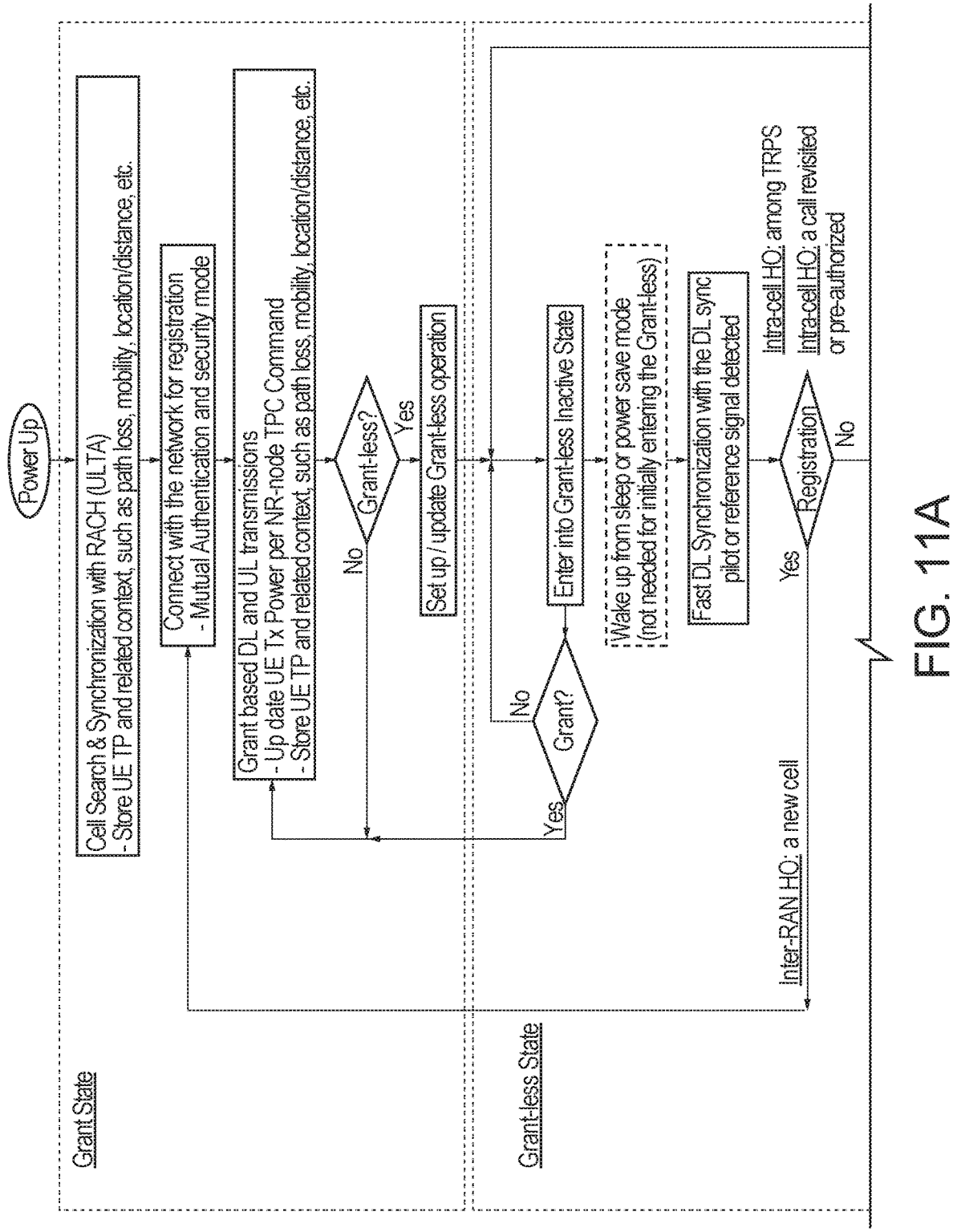
FIGS. 11A and 11B depict a flow chart for grant-less operation with open loop power control in accordance with an example embodiment.
Figure 11B:
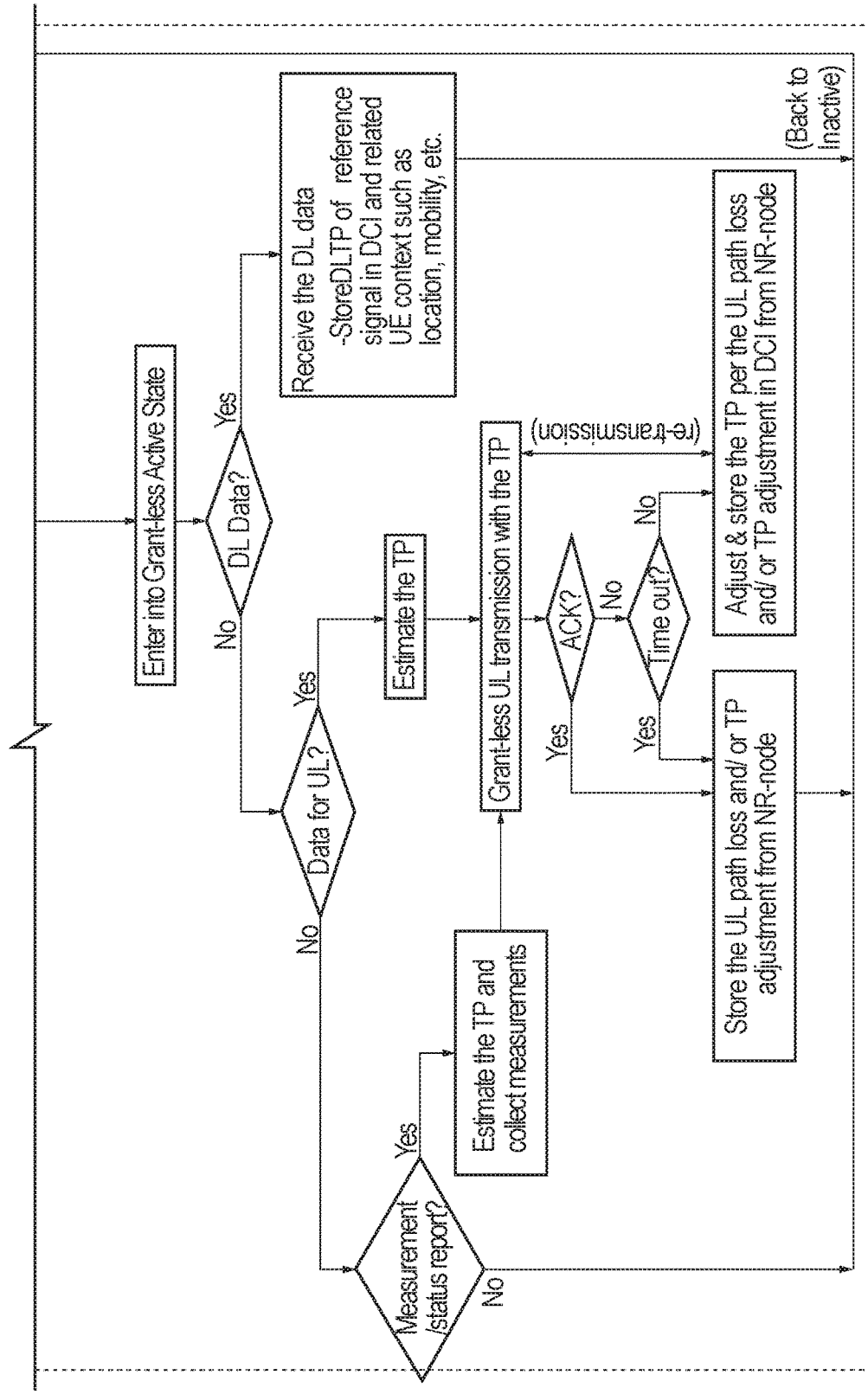

In an example embodiment, referring to FIGS. 11A and 11B, the NR-node's TP level associated with the downlink synchronization signals or reference signals is indicated to a UE on the DL Control Information (DCI) element (e.g., the DCIs for grant-less UL may contain DL TP information used for the DL synchronization or reference signal). The UE may calculate the DL path loss with the measured synchronization or reference signal power and the related TP carried on the DCI. In one example:

DL path loss=DL TP−Signal strength at UE Rx

The UE may calculate the UL path loss based on the DL path loss. In one example:

UL path loss=DL path loss

In some examples, a power adjustment may be based on the UE's history of path loss and/or TP levels (e.g., weighted or unweighted moving averaged power level). The power adjustment may further be based on the related UE context such as, for example, location, mobility, etc. The power adjustment may also be based on UL resources and a related Modulation and Coding Scheme (MCS). In one example:

UL power level=min. {UL path loss+adjustment (UL TP1, UL TP2, . . . , total UL resources and MSC), max. Tx power}

In some cases, if there is no DL signal to measure prior to the grant-less UL transmission, for example, then the UE's grant-less UL TP level may be estimated based on the history of grant-less UL transmit power levels. The NR-node may include the measured grant-less UL path loss or TP adjustment on its DL ACK or any other DL feedback message to the received grant-less UL message. This may be used by the UE to calculate the next grant-less UL transmit power level, such that a quasi-closed loop power control is defined. In one example:

UL power level=min. {UL path loss+adjustment (previously measured UL path loss or TP adjustment, total UL resources and MSC), max. Tx Power}

Referring now to FIGS. 12A to 13B, an example system 2500 is shown which includes an mMTC UE 2502, an NR-node 2504, and a core network (CN) 2506. The NR-node 2504 comprises a RAN slice management function or apparatus (node) 2508 and an mMTC slice 2510. The CN 2506 includes a CN Slice Management function or apparatus (node) 2512 and an mMTC slice 2514. The mMTC 2514 may include a mobility management node or apparatus 2516, gateways 2518 (e.g., SWG, PGW) and a subscription management function or apparatus (node) 2520 (e.g., HSS). It will be appreciated that the example system 2500 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 12A to 13B, and all such embodiments are contemplated as within the scope of the present disclosure.

Figure 12A:
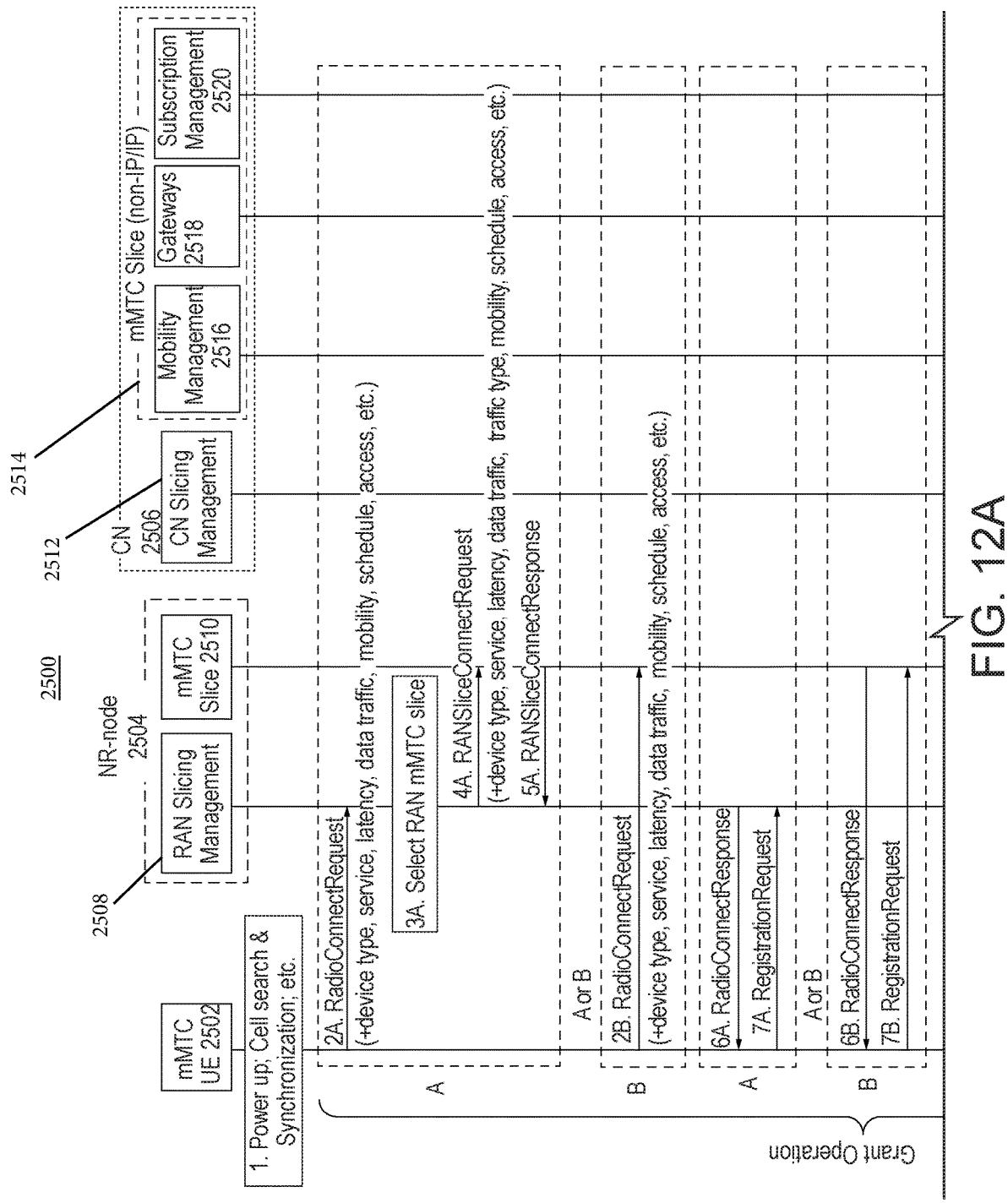
FIGS. 12A-13B depict a call flow for grant-less UL transmission for mMTC devices in accordance with an example embodiment.

Referring in particular to FIG. 12A, at 1, in accordance with the illustrated example, the UE 2502 after power up. After powering, the UE 2502 may conduct cell search and synchronization, and then the UE may acquire system information, for example, from MIB and SIBs. At 2, the UE 2502 sends a Radio Connection Request to the NR-node 2504. In particular, the UE may send Radio Connection Request message to the RAN slicing management apparatus 2508 (at 2A) or the mMTC slice 2510 (at 2B). The request may be a request for access to a UE selected RAN slice 2510 at the NR-node 2504. The request may include various context information associated with the UE 2502. The context information may include, for example and without limitation, a device type (e.g., mMTC, URLLC) of the UE 2502, a service associated with the UE 2502 (e.g., forest fire monitoring or traffic monitoring), a latency requirement (e.g., 100 ms or ultra-low latency of 0.5 ms, data traffic context (e.g., data packet size or data rate), a traffic type (e.g., non-IP or IP based); mobility context associated with the UE 2502 (e.g., static, pedestrian, vehicular), a planned schedule of data transmissions from the UE 2502, type of access that can be performed by the UE 2502 (e.g., grant access, grant-less access, or access that switches between grant and grant-less). In some cases, operations 3, 4, and 5 are not performed when the UE selects the slice 2510.

In some cases, for example when the UE 2502 does not select a slice, the RAN Slicing Management 2508, at 3A, selects the slice 2510 as the UE's radio accessing slice, for example, based on the UE context in the request at 2A. The selection may further be based on RAN traffic loading and resource allocations. At 4A, in accordance with the illustrated example, the RAN Slicing Management 2508 sends a RAN Slice Connection Request to the mMTC Slice 2510 that was selected. The request may also forward all or some of the UE's context from 2A, so that a radio connection can be established between the UE 2502 and the mMTC slice 2510. At 5A, the mMTC Slice 510 may send a RAN Slice Connection Response to the RAN Slicing Management 2508. The response may indicate whether the slice connection request has been accepted. If the request is rejected, the one or more reasons for the rejection may be included in the response message.

At 6, in accordance with the illustrated example, the RAN Slicing Management 2508 (at 6A) or the mMTRC Slice 2510 (at 6B) sends a RAN Slice Connection Response to the UE 2502. In this message, the RAN Slice Management 2508 or the RAN mMTC Slice 2510 may confirm whether the radio connection request has been accepted. If the request is rejected, one or more reasons for the rejection may also be included in the response message. In the illustrated example, the UE 2502 receives a confirmation that a successful radio connection with the mMTC Slice 2510 has been established. At 7, the UE may send a registration request to the RAN Slicing Management 2508 (at 7A) or the RAN mMTC Slice 2510 (at 7B). The registration request may be sent to establish a secured service connection with the Core Network (CN) 2506.

Figure 12B:
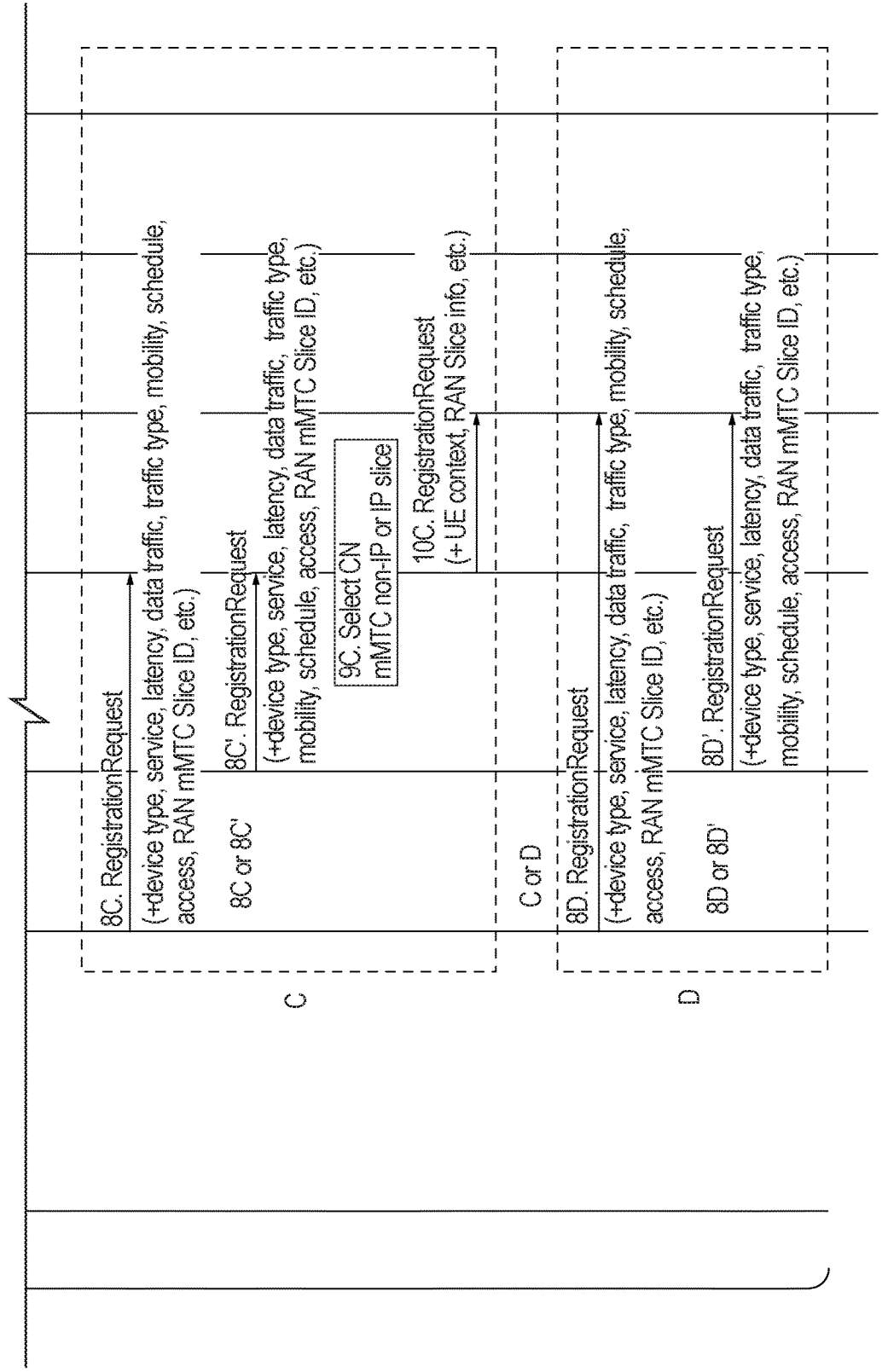

Referring now to FIG. 12B, at 8, the registration request is sent to CN Slicing Management apparatus 2512 (8C and 8C') or the CN mMTC slice 2514 (8D and 8D'). The request may be sent by the RAN Slicing Management 2508 (8C and 8D) or the mMTC Sliced 2510 (8C' and 8D'). The request may include the context information associated with the UE, information associated with the mMTC slice 2510, such as the slice ID for example. In some cases, operations 9 and 10, which are now described, are skipped when the NR-node 2504 selects the CN slice 2514. At 9C, in accordance with the illustrated example, the CN Slicing Management apparatus 2512 selects the mMTC IP traffic slice 2514, for example, based on the UE context, the RAN mMTC Slice 2510, traffic loading of the CN 2506, available mMTC slices, or the like. At 10C, in accordance with the illustrated example, the CN Slicing Management node 2512 sends a registration request to the Mobility Management node 2516. The Registration Request may include the UE's context information and information associated with the RAN mMTC Slice 2510.

Figure 13A:
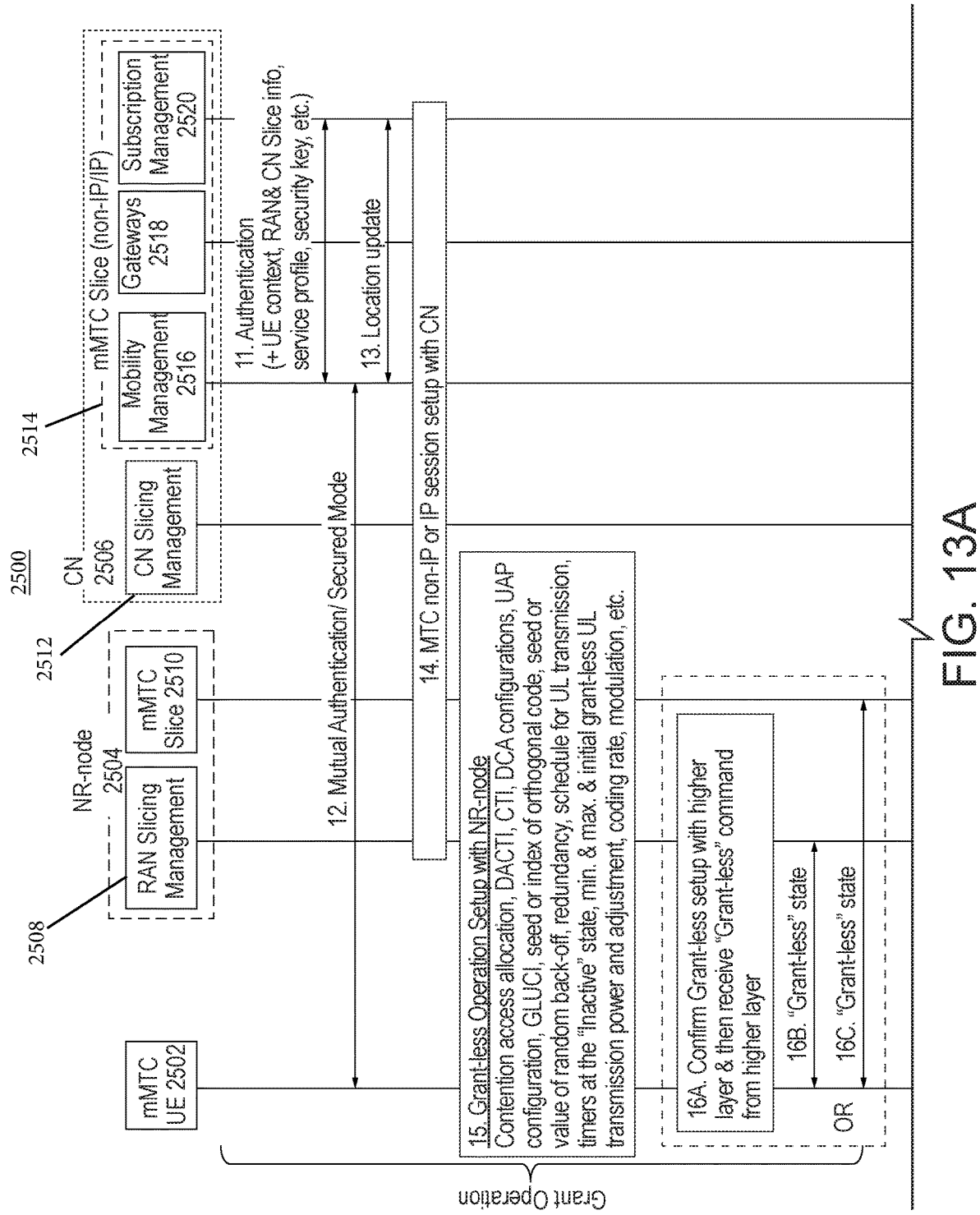
Figure 13B:
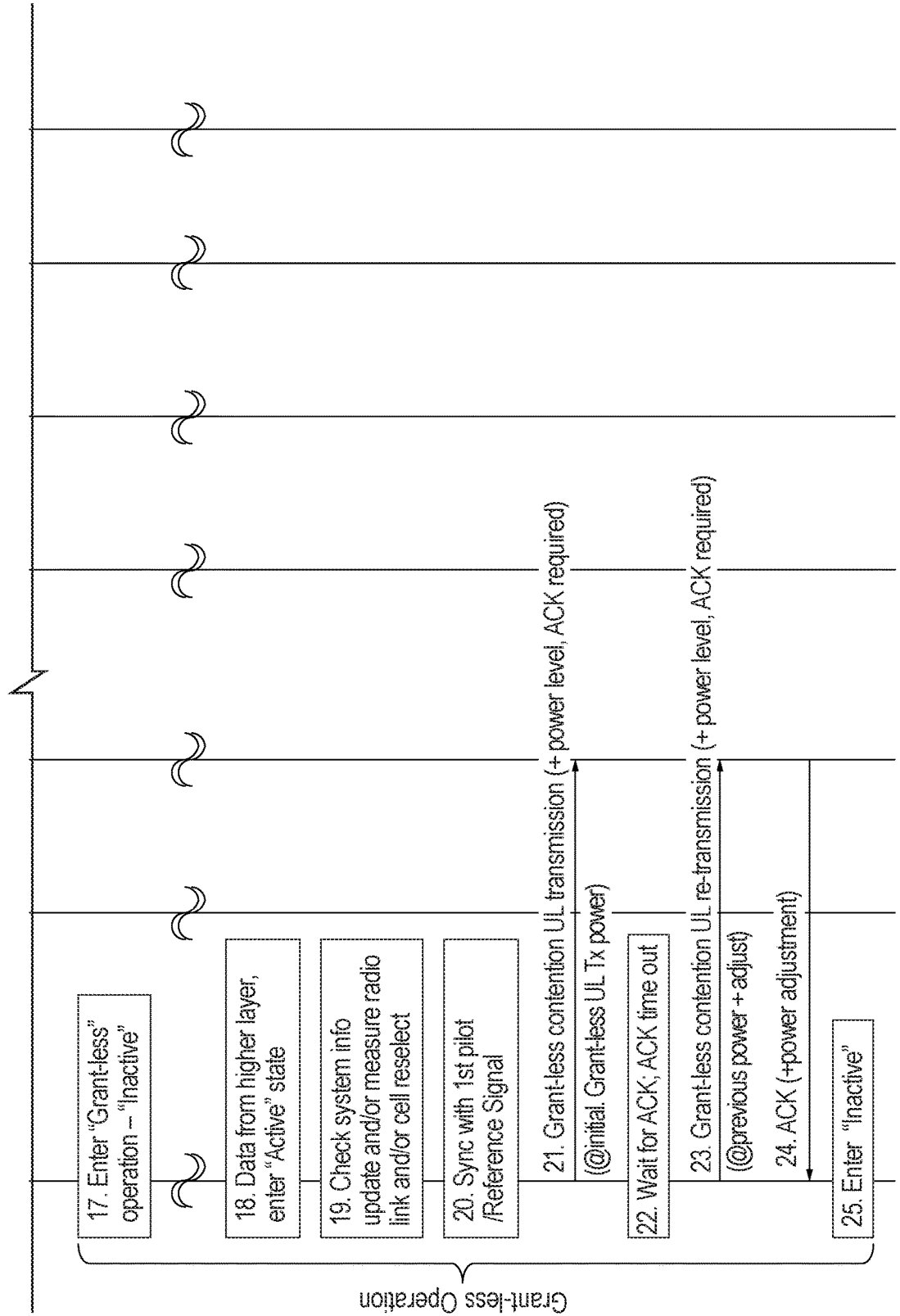
Figure 14A:
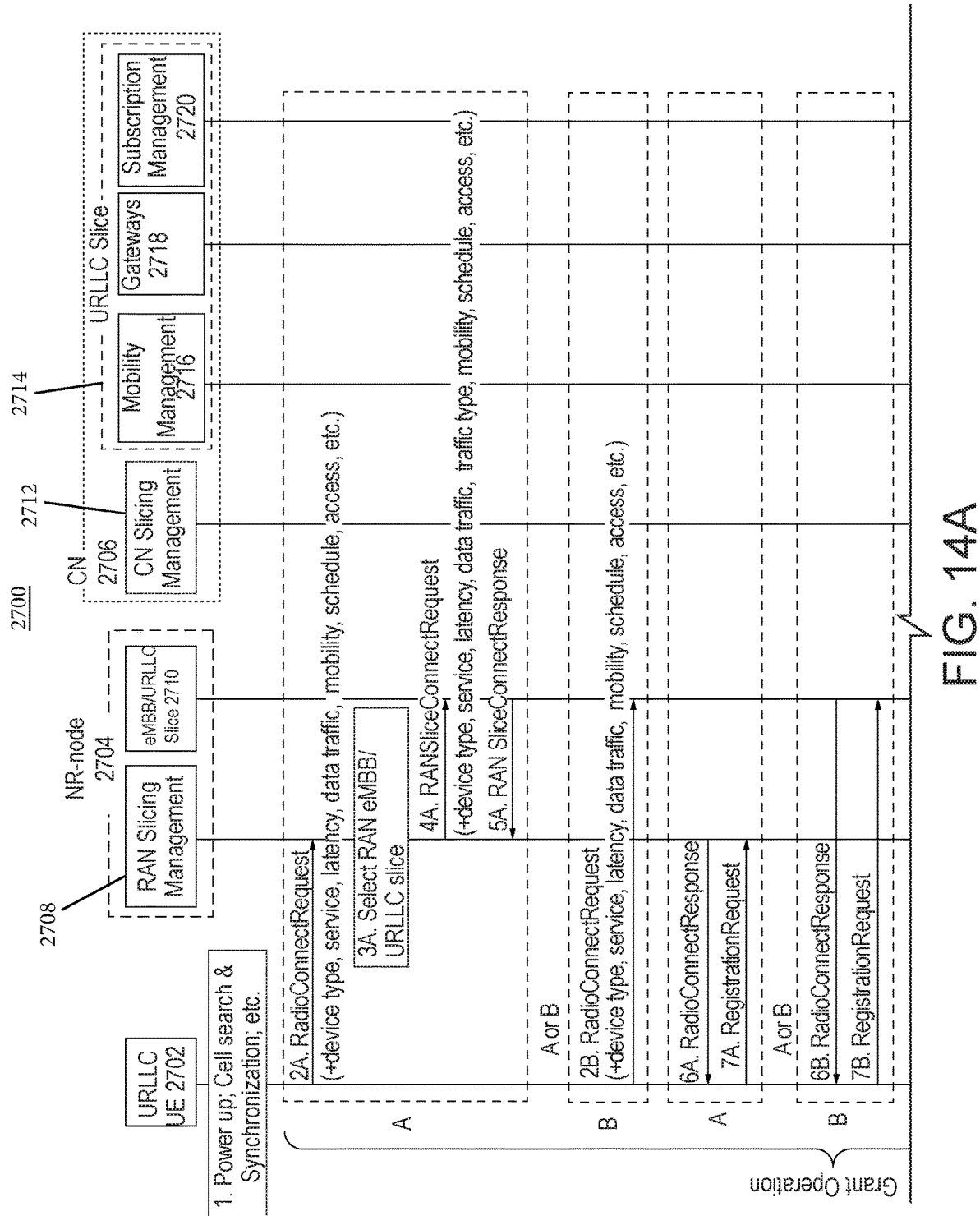
FIGS. 14A-15B depict another example call flow for grant-less UL transmission for URLLC devices in accordance with another example embodiment.
Figure 14B:
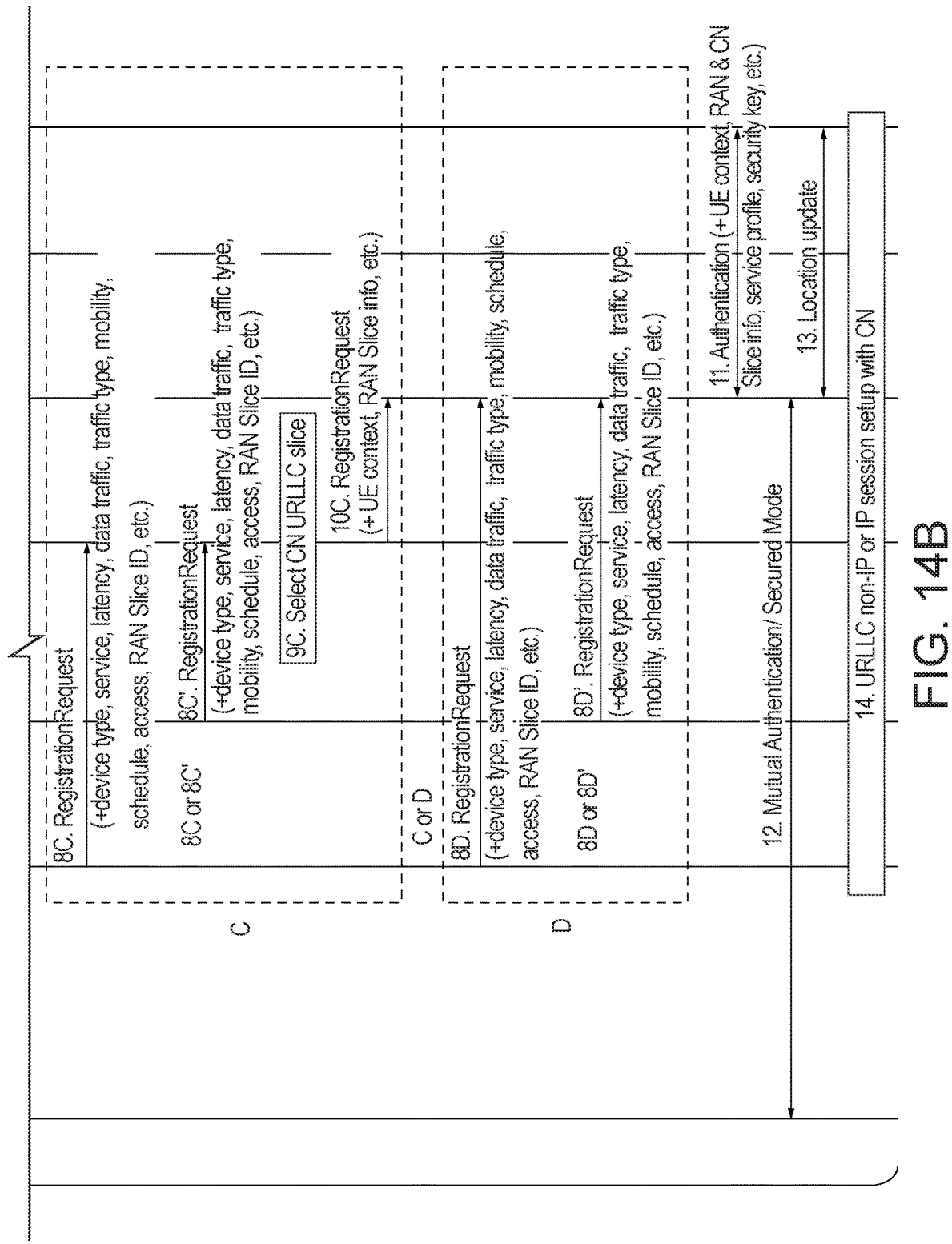
Figure 15A:
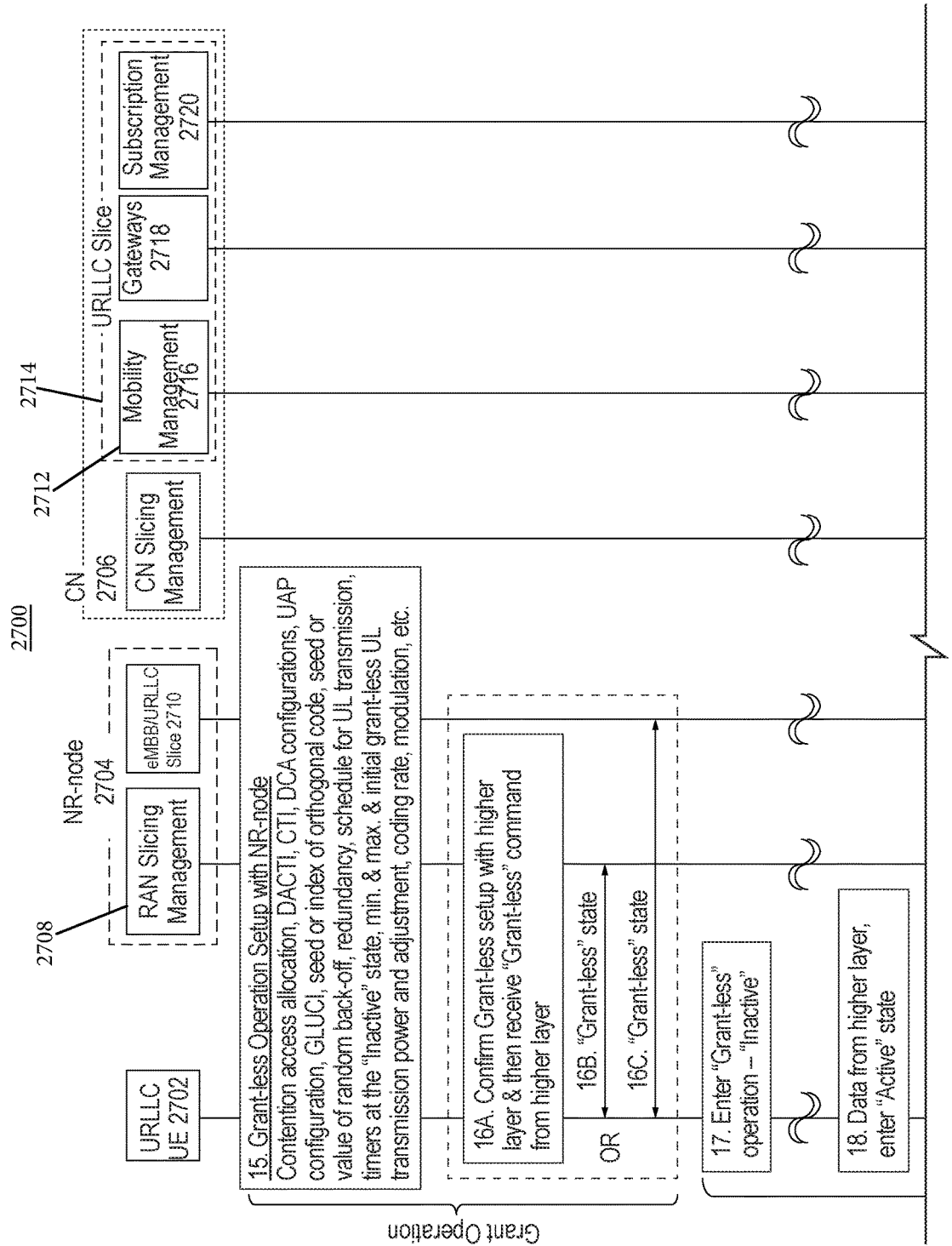
Figure 15B:
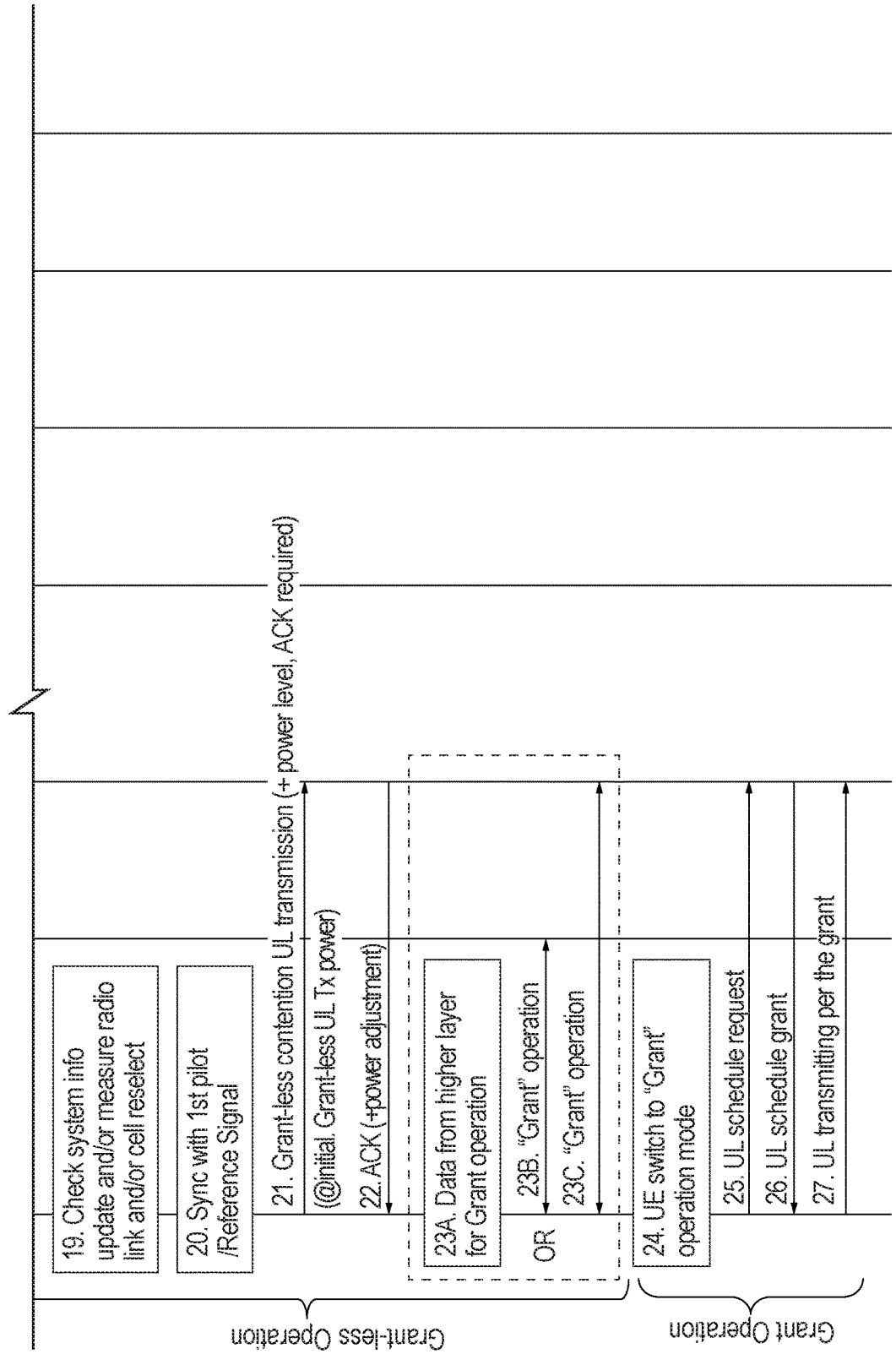

Referring now to FIG. 13A, continuing with the illustrated example, at 11, the Mobility Management node 2516 exchanges messages with the Subscription Management node 2520, so as to authenticate the UE 2502 for access to services. After the authentication, at 12, the Mobility Management node 2516 exchanges messages with the UE 2502, such that the UE 2502 and the Mobility Management node 2516 mutual authenticate each other, and then establish a Secured Mode between them. At 13, in accordance with the illustrated example, the Mobility Management node 2516 may exchange messages with the Subscription Management node 2520, so that a location of the UE 2502 is updated. Location Update: Mobility Management exchanges messages with the Subscription Management for Location Update. At 14, an IP session may be established between the RAN mMTC slice 2510 and the CN mMTC slice 2514. The IP session may also be established within the CN mMTC slice 2514.

With continuing reference to FIG. 13A, in accordance with the illustrated example, at 15, grant-less operations are setup. The NR-node 2504, in particular the -RAN mMTC Slice 2510, may exchange messages with the UE 2502 to configure the Grant-less operation parameters described herein, for example. Example parameters include, without limitation: contention access allocation parameters; grant-less configuration parameters (e.g., DACTI, CTI, DCA, UAP, GLUCI, etc.); seed or index of the orthogonal code for code-domain multiple accessing; seed or value of the random back-off for priority collision avoidance contention access; redundancy parameters for reliable transmissions; timers at the Inactive state (e.g., for listening to a broadcasting channel for pages or for system information changes, for conducting measurements for the radio link management, for updating statuses related to reachability and mobility, etc.); grant-less power control values (e.g., minimum and maximum UL transmission power levels and incremental adjustments, which may be calculated by the NR-node 2504 based, at least in part, the path loss and required received signal quality during the message exchanges described above between the UE 2502 and the NR-node 2504); parameters related to a schedule for grant-less UL transmissions; a coding rate; modulation scheme, etc.

At 16A, in accordance with the illustrated example, the UE 2502 confirms the grant-less configuration (allocation) with a higher layer of the UE 2502 as compared to the physical layer. Alternatively, or additionally, the UE 2502 may confirm the Grant-less setup with the NR-node 2504, in particular the RAN Slicing Management node 2508 (at 16B) or the mMTC slice 2510 (at 16C). Accordingly, the UE 2502 may receive an entering "Grant-less" operation mode command from the higher layer or from the NR-node 2504. At 17, the UE 2502 enters into an inactive state of the Grant-less operation mode. The inactive state may be preconfigured. In some cases, the inactive state may be triggered by the higher layer or the NR-node's command to operate in Grant-less mode after registration. In some cases, the UE 2502 may automatically enter the inactive state in Grant-less operation mode if configured to do so. At 18, in accordance with the illustrated example, the UE 2502 receives data from the higher layer that it needs to transmit in an UL transmission. Example data includes, without limitation, "keep alive" small data, measurement data, data associated with a reachability and mobility status of the UE 2502, or the like.

At 19, the UE 2502 may need to check system information on a broadcast channel. By way of further examples, at 19, the UE 2502 may need to conduct a radio link measurement, or select a new cell based on system information or results of the radio link measurement. At 20, in accordance with the illustrated example, the UE 2502 synchronizes with reference signals or an available synchronization pilot, for instance the first available synchronization pilot, at the symbol timing boundary for allocating a contention access area.

At 21, in accordance with the illustrated example, the UE 2502 sends a grant-less UL transmission to the NR-node 2504, in particular the RAN mMTC slice 2510. In some cases, the UE 2502 may conduct contention access for the grant-less UL transmission (without redundant versions) at the initial UL transmitting power, which may defined at the Grant-less setup stage (at 15) or signaled by the NR-node 2504 via System Information broadcasting or RRC signaling. In some cases, the UE 2502 may indicate if an acknowledgement (ACK) is required for this transmission at the transmitting power level. The UE 2502 may also include radio link measurements, a reachability or mobility status, or other information with the UL data transmission at 21. At 22, the UE 2502 may wait for an ACK response, to its UL transmission, from the mMTC slice 2510. The UE 2502 may wait until an ACK timer expires if, for example, an ACK is required. At 23, in accordance with an example, the UE 2502 conducts a retransmission of the UL message. The UE 2502 may conduct contention access again, for example, if reliable transmission is required for its grant-less UL data. At 24, in accordance with the illustrated example, the NR-node 2504, in particular the mMTC slice 2510, sends an ACK message to the UE 2502 that indicates that the UL transmission from the UE 2502 was successfully received. The message at 24 may also include a power adjustment value for the UE's next grant-less UL transmission, thereby providing quasi-closed-loop Power Control. At 25, the UE 2502 may enter an inactive state of grant-less operation mode. The inactive state generally refers to a state in which the UE is not transmitting. The inactive state may be preconfigured or triggered by the higher layer's command after a grant-less UL transmission. The inactive state may also be triggered when the UE 2502 or receives an ACK from the NR-node 2502, for example, when an ACK is required for the transmission. In some cases, the UE 2502 may automatically enter the inactive state after a grant-less UL transmission, if, for example, the UE 2502 is configured to do so.

Referring also to FIGS. 14A to 15B, an example of grant-less UL transmission for URLLC devices is illustrated. An example system 2700 is shown which includes an URLLC UE 2702, an NR-node 2704, and a core network (CN) 2706. The NR-node 2704 comprises a RAN slice management function or apparatus (node) 2708 and a RAN URLLC slice 2710. The CN 2706 includes a CN Slice Management function or apparatus (node) 2712 and an URLLC slice 2714. The URLLC slice 2714 may include a mobility management node or apparatus 2716, one or more gateways 2718 (e.g., SWG, PGW) and a subscription management function or apparatus (node) 2720 (e.g., HSS). It will be appreciated that the example system 2700 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIGS. 14A to 15B, and all such embodiments are contemplated as within the scope of the present disclosure.

The example embodiment for URLLC devices illustrated in FIGS. 14A to 15B may be similar to the example embodiment for mMTC devices described above, and therefore similar operations are described with reference to FIGS. 12A to 13B. With respect to URLLC devices, however, that the context information associated with the UE 2702 may include a value that indicates that the UE 2702 can switch between grant and grant-less operations. Further, an eMBB/URLLC slice may be selected at the NR-node 2704 in order to optimize the overall system resource utilization. In an example, the URLLC slice 2714 is selected to meet short latency requirements across the system (core network 2706) 2700. In some examples, the UE 2702 conducts its grant-less UL transmission with redundancies. For example, the UE 2702 may send multiple transmissions at the same or different grant-less contention spaces with the same or different redundancy schemes on multiple contention blocks. In one example, at 24, the UE 2702 switches from a grant-less operation mode to a grant operation mode after receiving a command from the higher layer. By way of example, the UE 2702 may include a traffic monitor that switches from a grant-less mode to a grant operation mode to upload the images of a traffic accident to the network.

Referring now to FIGS. 16A to 17B, the example system 2500 is shown. In the illustrated example, grant-less UL operations are performed for the mMTC device 2502. In accordance with the illustrated example, the RAN Slicing Management node 2508 and the CN Slicing Management node 2512 may be logical entities that perform common control functions in the RAN and the CN 2506, respectively. For example, the RAN Slicing Management node 2508 and the CN Slicing Management node 2512 may exchange service subscription and policy information, which may be used to validate a request for access to a slice. Such information may also be used to establish security settings, power charging parameters, or the like. The RAN Slicing Management node 2508 and the CN Slicing Management node 2512 may also exchange context information associated with the UE 2502. Such context information may include, for example, mobility information, location information, transmission schedule information, data traffic information, etc. The context information may allow the appropriate, for instance optimal, slice to be selected in the RAN and the CN 2506.

The Mobility Management node 2516 and the Subscription Management node 2520 may represent common functions for the CN slices (slice common) associated with a service provider. In some cases, the Mobility Management node 2516 and the Subscription Management node may be part of the CN Slicing Management 2506, or may represent specific functions inside the CN slice 2514 provided by a specific service provider (slice specific), as shown.

Figure 16A:
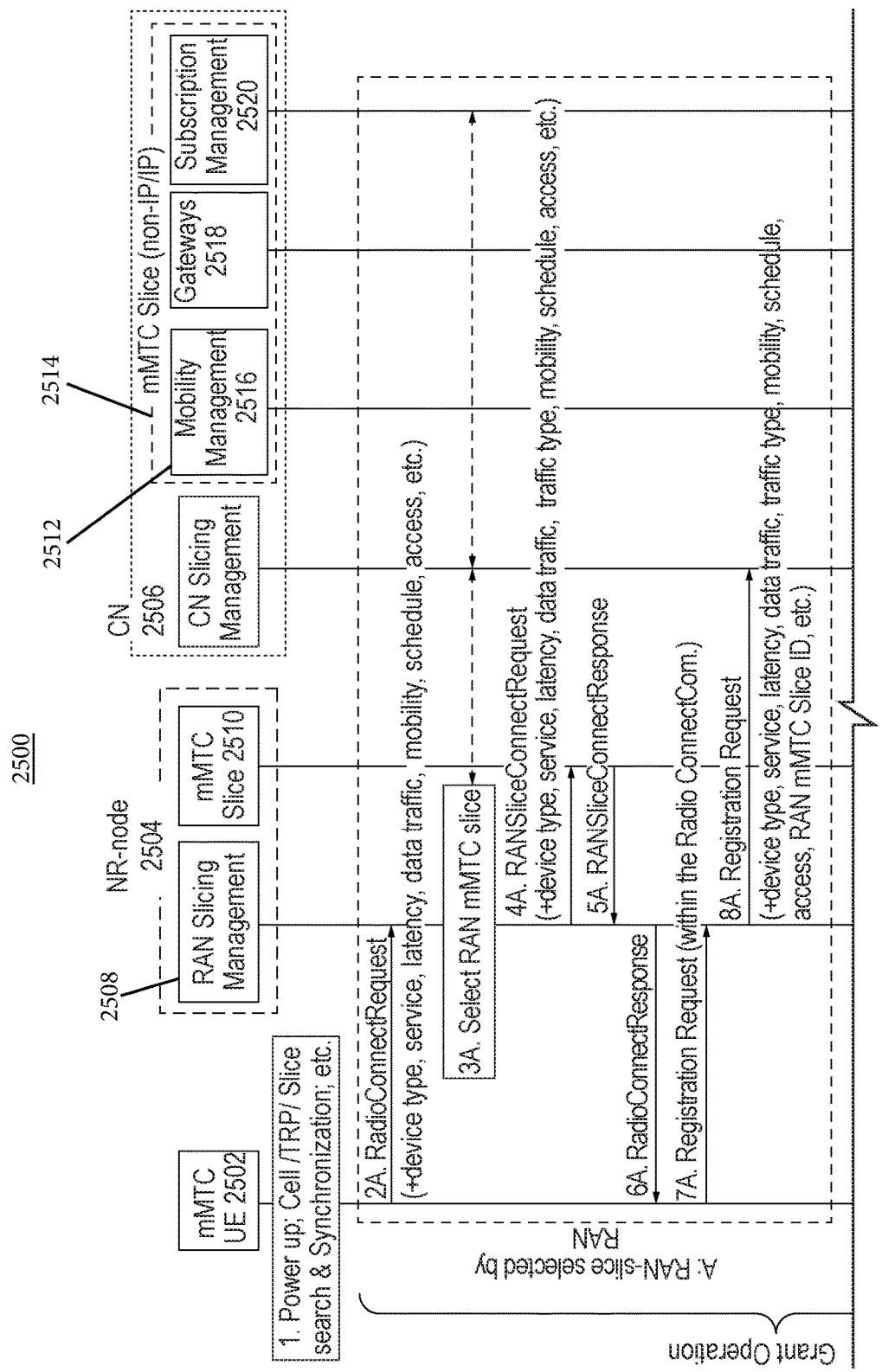
FIGS. 16A-17B depict an example procedure for grant-less UL transmission for mMTC devices in accordance with an example embodiment.
Figure 16B:
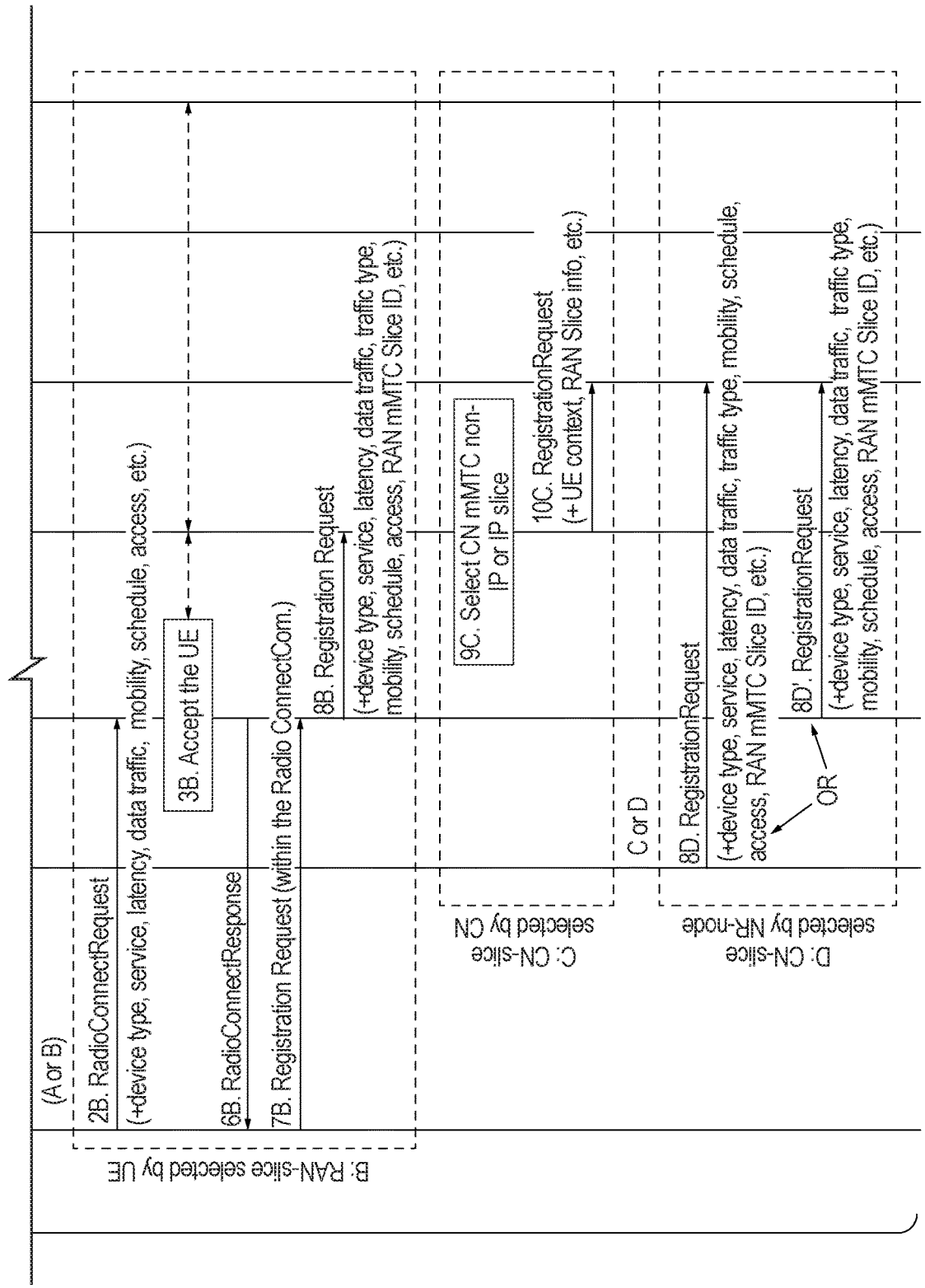

Referring in particular to FIGS. 16A and 16B, at 1, in accordance with the illustrated example, the UE 2502 powers up. After power up, the UE 2502 may conduct cell/TRP/slice search and synchronization. The UE 2502 may further acquire system information from MIB and SIBs. At this time, in some cases, the UE 2502 may be in similar states as EMM-deregistered, ECM-Idle, and RRC-Idle, as defined in the current LTE system. At 2, the UE 2502 may send a Radio Connection Request to the RAN Slicing Management node 2508 (at 2A) or the mMTC Slice 2510 (at 2B). The request may include various context information associated with the UE 2502, such as, for example and without limitation: a device type (e.g., mMTC or URLLC), a service (e.g., service for forest fire monitoring or traffic monitoring); a latency requirement (e.g., 100 ms or ultra-low latency 0.5 ms); context related to data traffic (e.g., data packet size and/or data rate and/or duty cycle); CN traffic type (e.g., non-IP or IP based); mobility context (e.g., static, pedestrian, or vehicular, or low speed in a confined area, etc.); location context (e.g., UE tracking area at RAN); schedule context (e.g., schedule of data transmissions); access context (e.g., grant or grant-less accessing, whether switchable between grant and grant-less, accessing priority, etc.). In some cases, operations 4 and 5 are not performed, for example, when the UE 2502 selects the RAN slice 2510.

At 3A, the RAN Slicing Management node 2508 may select the RAN slice 2510. The selection may be based, at least in part, on the context information associated with the UE 2502, traffic loading and resource allocations at various RAN slices, a relevant service profile or subscription, a charging policy, or the like. Information may be stored at the NR-node 2504, or received from the CN 2506 via the CN slicing Management node 2512 and/or the Subscription Management entity 2520 on the CN 2506. At 3A, the RAN Slicing Management 2508 selects the mMTC slice 2510 as the radio accessing slice for the UE 2510. At 3B, the RAN slice 3510 may determine to accept the UE's connection request for the RAN-selected or UE-selected RAN slice 3510. At 4A, the RAN Slicing Management 2508 may send a RAN slice connection request to the mMTC Slice 2510. The connection request may include the context information associated with the UE 2502, so that a radio connection can be established between the UE 2502 and the slice 2510. At 5A, in accordance with the illustrated example, the mMTC Slice 2510 sends a RAN Slice Connection Response to the RAN Slicing Management 2508. The response may indicate whether the slice connection request has been accepted. If the request is rejected, the reasons for rejection may be included in the response message. If the request is accepted if accepted, radio configuration parameters (e.g., SRB1-like and/or DBR-like dedicated radio resource configuration for the UE 2502) for the selected RAN slice 2510 may be included in the response.

Still referring to FIGS. 16A and 16B, at 6, in accordance with the illustrated examples, the RAN Slicing Management 2508 (at 6A) or the mMTC Slice 2510 (at 6B) sends a Radio Connection Response to the UE 2502. The response may indicate that radio connection is confirmed by the RAN Slice Management 2508 or the RAN mMTC Slice 2510. If the request for the selected RAN slice 2510 is rejected, the reasons for rejection may also be included in the response message. If the request is accepted, the radio configuration parameters (e.g., SRB1-like and/or DRB-like dedicated resource configuration for the UE 2502) for the selected RAN slice 2510 may be included in the response. In some cases, the RAN Slicing Management 2508 or the selected RAN slice 2510 may send (e.g., within the response message) an SBR1 and/or DRB resource (e.g., SRB and/or DRB configuration) that is dedicated to the UE 2502. Thus, the UE 2502 may be confirmed as having a successful radio connection with the mMTC Slice 2510, which may be a NAS connection with the selected RAN slice 2510. At 7, in accordance with the illustrated examples, the UE 2502 may send a registration request to the RAN Slicing Management 2508 (at 7A) or the RAN mMTC Slice 2510 (at 7B). The registration request may sent at the NAS layer, and may be encapsulated in the Radio Connect Complete message, which may also include the radio configuration as instructed by the selected RAN slice 251. The RAN Slicing Management 2508 may send the registration request to the CN Slicing Management 2512 (at 8A) or the Mobility Management 2516 (at 8D). Alternatively, the RAN mMTC Slice 2510 may send the registration request to the Mobility Management 2516 (at 8D'). The registration request may be sent to the Mobility Management 2516 when the slice 2512 is selected by the NR-node 2510. In some examples, the registration request may be sent to the CN Slicing Management 2512 when the RAN slice 2510 is selected by the UE 2502 (at 8B). The registration request may include context information associated with the UE, and slice information (e.g., an ID) associated with the mMTC slice 2510.

In some examples, the NR-node 2504 or the CN 2506 may select the CN slice 2514 based on various context information associated with the UE 2502. For example, CN slice selection may be based, at least in part, on an ID of the UE assigned by the RAN-Slicing Management 2508 or the RAN slice 2510 in the NR-node 2508, the type of the UE 2502 (e.g., mMTC or URLLC), a service performed by the UE 2502 (e.g., forest fire monitoring or traffic monitoring), a latency requirement (e.g., long latency 100 ms or ultra-low latency 0.5 ms for the session or flow end-to-end delay); data traffic (e.g., data bit rate and/or traffic load for the session or flow); a route type (e.g., non-IP or IP based), mobility (e.g., static, pedestrian, or vehicular, or low speed in a confined area); a location (e.g., UE's tracking and/or routing area in the network, such as TAI and ECGI in LTE system); schedule (e.g, schedule of UL data transmissions); charge (e.g., on-line or off-line charging), etc.

In some cases, for example, when the NR-node 2504 selects the CN slide 2514, operations 9 and 10 are not performed. In other cases, at 9C, the CN Slice Management 2512 selects an mMTC IP traffic slice (slice 2514) based on at least a portion of the context information associated with the UE, the RAN mMTC Slice 2510, CN traffic loading, or available mMTC slices, etc. At 10C, the CN Slicing Management 2506 may send a registration request to the Mobility Management node 2616. The registration request may include context information associated with the UE 2502 and information related to the RAN mMTC slice 2510. At 10C, in some cases, the connection between the NAS layers of the UE 2502 and the Mobility Management 2516 or the CN slice 2514 is established. Then, the UE may transit to various states, like EMM-Registered, ECM-Connected and RRC-Connected state in LTE system.

Figure 17A:
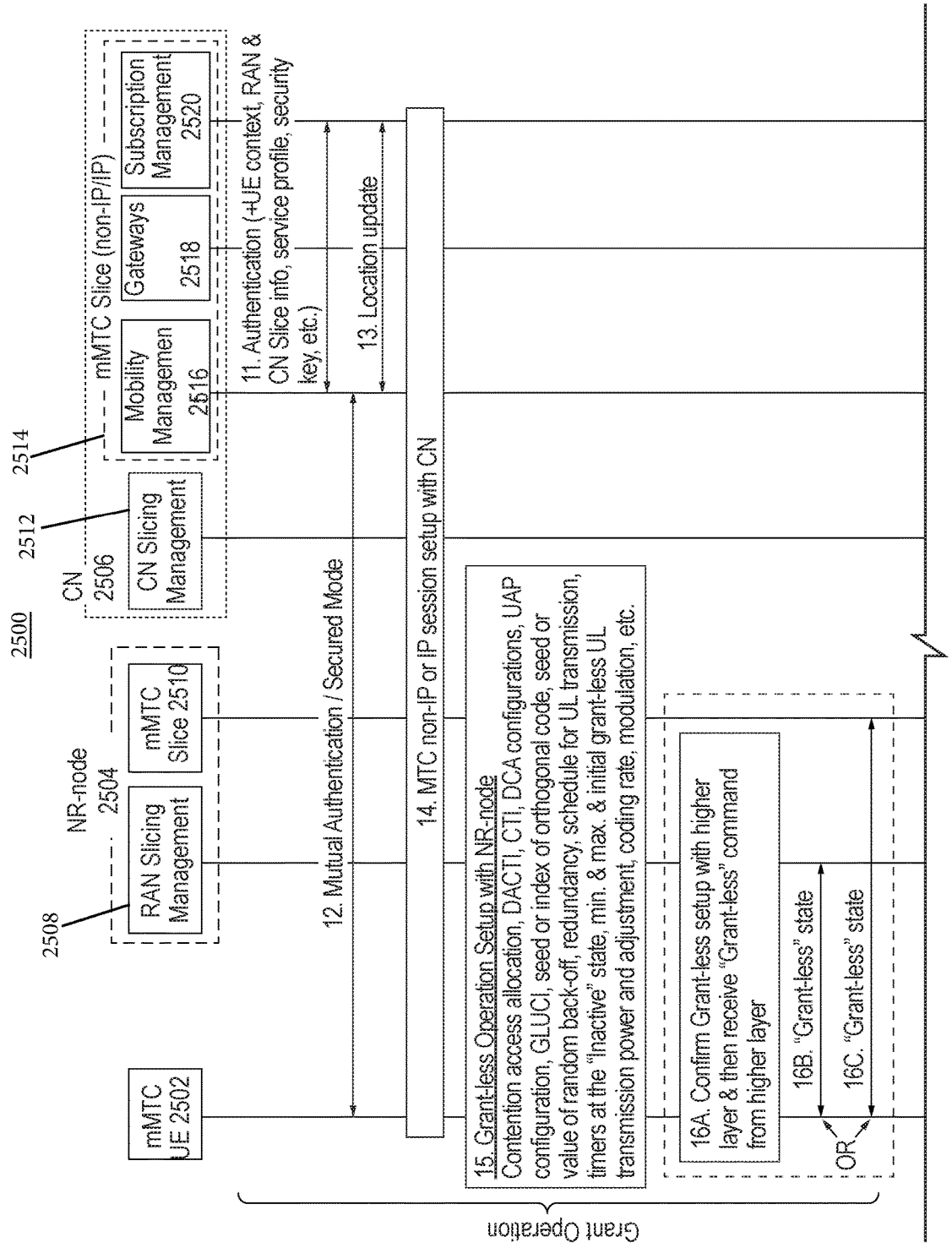

Referring now to FIG. 17A, at 11, in accordance with the illustrated example, the Mobility Management 2516 exchanges messages with the Subscription Management 2520 for authenticating the UE 2502 with the requested services. The exchanged messages may include, for example and without limitation, UE IDs (such as IMSI and Serving Network ID) and context, RAN slice and CN slice info (such as RAN slice ID and CN slice ID), service network ID, UE service profile or subscription and charging policy, an assigned UE default IP address, etc. The Security keys may be generated for establishing a secured connection in the CN 2506 and RAN. At 12, the Mobility Management node 2516 and the UE 2502, after the authentication with the Subscription Management 2520, may exchanges messages to mutual authenticate each other, and then to establish a Secured Mode for NAS signaling between them. At 23, in accordance with the illustrated example, the Mobility Management 2516 and the Subscription Management 2520 exchange messages to update a location associated with the UE 2502. At 14, in accordance with the illustrated example, an IP or non-IP session is established within the CN mMTC slice 2514 on the radio bearer between the UE 2502 and the Mobility Management 2516 in the CN 2506, over the interface between the RAN mMTC slice 2510 and the CN mMTC Slice 2514 and the network connection bearer in the core network 2506.

At 15, grant-less operations are setup. The NR-node 2504, in particular the -RAN mMTC Slice 2510, may exchange messages with the UE 2502 to configure the Grant-less operation parameters described herein, for example. Example parameters include, without limitation: contention access allocation parameters; accessing priority and/or contention priority; grant-less configuration parameters (e.g., DACTI, CTI, DCA, UAP, GLUCI, etc.); seed or index of the orthogonal code for code-domain multiple accessing; seed or value of the random back-off for priority collision avoidance contention access; redundancy parameters for reliable transmissions; timers at the Inactive state (e.g., for listening to a broadcasting channel for pages or for system information changes, for conducting measurements for the radio link management, for updating statuses related to reachability and mobility, etc.); grant-less power control values (e.g., minimum and maximum UL transmission power levels and incremental adjustments, which may be calculated by the NR-node 2504 based, at least in part, the path loss and required received signal quality during the message exchanges described above between the UE 2502 and the NR-node 2504); parameters related to a schedule for grant-less UL transmissions; a coding rate; modulation scheme, etc. At 16A, in accordance with the illustrated example, the UE 2502 confirms the grant-less configuration (allocation) with a higher layer of the UE 2502 as compared to the physical layer. Alternatively, or additionally, the UE 2502 may confirm the Grant-less setup with the NR-node 2504, in particular the RAN Slicing Management node 2508 (at 16B) or the mMTC slice 2510 (at 16C). Accordingly, the UE 2502 may receive an entering "Grant-less" operation mode command from the higher layer or from the NR-node 2504.

Figure 17B:
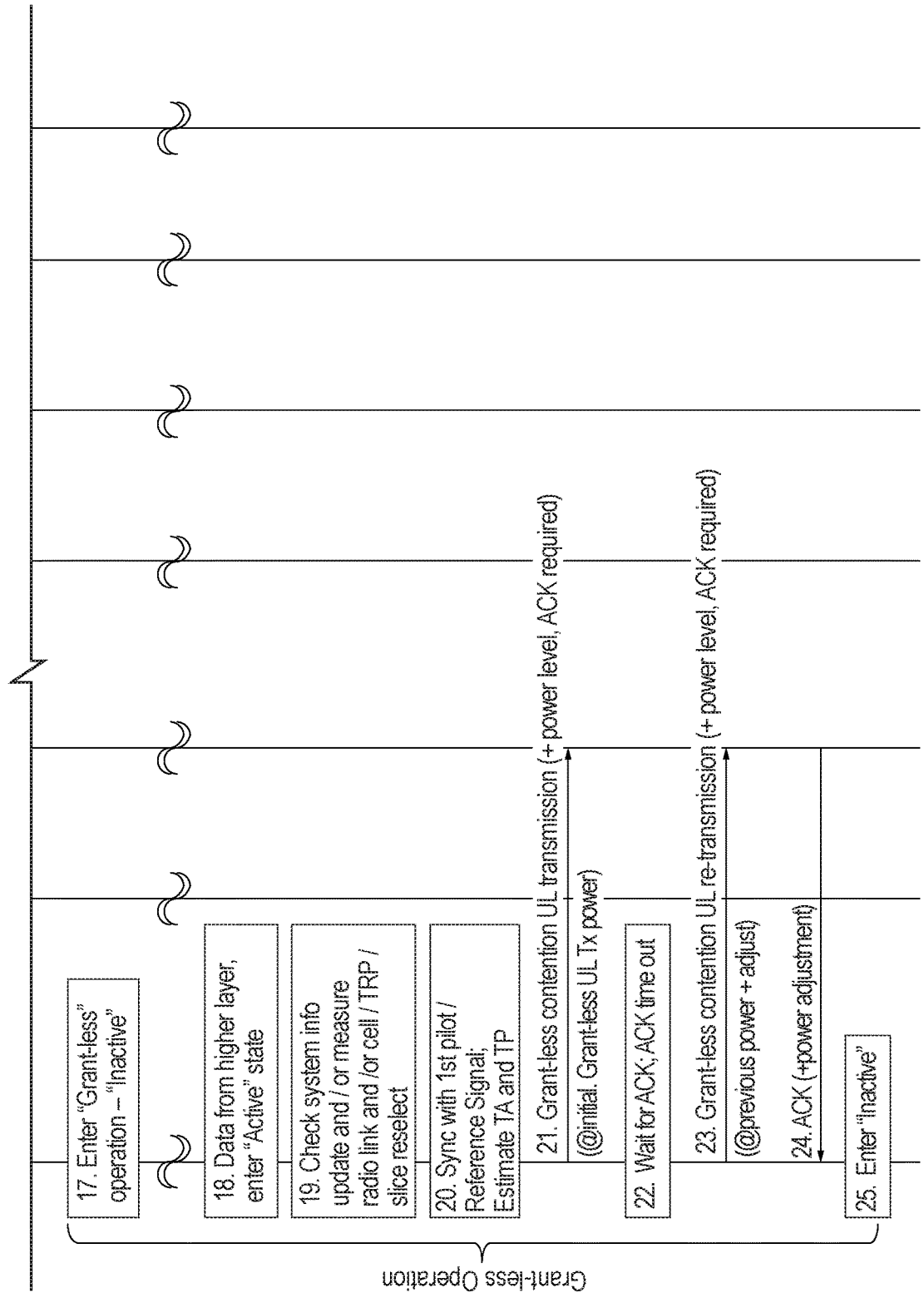
Figure 18A:
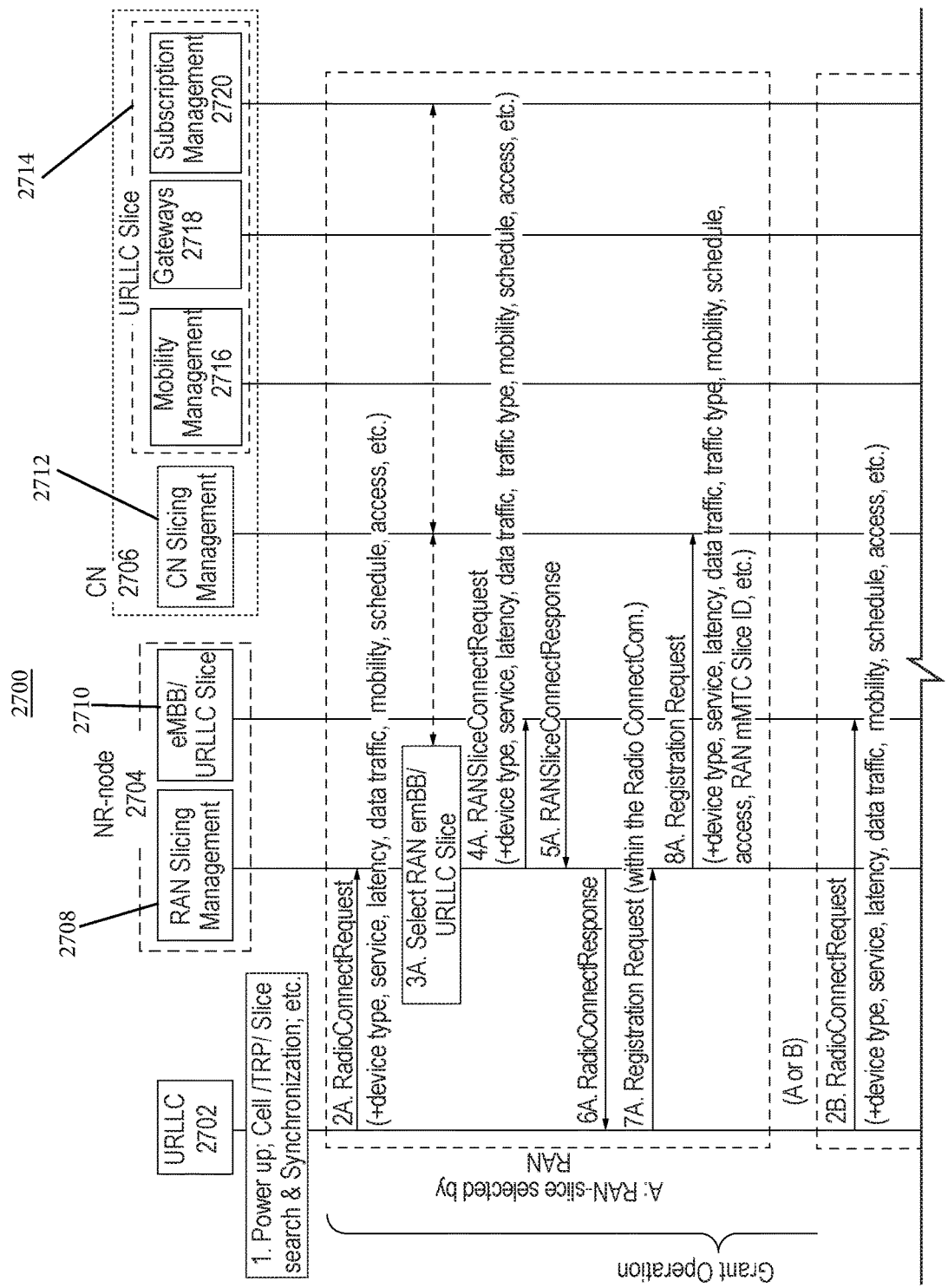
FIGS. 18A-19B depict an example procedure for grant-less UL transmission for URLLC devices in accordance with an example embodiment.
Figure 18B:
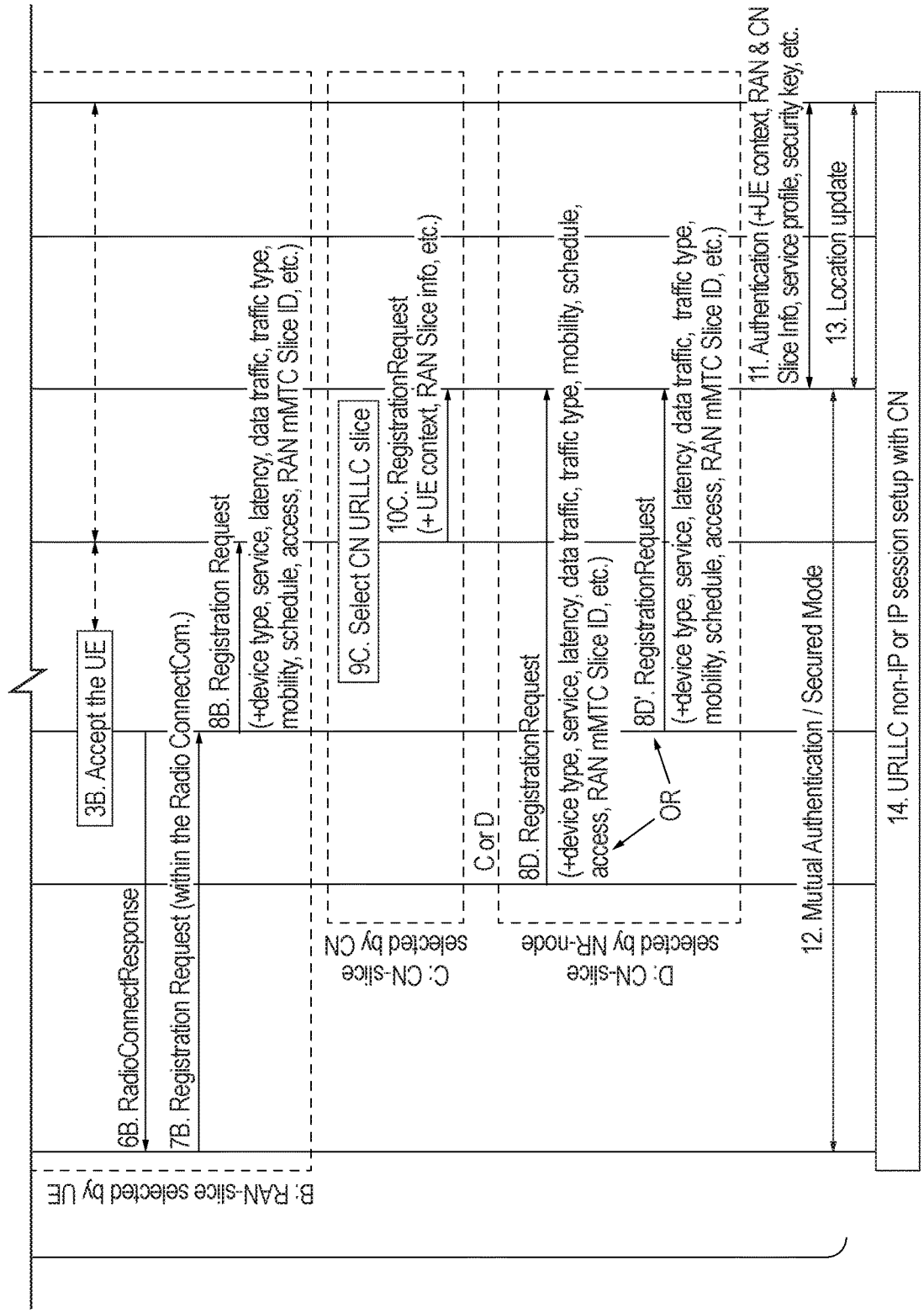
Figure 19A:
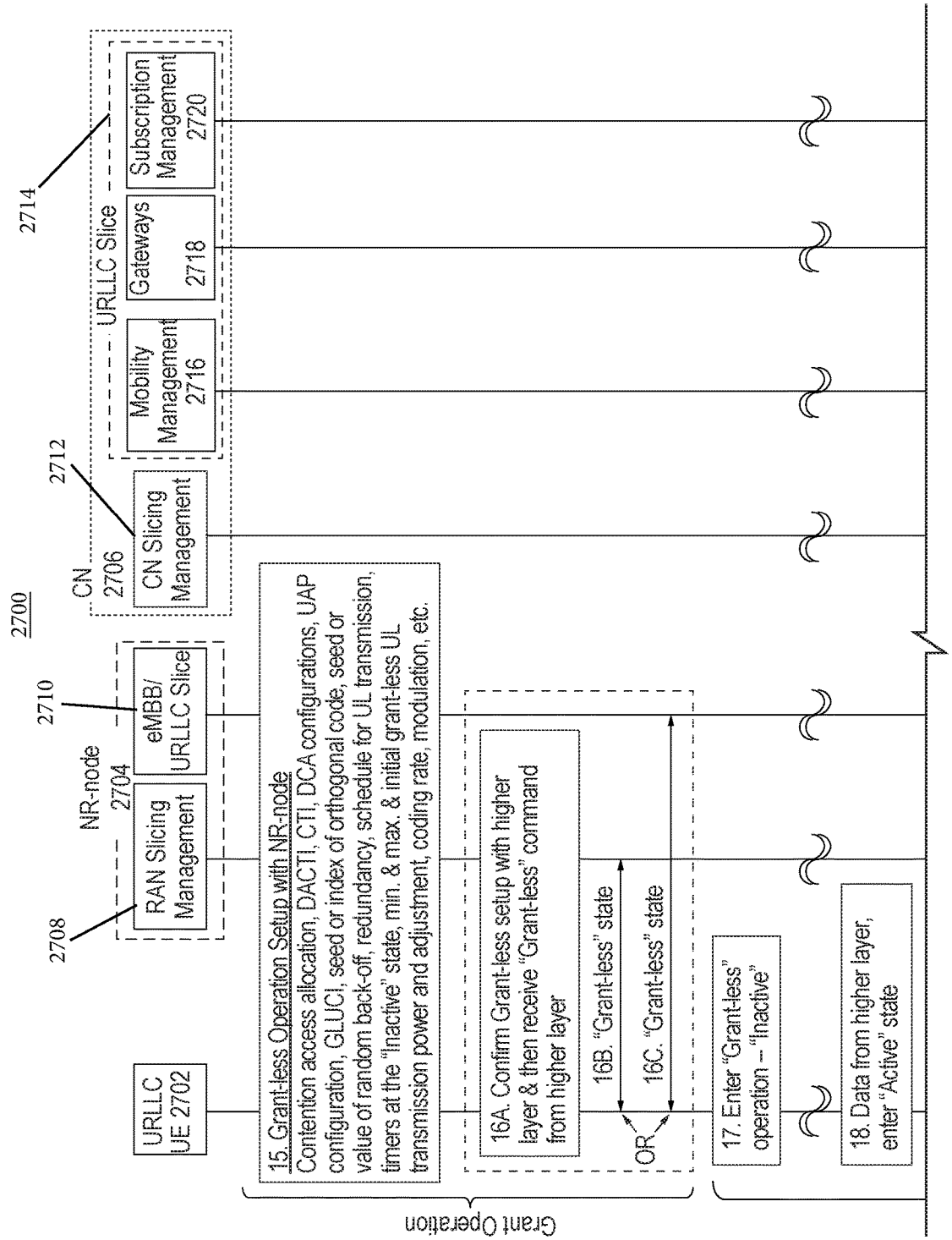
Figure 19B:
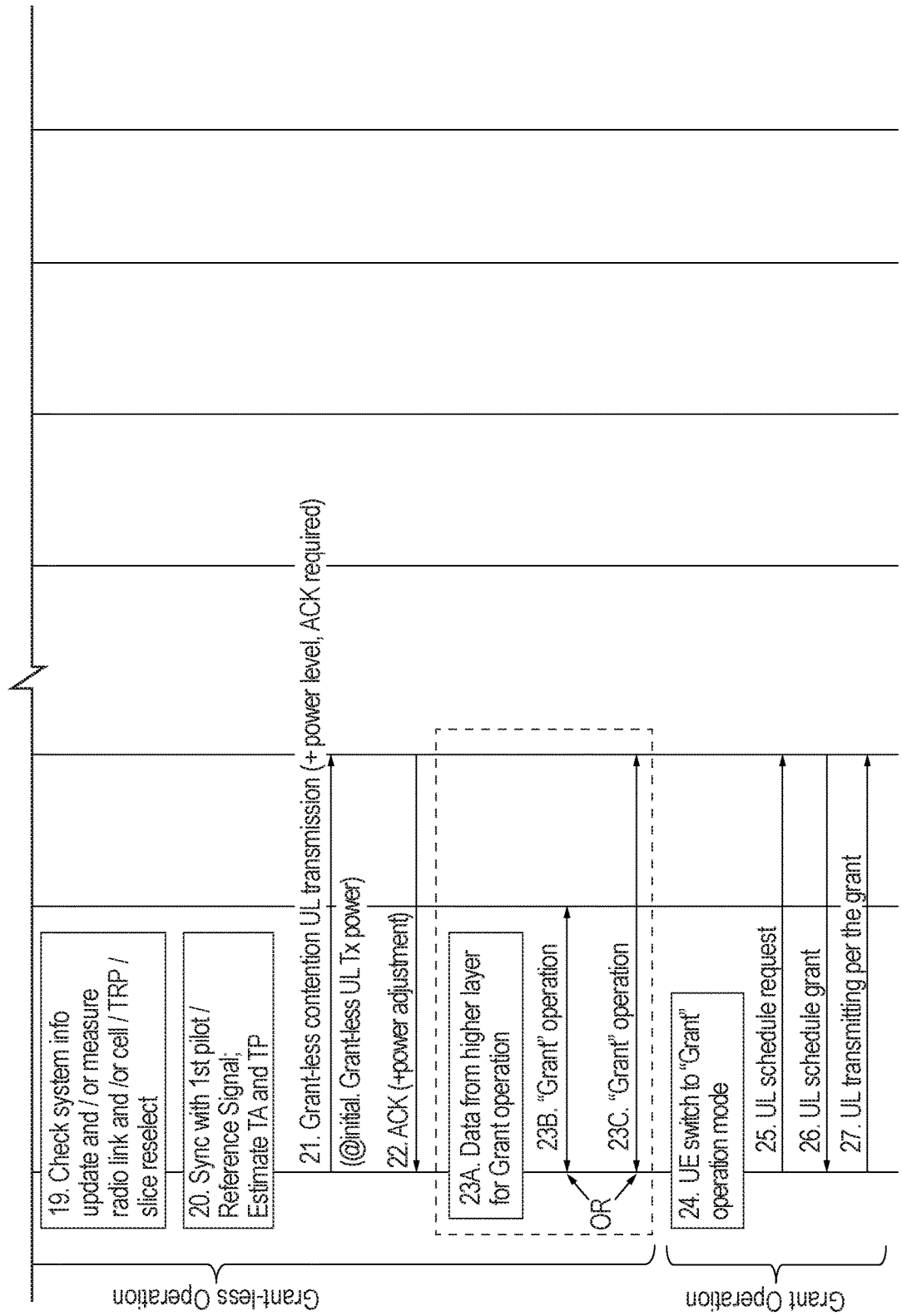

Referring now to FIG. 17B, at 17, the UE 2502 enters into an inactive state of the Grant-less operation mode. The inactive state may be preconfigured. In some cases, the inactive state may be triggered by the higher layer or the NR-node's command to operate in Grant-less mode after registration. In some cases, the UE 2502 may automatically enter the inactive state in Grant-less operation mode if configured to do so. At 18, in accordance with the illustrated example, the UE 2502 receives data from the higher layer that it needs to transmit in an UL transmission. Example data includes, without limitation, "keep alive" small data, measurement data, data associated with a reachability and mobility status of the UE 2502, or the like. At 19, the UE 2502 may need to check system information on a broadcast channel. By way of further examples, at 19, the UE 2502 may need to conduct a radio link measurement, or select a new cell based on system information or results of the radio link measurement. At 20, in accordance with the illustrated example, the UE 2502 synchronizes with reference signals or an available synchronization pilot, for instance the first available synchronization pilot, at the symbol timing boundary for allocating a contention access area. The UE 2502 may also estimate the Time Advance (TA) for grant-less UL synchronization, at 20. Further, the UE 2502 may estimate the Transmit Power (TP) level, using the received DL reference signal, for the UL transmission.

At 21, in accordance with the illustrated example, the UE 2502 sends a grant-less UL transmission to the NR-node 2504, in particular the RAN mMTC slice 2510. In some cases, the UE 2502 may conduct contention access for the grant-less UL transmission (without redundant versions) at the initial UL transmitting power, which may defined at the Grant-less setup stage (at 15) or signaled by the NR-node 2504 via System Information broadcasting or RRC signaling. In some cases, the UE 2502 may indicate if an acknowledgement (ACK) is required for this transmission at the transmitting power level. The UE 2502 may also include radio link measurements, a reachability or mobility status, or other information with the UL data transmission at 21. At 22, the UE 2502 may wait for an ACK response, to its UL transmission, from the mMTC slice 2510. The UE 2502 may wait until an ACK timer expires if, for example, an ACK is required. At 23, in accordance with an example, the UE 2502 conducts a retransmission of the UL message with an adjusted (e.g., increased) TP level if reliable transmission is required. The UE 2502 may conduct contention access again, for example, if reliable transmission is required for its grant-less UL data. At 24, in accordance with the illustrated example, the NR-node 2504, in particular the mMTC slice 2510, sends an ACK message to the UE 2502 that indicates that the UL transmission from the UE 2502 was successfully received. The message at 24 may also include a power adjustment value for the UE's next grant-less UL transmission, thereby providing quasi-closed-loop Power Control. At 25, the UE 2502 may enter an inactive state of grant-less operation mode. The inactive state generally refers to a state in which the UE is not transmitting. The inactive state may be preconfigured or triggered by the higher layer's command after a grant-less UL transmission. The inactive state may also be triggered when the UE 2502 or receives an ACK from the NR-node 2502, for example, when an ACK is required for the transmission. In some cases, the UE 2502 may automatically enter the inactive state after a grant-less UL transmission, if, for example, the UE 2502 is configured to do so.

Referring also to FIGS. 18A to 19B, an example embodiment for URLLC devices is illustrated in which may be similar to the example embodiment for mMTC devices described above, and therefore similar operations are described with reference to FIGS. 16A to 17B. With respect to URLLC devices, however, the context information associated with the UE 2702 may include a value that indicates that the UE 2702 can switch between grant and grant-less operations. Further, at 3A or 2B, an eMBB/URLLC slice 2710 may be selected at the NR-node 2704 in order to optimize the overall system resource utilization. In an example, at 9C or 8D, the URLLC slice 2714 is selected to meet short latency requirements across the system (network) 2700. In some examples, the UE 2702 conducts its grant-less UL transmission with redundancies, for example, by using multiple contention blocks for sending the same data. In one example, at 24, the UE 2702 switches from a grant-less operation mode to a grant operation mode after receiving a command from the higher layer. By way of example, the UE 2702 may include a traffic monitor that switches from a grant-less mode to a grant operation mode to upload the images of a traffic accident to the network.

Figure 20A:
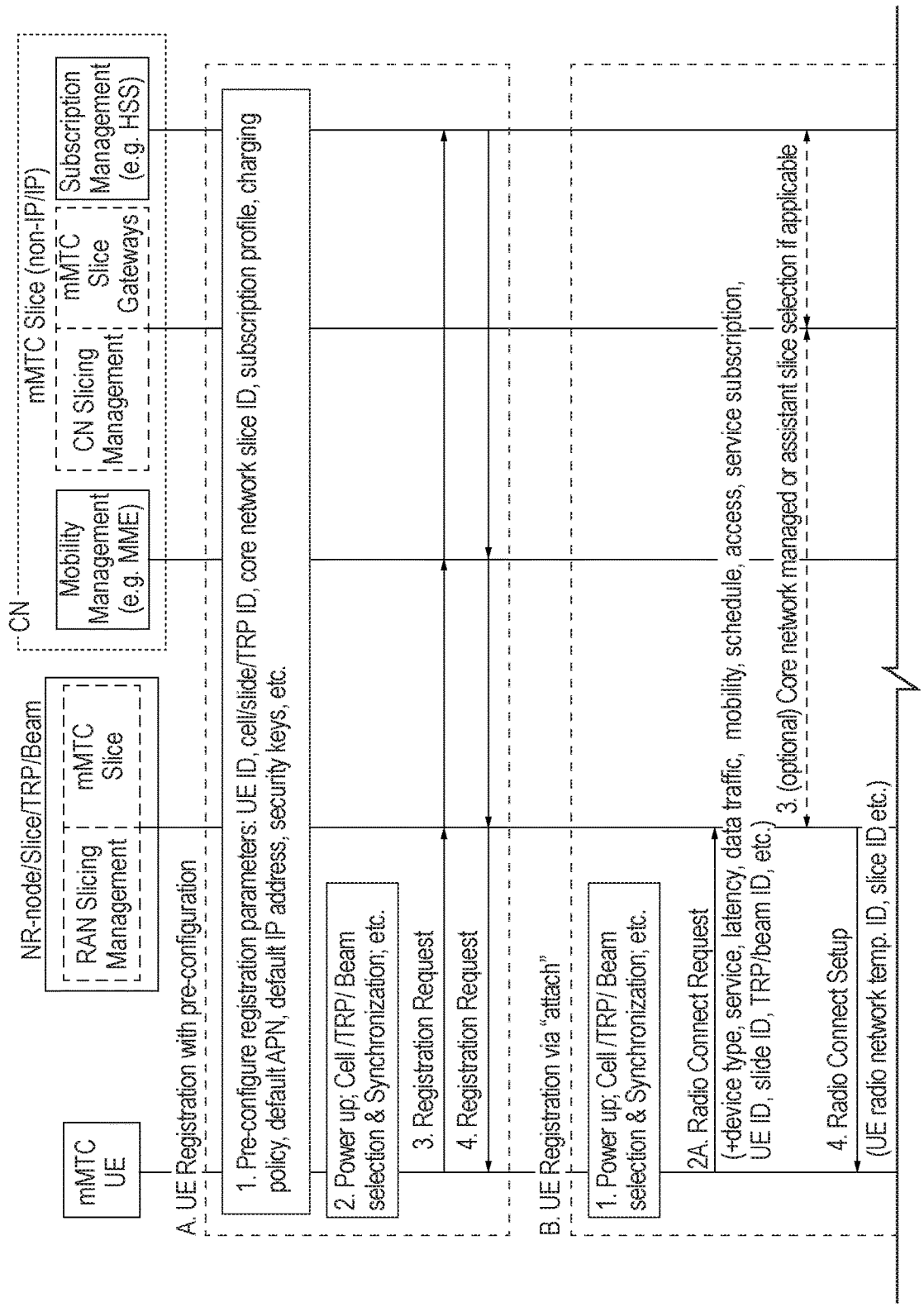
FIGS. 20A and 20B depict an example call flow for registration and grant-less setup in accordance with an example embodiment.
Figure 20B:
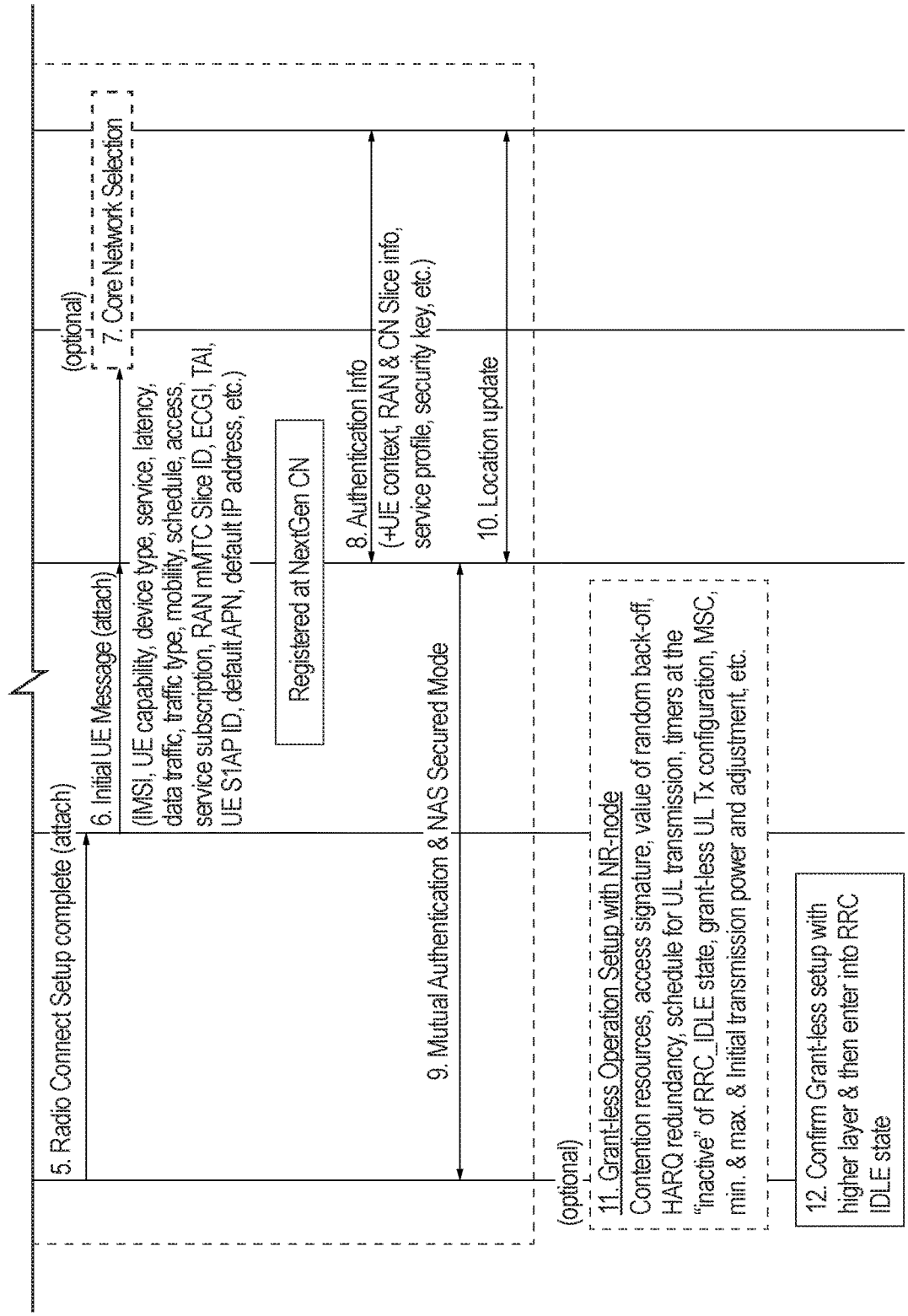
Figure 21A:
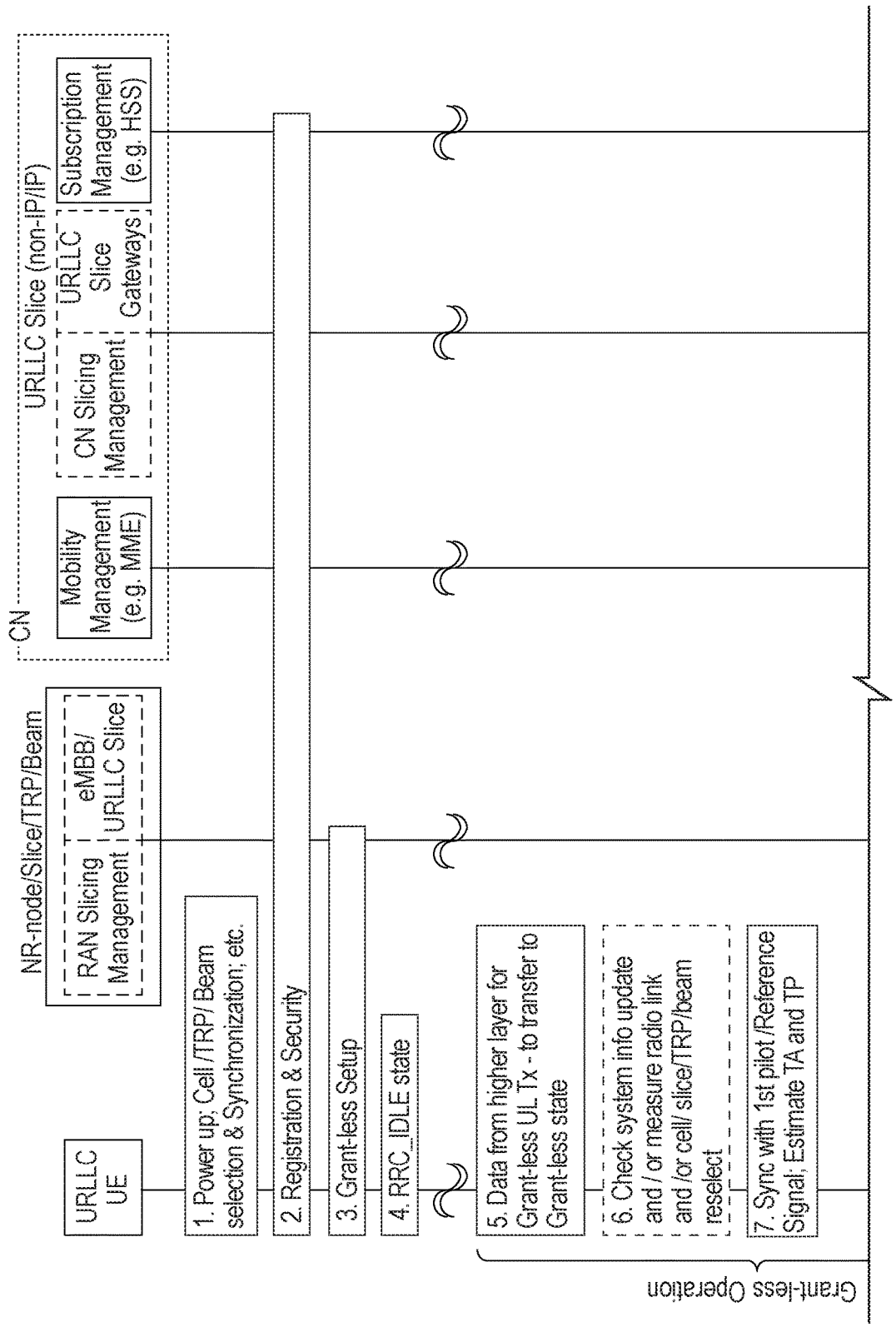
FIGS. 21A and 21B depict an example call flow for grant-less and grant UL transmissions for URLLC devices, in accordance with an example embodiment.
Figure 21B:
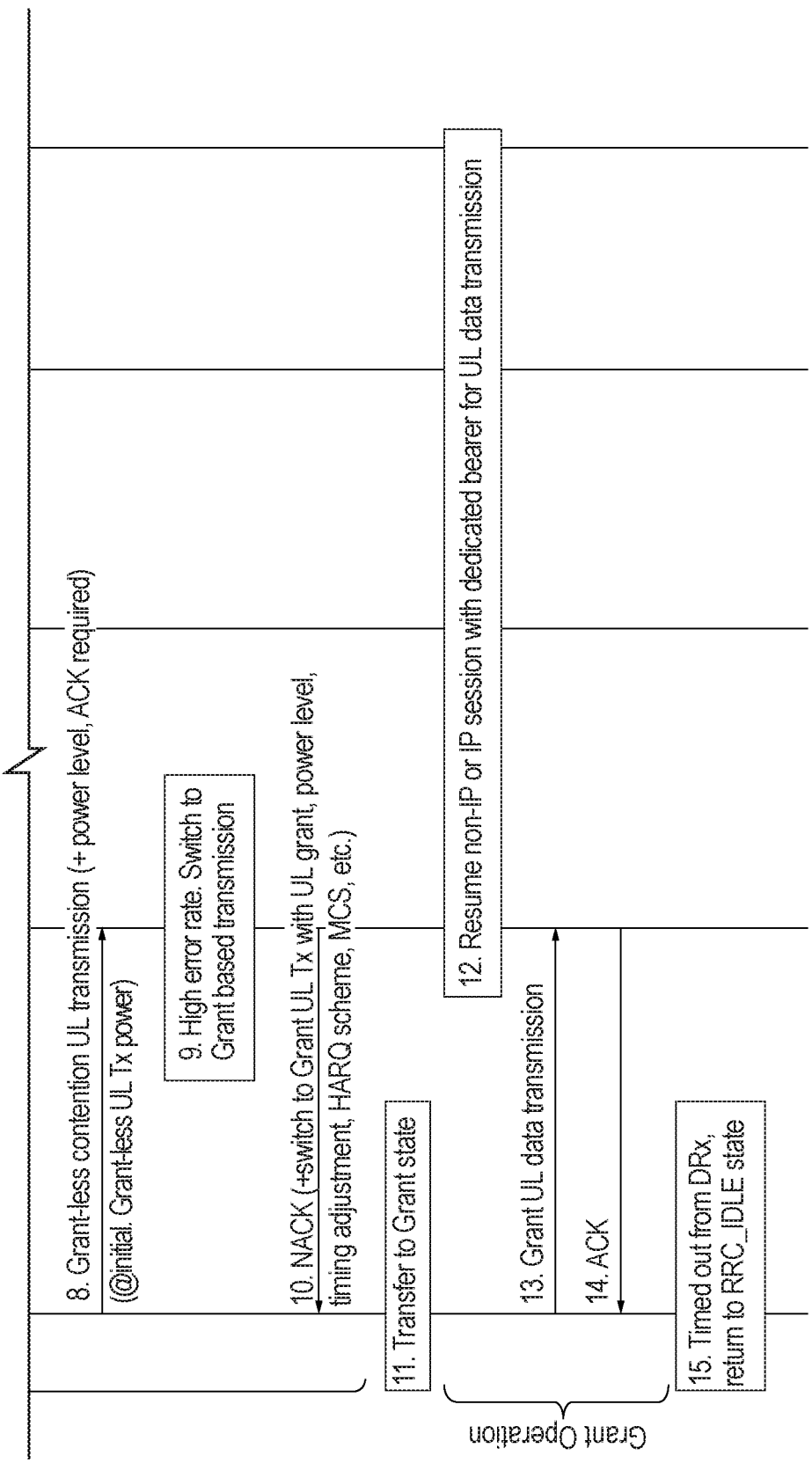
Figure 22A:
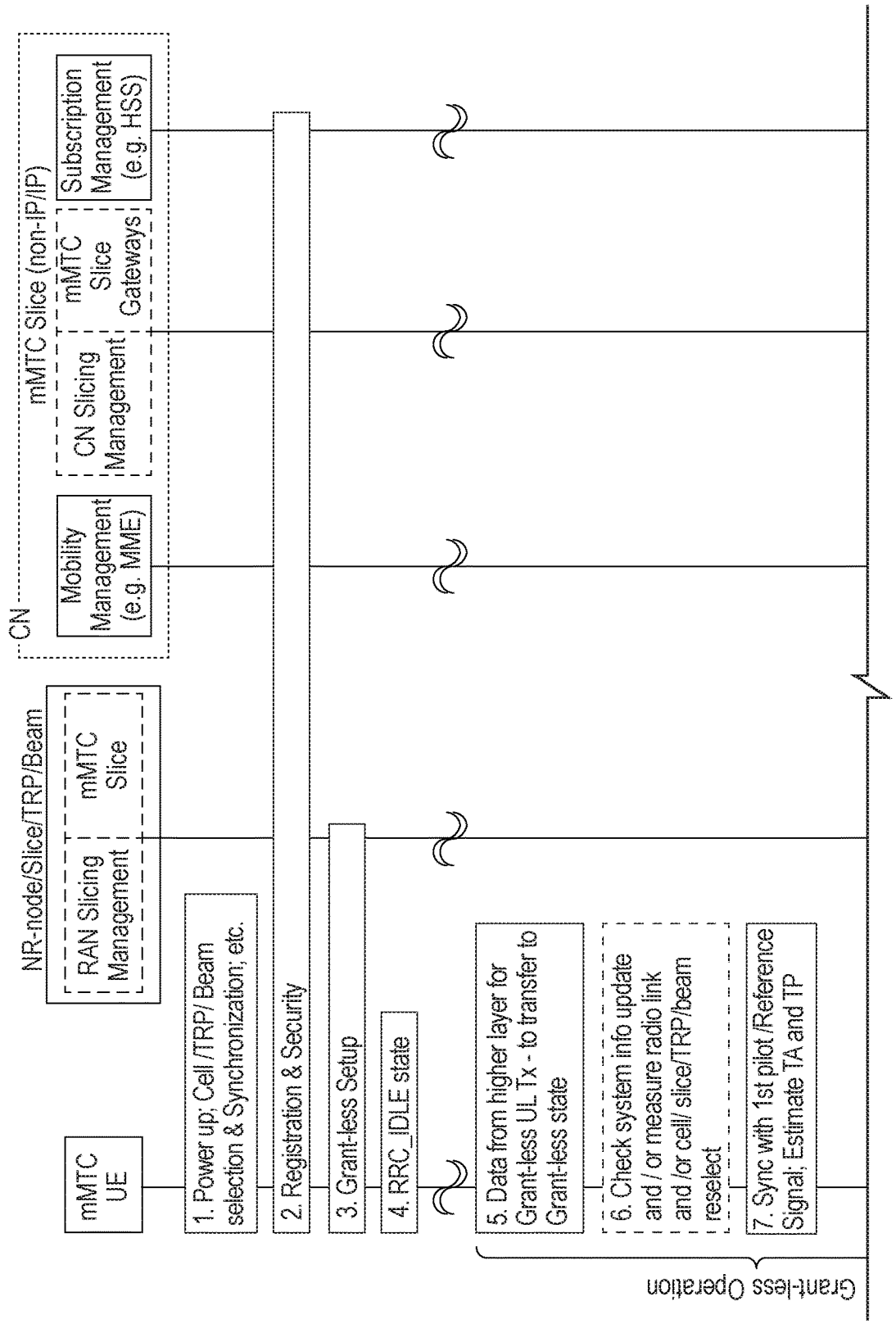

Turning now to example Grant-less and Grant UL Transmissions, as shown in FIGS. 20A and 20B, a UE may be preconfigured with a registration to a subscription management node in the core network. Alternatively, the UE may be registered via "attach" procedures where the UE may be assigned with a radio temporary identity (ID) that is used in grant-less access. The UE may set up grant-less related parameters, which may be referred to generally as its grant-less configuration, after the registration (if applicable). In some cases, a that is UE pre-configured for registration may also be pre-configured with grant-less parameters. FIGS. 21A and 21B depict an example of grant-less and grant operations for URLLC devices, wherein the UE (URLLC device) transitions between the grant-less and grant states in accordance with direction by the NR-node. FIGS. 22A and 22B depict an example of grant-less and grant operation for mMTC devices, wherein the UE (mMTC device) transitions between the grant-less and grant states as commanded by a higher layer (as compared to the physical layer).

Figure 23:
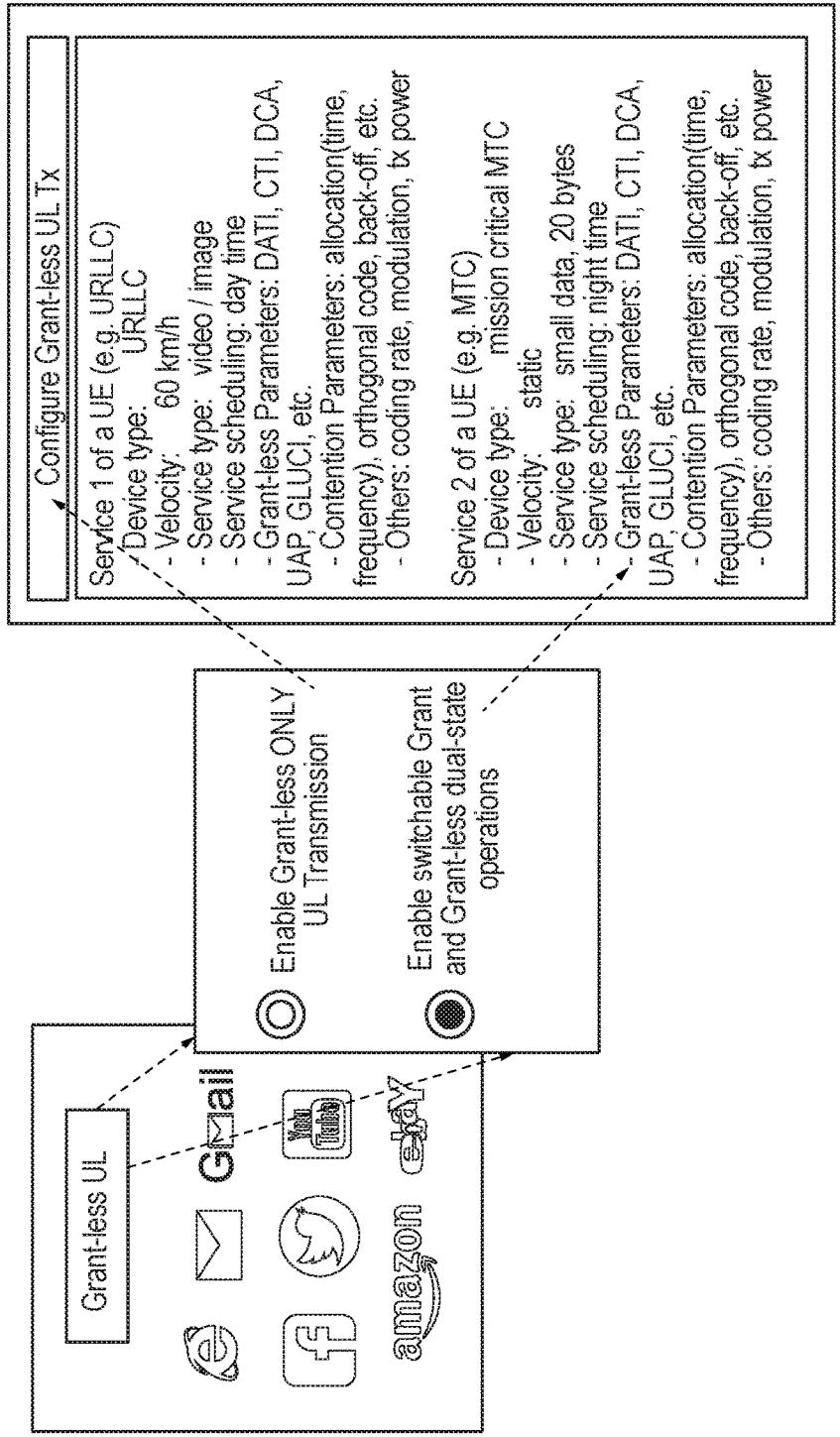
FIG. 23 is an example GUI for UE configuration in accordance with an example embodiment.

Referring now to FIG. 23, an example graphical user interface (GUI) 2300 for configuring a UE's grant-less operations is depicted. In particular, using the GUI 2300, a user may configure a UE to only transmit UL data using grant-less operations. Alternatively, using the GUI 2300, a user may enable a UE to switch between grant and grant-less operations, such that the UE can operate in duel states. It will be understood that the GUI can be adapted to display or configure additional, or alternative, parameters as desired. Further, the GUI can display parameters in various visual depictions as desired.

Thus, as described above, an apparatus may transmit a message uplink in the network in accordance with a grant-less access mode, such that the apparatus transmits the message without being granted access to transmit the message, so as to operate within the grant-less mode. Further, the apparatus may transition between the grant-less mode and a grant mode. In an example, the apparatus transitions between the grant-less mode and the grant mode in response to direction from a higher layer than a physical layer of the apparatus. In another example, the apparatus transitions between the grant-less mode and the grant mode in response to direction from the network. The apparatus may switch from the grant-less mode to the grant mode in response to an increase of frequency or volume of data communication performed by the apparatus. The apparatus may switch from the grant mode to the grant-less mode in response to a low duty cycle associated with the apparatus. While operating in the grant-less mode, the apparatus may obtain an allocation of radio resources that are shared with at least one other apparatus, so as to operate in a semi-connected state within the grant-less mode. In an example, a radio access node maintains communication with a core network while the apparatus operates in the semi-connected state. In another example, while operating in the grant-less mode, the apparatus obtains an allocation of radio resources that are dedicated to the apparatus, so as to operate in a connected state within the grant-less mode.

As also described above, an apparatus, while in a grant state, may identify data that should be sent uplink in the network using a grant-less state. In the grant-less state, data is sent without the apparatus being granted access to send the message. In an example, the apparatus may transition from the grant state to the grant-less state. While in the grant-less state, the apparatus may transmit the data without the apparatus performing random access procedures. In some cases, the data is transmitted via a first cell in accordance with a stored uplink transmission configuration that was obtained via another or second cell. The apparatus may estimate a timing advance, and transmit the data in accordance with the timing advance. The apparatus may store the estimated timing advance. The apparatus may update the stored timing advance in response to receiving a grant-less DL synchronization signal or in response to a need to transmit data in the grant-less state. In another example, the apparatus updates the timing advance when a timer expires, such that the timing advance is updated periodically. The apparatus may also estimate transmit power, and transmit the data in accordance with the estimated transmit power. The apparatus may store the estimated transmit power. The apparatus may update the stored transmit power in response to a need to transmit data in the grant-less state, in response to receiving a grant-less downlink (DL) synchronization signal, or in response to receiving a grant-less downlink (DL) reference signal.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to affect the methods described herein. As used herein, the terms "apparatus," "network apparatus," "node," "entity," "function," "device," and "network node" may be used interchangeably, without limitation unless otherwise specified.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

It will be understood that for different RAN architectures, the grant-less UL control and management described above may be conducted at an NR-node, Transmission and Reception Point (TRP), Remote Radio Head (RRH), or the like, as well as the central controller in RAN or the control function in a RAN slice. Embodiments described herein proposed may also applicable to TRP, RRH, central controller, and control function in different RAN architectures.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 24A:
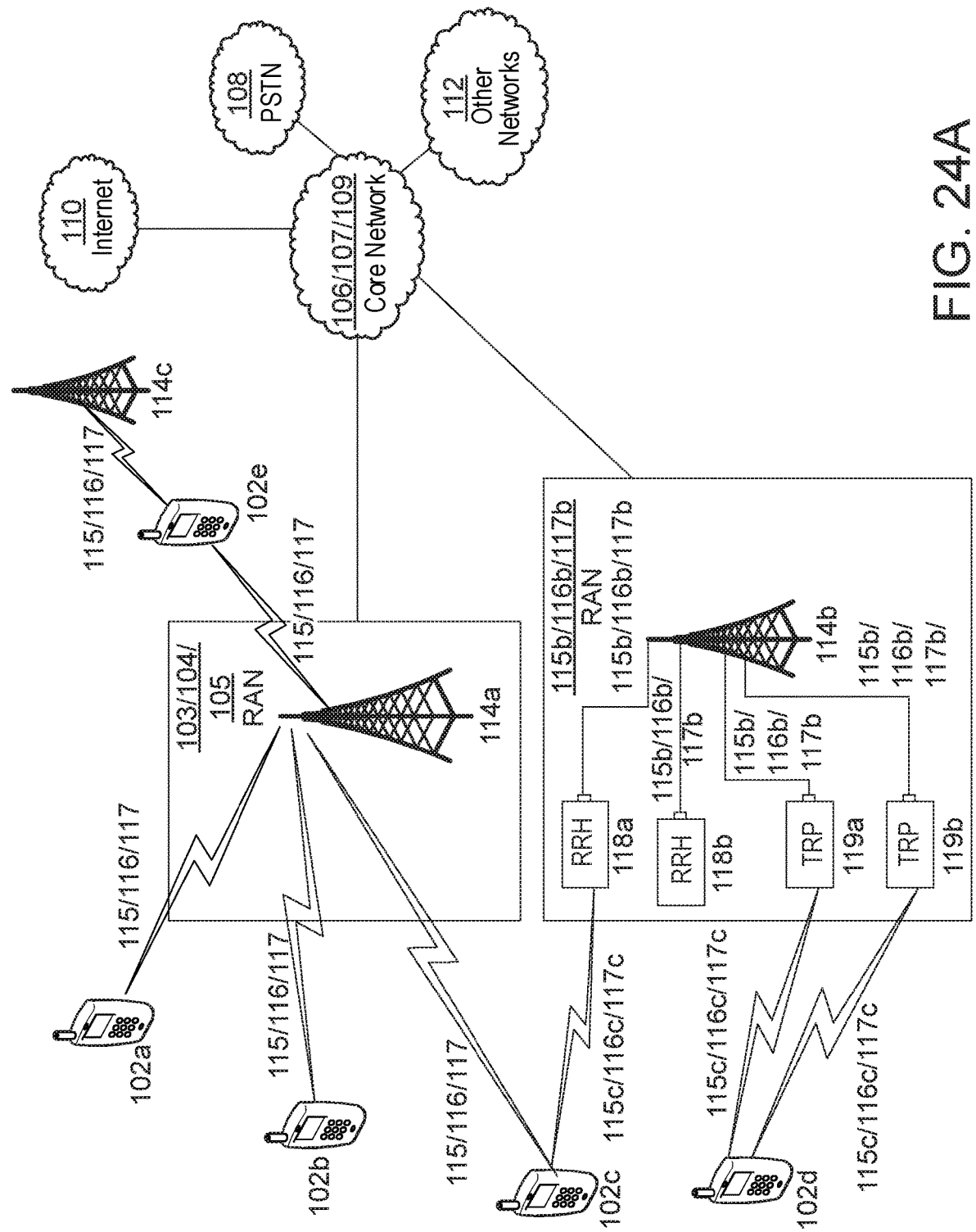
FIG. 24A illustrates one embodiment of an example communications system in which the methods and apparatuses described and claimed herein may be embodied.

FIG. 24A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 24A-24E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 using Long Term Evolution (LTE) and/or LTE-Advanced (LTE-A). In the future, the air interface 115/116/117 may implement 3GPP NR technology.

In an embodiment, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 24A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e may implement a radio technology such as IEEE 802.11 to establish a wireless local area network (WLAN). In an embodiment, the base station 114c and the WTRUs 102e may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 24A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 24A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 24A may be configured to communicate with the base station 114a, which may employ a cellular-based radio technology, and with the base station 114c, which may employ an IEEE 802 radio technology.

Figure 24B:
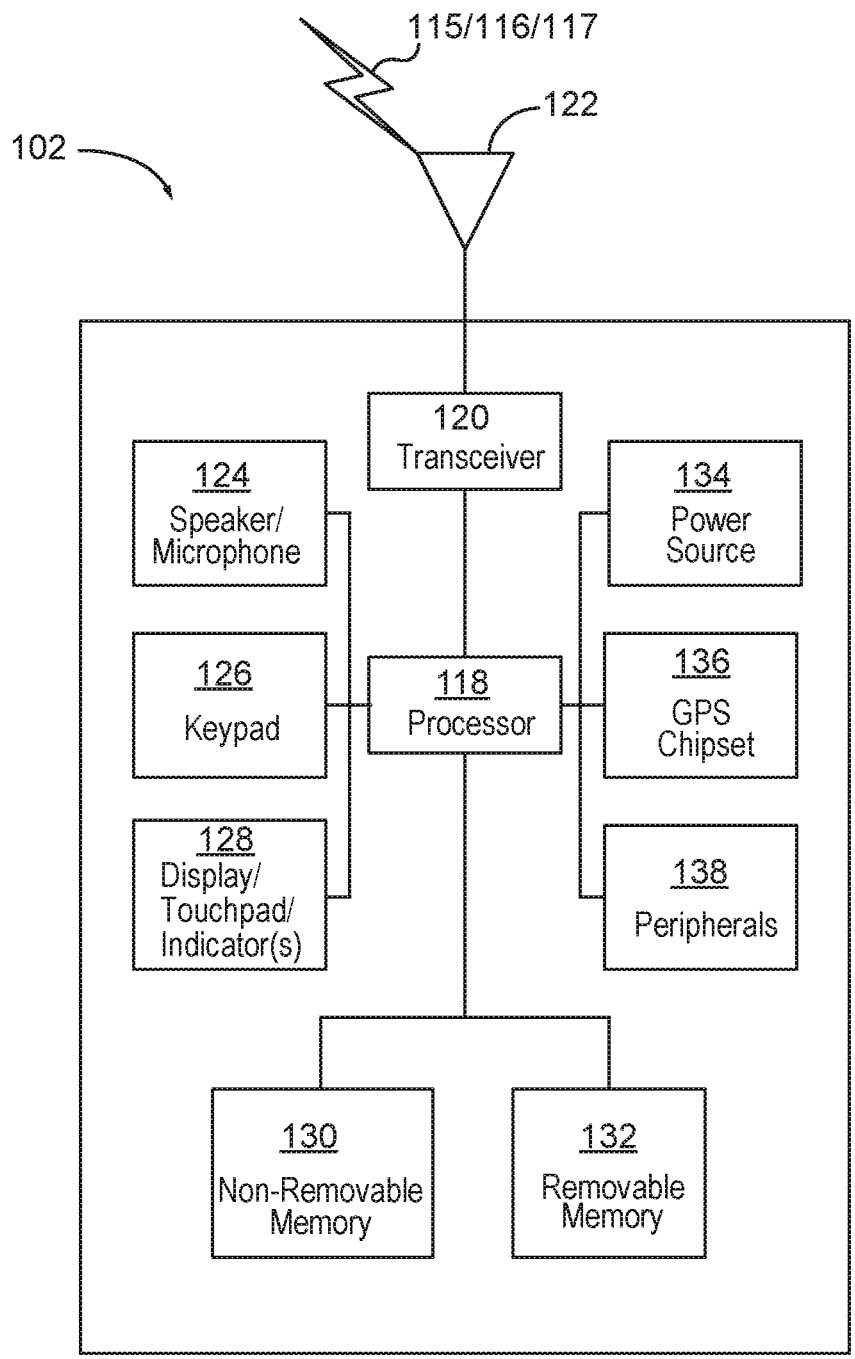
FIG. 24B is a block diagram of an example apparatus or device configured for wireless communications in accordance with the embodiments illustrated herein.

FIG. 24B is a block diagram of an example apparatus or device configured for wireless communications in accordance with the embodiments illustrated herein, such as for example, a WTRU 102. As shown in FIG. 24B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 24A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 24A may be configured to communicate with the base station 114a, which may employ a cellular-based radio technology, and with the base station 114b, which may employ an IEEE 802 radio technology.

FIG. 24B is a block diagram of an example apparatus or device configured for wireless communications in accordance with the embodiments illustrated herein, such as for example, a WTRU 102. As shown in FIG. 24B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 24B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 24B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/

117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 24B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 24C:
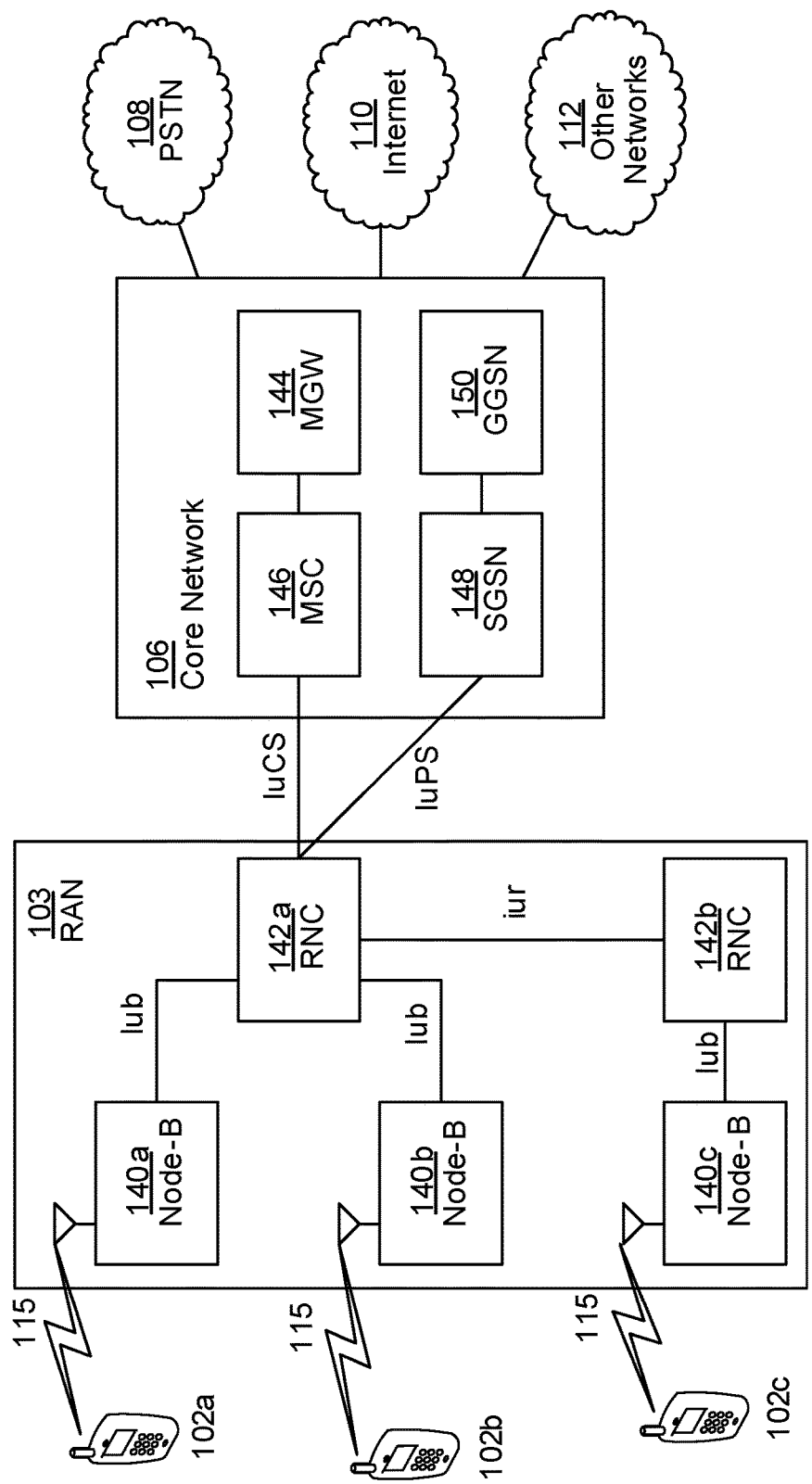
FIG. 24C is a system diagram of an example radio access network (RAN) and core network in accordance with an example embodiment.

FIG. 24C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 24C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 24C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 24C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 24D:
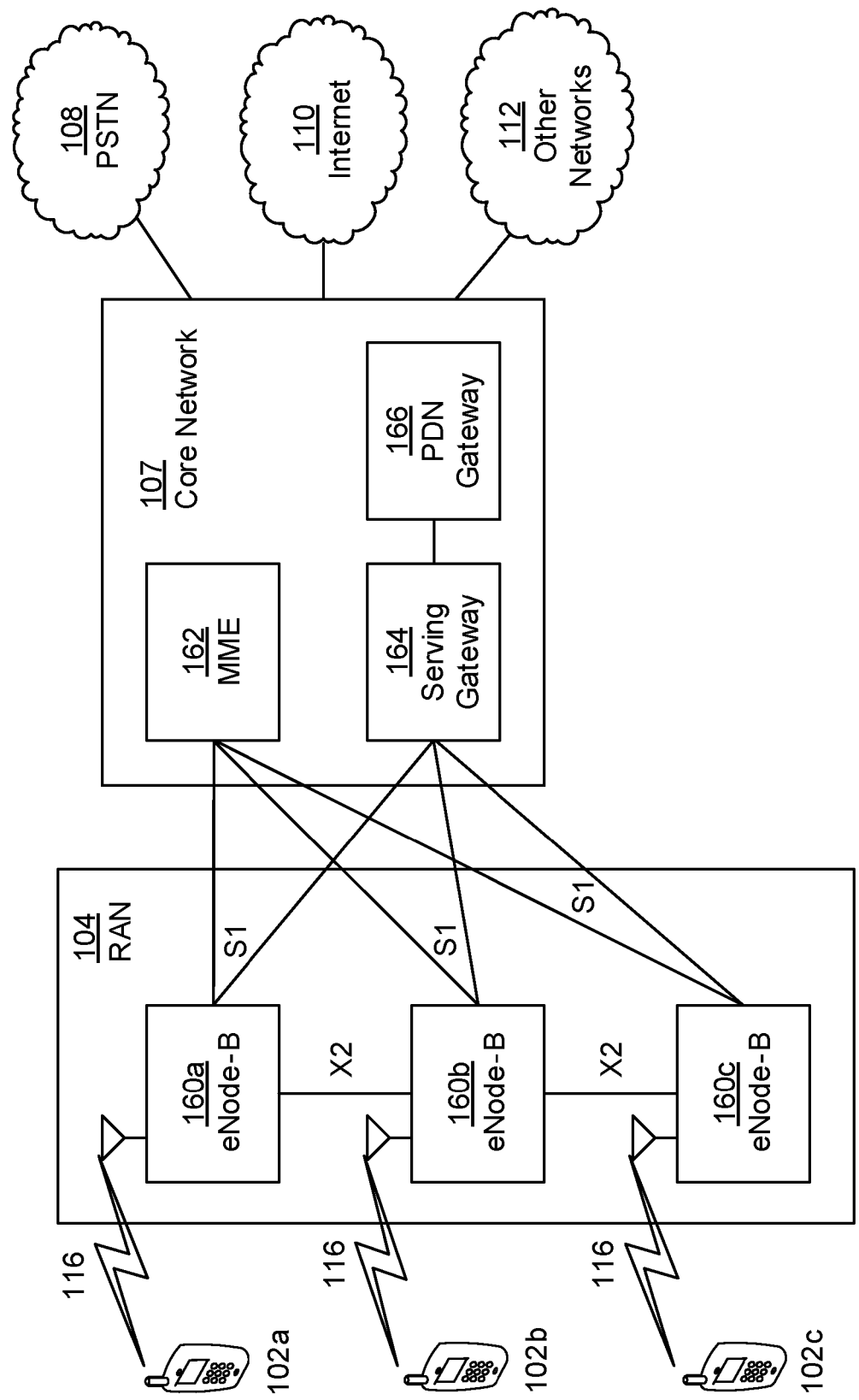
FIG. 24D is another system diagram of a RAN and core network according to another embodiment.

FIG. 24D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 24D, the eNode-Bs 160a, 160b, 160c may communicate with one another over an X2 interface.

The core network 107 shown in FIG. 24D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 24E:
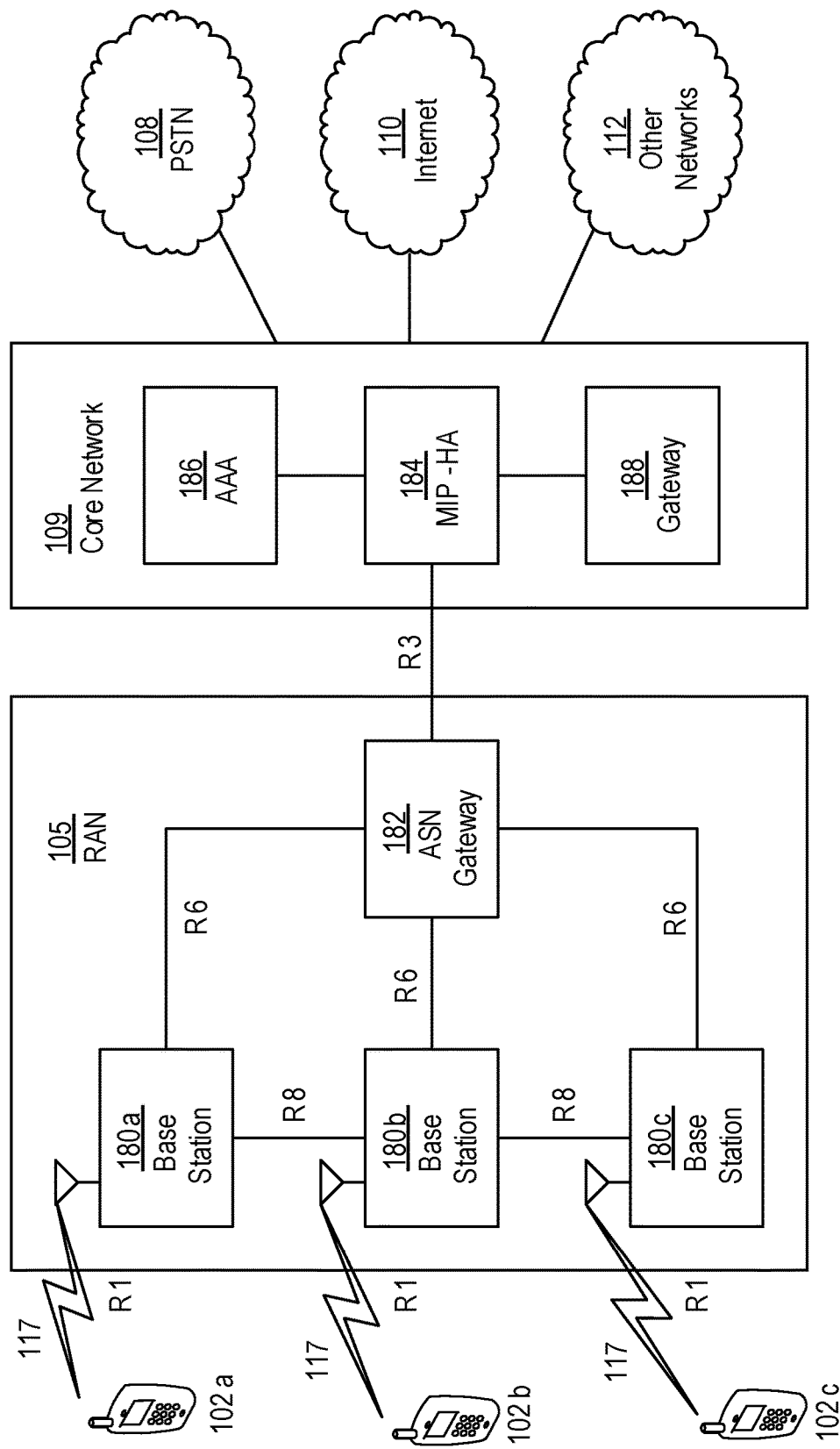
FIG. 24E is another system diagram of a RAN and core network according to another embodiment.

FIG. 24E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 24E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 24E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 24E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 24A, 24C, 24D, and 24E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 24A, 24B, 24C, 24D, and 24E are provided by way of example only, and it is understood that the subject matter disclosed and claimed herein may be embodied or implemented in any similar communication system, whether presently defined or defined in the future.

Figure 24F:
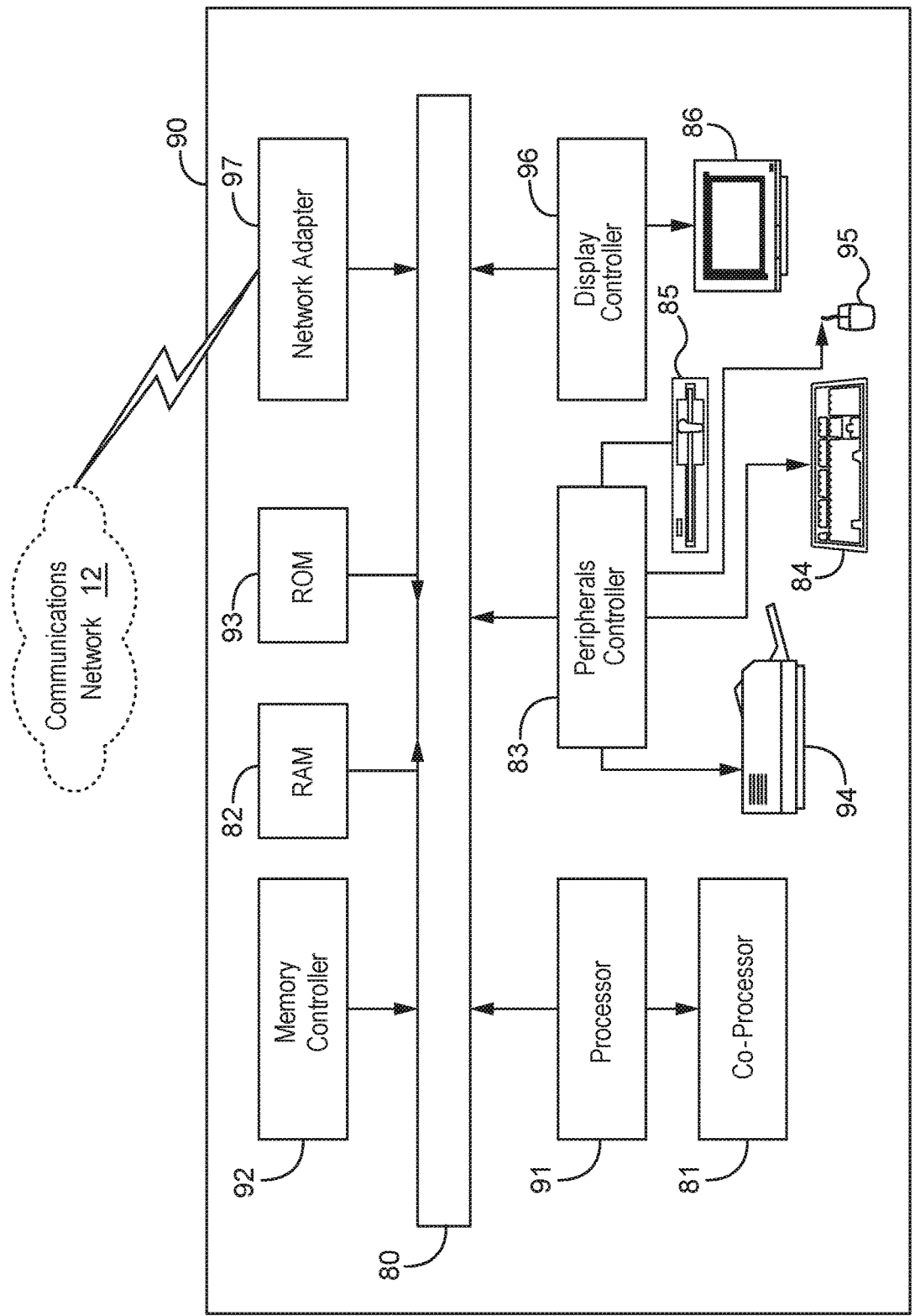
FIG. 24F is a block diagram of an exemplary computing system 90 in which one or more apparatuses of the communications networks illustrated in FIGS. 24C-F may be embodied.

FIG. 24F is a block diagram of an exemplary computing system 90 in which one or more apparatuses of the communications networks illustrated in FIGS. 24A, 24C, 24D and 24E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 24A, 24B, 24C, 24D, and 24E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The following is a list of acronyms relating to access technologies that may appear in the above description. Unless otherwise specified, the acronyms used herein refer to the corresponding term listed below.

ACK Acknowledgement
AID Association Identifier (802.11)
AP Access Point (802.11)
APN Access Point Name
AS Access Stratum
BS Base Station
CA Collision Avoidance
CD Collision Detection
CFI Control Format Indicator
CN Core Network
CMAS Commercial Mobile Alert System
C-RNTI Cell Radio-Network Temporary Identifier
CSMA Carrier Sensing Multiple Access
CSMA/CD CSMA with Collision Detection
CSMA/CA CSMA with Collision Avoidance
DCA Dedicated Collision Area
DCI Downlink Control Information
DACTI Dynamic Access Configuration Time Interval
DL Downlink
DRX Discontinuous Reception
ECGI E-UTRAN Cell Global Identifier
ECM EPS Connection Management
eMBB enhanced Mobile Broadband
EMM EPS Mobility Management
eNB Evolved Node B
ETWS Earthquake and Tsunami Warning System
E-UTRA Evolved Universal Terrestrial Radio Access
E-UTRAN Evolved Universal Terrestrial Radio Access Network
FDM Frequency Division Multiplex
FFS For Further Study
GERAN GSM EDGE Radio Access Network
GSM Global System for Mobile communications
GUTI Globally Unique Temporary UE Identity
HE High Efficiency
HSS Home Subscriber Server
IE Information Element
IMSI International Mobile Subscriber Identity
IMT International Mobile Telecommunications
KPI Key Performance Indicators
LTE Long Term Evolution
MAC Medium Access Control
MBMS Multimedia Broadcast Multicast Service
MCL Maximum Coupling Loss
MIB Master Information Block
MME Mobile Management Entity
MTC Machine-Type Communications
mMTC Massive Machine Type Communication
NACK Negative Acknowledgement
NAS Non-access Stratum
NR New Radio
OBO OFDM Back-off (802.11)
OFDM Orthogonal Frequency Division Multiplex
PDCCH Physical Downlink Control Channel
PDSCH Physical Downlink Shared Channel
PHY Physical Layer
PCFICH Physical Control Format Indicator Channel
PDCP Packet Data Convergence Protocol
PHICH Physical Hybrid ARQ Indicator Channel
PPDU PLCP Protocol Data Unit (802.11)
PRACH Physical Random Access Channel
PRB Physical Resource Block
PUCCH Physical Uplink Control Channel
PUSCH Physical Uplink Shared Channel
QoS Quality of Service
RA Random Access
RACH Random Access Channel
RAN Radio Access Network (3GPP)
RMSU Reachability and Mobility Status Update
RB Resource Block
RLC Radio Link Control
RNTI Radio Network Temporary Identifier
RRC Radio Resource Control
RU Resource Unit (802.11)
SI System Information
SIB System Information Block
SR Scheduling Request
STA Station (802.11)
TAI Tracking Area Indicator
TAU Tracking Area Update
TBD To Be Defined
TDM Time Division Multiplex
TEID Tunnel Endpoint ID
TRP Transmission and Reception Point
TTI Transmission Time Interval
UCI Uplink Control Information
UE User Equipment
UL Uplink
UR/LL Ultra Reliable-Low Latency
URLLC Ultra-Reliable and Low Latency Communications This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An apparatus comprising a processor, a memory, and communication circuitry, the apparatus being connected to an access network via its communication circuitry, the apparatus further comprising computer-executable instructions stored in the memory of the apparatus which, when executed by the processor of the apparatus, cause the apparatus to perform operations comprising:
receiving an indication of one or more access allocations for grant-less transmissions;
selecting an access allocation of the one or more access allocations so as to define a selected access allocation;
determining a first transmit power level for a grant-less transmission;
transmitting, at the first transmit power level, a first uplink message over the selected access allocation without requesting an uplink grant, so as to transmit the grant-less transmission;
receiving, from the access network, feedback information for the grant-less transmission, the feedback information including a transition indication and a power control indication;
determining a uplink transmission mode to be set as one of the grant-less transmission or a uplink grant transmission;
determining, based on the power control indication, a second transmit power level for the determined transmission mode;
transmitting, at the second transmit power level, a second uplink message as the determined uplink transmission mode.

2. The apparatus as recited in claim 1, wherein the second uplink message corresponds to the first uplink message so that the apparatus can perform a retransmission in the determined uplink transmission mode.

3. The apparatus as recited in claim 2, wherein the determined uplink transmission mode corresponds to the uplink grant transmission.

4. The apparatus as recited in claim 2, the apparatus further comprising computer-executable instructions stored in the memory of the apparatus which, when executed by the processor of the apparatus, cause the apparatus to perform further operations comprising:
determining to perform the retransmission in response to a grant-less transmission timer expiring.

5. The apparatus as recited in claim 1, wherein the feedback information is transmitted in downlink control channel for the grant-less transmission.

6. The apparatus as recited in claim 1, wherein determining the first transmit power level and the second transmit power level comprises performing a path loss estimation.

7. The apparatus as recited in claim 6, the apparatus further comprising computer-executable instructions stored in the memory of the apparatus which, when executed by the processor of the apparatus, cause the apparatus to perform further operations comprising:
receiving a synchronization signal or a reference signal from the access network; and
using the synchronization signal or the reference signal to perform the path loss estimation.

8. The apparatus as recited in claim 1, wherein determining the first transmit power level and the second transmit power level further comprises performing a modulation and coding scheme for the grant-less transmission.

9. An apparatus comprising a processor, a memory, and communication circuitry, the apparatus being connected to a user equipment via its communication circuitry, the apparatus further comprising computer-executable instructions stored in the memory of the apparatus which, when executed by the processor of the apparatus, cause the apparatus to perform operations comprising:
sending an indication of one or more access allocations for grant-less transmissions;
selecting an access allocation of the one or more access allocations so as to define a selected access allocation;
receiving a first uplink message over the selected access allocation without requesting an uplink grant, the first uplink message being sent by the user equipment at a first transmit power level for a grant-less transmission;
transmitting, to the user equipment, feedback information for the grant-less transmission, the feedback information including a transition indication and a power control indication;
receiving, at a second transmit power level, a second uplink message as a determined uplink transmission mode,
wherein the determined uplink transmission mode is set as one of the grant-less transmission or a uplink grant transmission based on the feedback information,
and the second transmit power level for the determined transmission mode is determined based on the power control indication.

10. The apparatus as recited in claim 9, wherein the second uplink message corresponds to the first uplink message so that the apparatus can perform a retransmission in the determined uplink transmission mode.

11. The apparatus as recited in claim 10, wherein the determined uplink transmission mode corresponds to the uplink grant transmission.

12. The apparatus as recited in claim 11, the apparatus further comprising computer-executable instructions stored in the memory of the apparatus which, when executed by the processor of the apparatus, cause the apparatus to perform further operations comprising:
determining to perform the retransmission in response to a grant-less transmission timer expiring.

13. The apparatus as recited in claim 9, wherein the feedback information is transmitted in downlink control channel for the grant-less transmission.

14. The apparatus as recited in claim 9, wherein the first transmit power level and the second transmit power level are determined by performing a path loss estimation.

15. The apparatus as recited in claim 14, the apparatus further comprising computer-executable instructions stored in the memory of the apparatus which, when executed by the processor of the apparatus, cause the apparatus to perform further operations comprising:
transmitting, to the user equipment, a synchronization signal or a reference signal from the access network, wherein the user equipment is configured to use the synchronization signal or the reference signal to perform the path loss estimation.

16. The apparatus as recited in claim 15, wherein the first transmit power level and the second transmit power level are determined by performing a modulation and coding scheme for the grant-less transmission.

17. A method for wireless communication with a user equipment, the method comprising:
sending an indication of one or more access allocations for grant-less transmissions;
selecting an access allocation of the one or more access allocations so as to define a selected access allocation;
receiving a first uplink message over the selected access allocation without requesting an uplink grant, the first uplink message being sent by the user equipment at a first transmit power level for a grant-less transmission;

transmitting, to the user equipment, feedback information for the grant-less transmission, the feedback information including a transition indication and a power control indication;

receiving, at a second transmit power level, a second uplink message as a determined uplink transmission mode, wherein the determined uplink transmission mode is set as one of the grant-less transmission or a uplink grant transmission based on the feedback information, and the second transmit power level for the determined transmission mode is determined based on the power control indication.

* * * * *